United States Patent [19]
Osawa

[11] Patent Number: 6,123,429
[45] Date of Patent: Sep. 26, 2000

[54] LIGHT SOURCE DEVICE

[75] Inventor: Tetsu Osawa, Sagamihara, Japan

[73] Assignee: Tokyo Electron Limited, Tokyo, Japan

[21] Appl. No.: 09/079,290

[22] Filed: May 15, 1998

[30] Foreign Application Priority Data

May 17, 1997 [JP] Japan .................................... 9-143294
Sep. 18, 1997 [JP] Japan .................................... 9-272073

[51] Int. Cl.$^7$ .............................. G02B 5/10; F21V 7/00; H01J 5/16
[52] U.S. Cl. ......................... 359/868; 313/113; 362/298
[58] Field of Search .................................. 362/263, 298, 362/304; 313/113; 359/850, 852, 868

[56] References Cited

U.S. PATENT DOCUMENTS

| | | | |
|---|---|---|---|
| 3,720,460 | 3/1973 | Wilkinson | 352/198 |
| 4,498,926 | 2/1985 | Cline | 75/65 |
| 5,532,497 | 7/1996 | Yasuzato et al. | 250/548 |
| 5,626,631 | 5/1997 | Eckhouse | 607/88 |

FOREIGN PATENT DOCUMENTS

| | | |
|---|---|---|
| 63-208747 | 8/1988 | Japan . |
| 2-42311 | 3/1990 | Japan . |
| 2-134542 | 11/1990 | Japan . |
| 2-150754 | 12/1990 | Japan . |

*Primary Examiner*—Cassandra Spyrou
*Assistant Examiner*—Jared Treas
*Attorney, Agent, or Firm*—Oblon, Spivak, McClelland, Maier & Neustadt, P.C.

[57] ABSTRACT

A light source device has a first mirror for reflecting light emitted by a light source, and a second mirror for reflecting the light reflected by the first mirror and guiding the reflected light toward the irradiation target portion. The first mirror has a curved reflection surface having an elliptic or parabolic shape in section along the optical axis direction. The light source is set at the position of a focal point of the elliptic or parabolic shape of the curved reflection surface. The second mirror has a linear reflection surface which has a linear shape in section along the optical axis direction and faces the curved reflection surface of the first mirror.

5 Claims, 40 Drawing Sheets

80°, 120°, 150°

LIGHT SOURCE DEVICE

BACKGROUND OF THE INVENTION

The present invention relates to a light source device, and a focusing mirror device and optical fiber connection device using the feature of the light source device and, more particularly, to a light source device which is improved to realize high energy density.

In general, focusing mirror devices are used in many fields such as headlamps for vehicles, various lighting fixtures, optical devices, lamp heaters for industrial equipment, and the like. In a conventional mirror device, its reflection surface has a nearly semi-elliptic sectional shape, and the mirror device is commonly disposed on the rear side of a light source to reflect light emitted by the light source by the semi-elliptic reflection surface and to project the reflected light forward.

FIG. 17 shows a conventional focusing mirror device that concentrates light to one point. In FIG. 17, the section of a reflection surface 3A of a mirror has an elliptic shape, and a light source 2 is placed at one focal point F1 of this elliptic shape. Light emitted by the light source 2 is reflected by the reflection surface 3A, and the reflected light is focused to the other focal point F2 as a converging point.

FIG. 18 shows a conventional focusing mirror device that obtains collimated light. In FIG. 18, the section of a reflection surface 3B of a mirror has a parabolic shape, and a light source 2 is disposed at the position of a focal point F1 of the parabolic shape. Collimated light is obtained by reflecting light emitted by the light source 2 by the reflection surface 3B. Note that a convex lens 4B having a small lens diameter is disposed in front of the center of the light source 2 to use light emitted by-the front surface of the light source 2 as collimated light.

As shown in FIG. 17, in the conventional focusing mirror device that brings light to a focus at one point, most light components L1 emitted forward (the right side in FIG. 17) by the light source 2 cannot be used since they diverge without striking the reflection surface 3A, and cannot be focused.

The divergence angle θ1 of the focused light becomes considerably large (e.g., about 58°). For this reason, when light is projected farther using a lens, a lens 4A (indicated by the one-dashed chain line) is disposed so that its focal point matches the focal point F2. However, since the divergence angle θ1 is large, the amount of light that becomes incident on the lens 4A is small, and only half the focused light can be used. More specifically, even when a lens is designed to have a short focal length, its minimum focal length is nearly equal to the lens diameter. Under the circumstance, even when the lens is effectively used up to its outermost periphery, a divergence angle θ1 of only about 25° can be covered, and light components reflected beyond this angle cannot become incident on the lens 4A, resulting in losses.

In this case, a Fresnel lens which has a short focal length and large diameter may be used. However, since this lens has a complicated shape, and poor optical precision, its application range is limited.

On the other hand, the focusing mirror device that obtains collimated light, as shown in FIG. 18, is used for, e.g., drying a paint. However, as shown in FIG. 18, the amount of light has high density on the central portion side, and its density decreases toward the peripheral portion of the reflection surface 3B. Hence, the irradiation surface cannot be irradiated with an amount of light with a uniform density. Furthermore, neither the irradiation spot size nor irradiation light amount density can be controlled.

The conventional light source device cannot cope with a case wherein an energy density equivalent to or as high as that of a laser beam is required. This is because only some light components of those emitted by a lamp can be used, and light emitted by the lamp cannot be sufficiently collected even using another mirror since it has a large divergence angle.

FIG. 47 is an explanatory view showing the concept of obtaining light with high energy density by converging light beams emitted by a plurality of lamps. As shown in FIG. 47, a plurality of, for example, three, lamps 2L are disposed, and reflection mirrors 5 each having a parabolic sectional shape are arranged in correspondence with these lamps. These mirrors reflect light beams emitted by the lamps 2L located at the focal points of the corresponding parabolas to obtain collimated light 6. Furthermore, the collimated light 6 is focused to one point on a target object TO set at the focal point by reflecting it by a final reflection mirror 8 having a parabolic sectional shape.

In this case, the diffusion angle of incoming light on the final reflection mirror 8 is determined by the reflection mirrors 5 for converting light emitted by the lamps 2L into collimated light, and the size of the emission portion of each lamp 2L, and their positional relationship. However, in such example of the arrangement, even when the number of lamps 2L is increased to increase the energy amount, a spread of light on the focal point of the reflection mirror 8, i.e., on the target object TO, increases, and consequently, the energy density does not become sufficiently high. Note that the diffusion angle indicates an angular error of light produced depending on the size or the like of a light source.

This point will be explained in detail below. FIG. 48 is an enlarged view showing one of the lamps shown in FIG. 47. In the illustrated example, light components emitted forward within the direction range from 0° to 50° cannot become incident on the reflection mirror 5 and cannot be used. Also, the luminous flux density of the collimated light becomes lower toward the peripheral portion of the reflection mirror 5, and the size of the final reflection mirror 8 cannot be utilized. Light rays near the center have a higher density, but have a larger diffusion angle.

The diffusion angle will be explained below using a diagram depicting the ray tracing result. FIG. 49 shows the ray tracing result obtained by extracting only 90° light components of those emitted by the entire surface of a light source lamp having a finite size, and FIG. 50 shows the ray tracing result obtained when a reflection mirror having a size twice that shown in FIG. 49 is used. Note that the diameter of the light source lamp 2L is set at 1 mm.

As can be seen from FIG. 49, a light beam emitted by the light source lamp 2L having a diameter of 1 mm in the 90° direction is reflected by the reflection mirror 5, temporarily converges, and then diverges. After that, the light beam is reflected by the reflection mirror 8, and becomes incident on the target object TO. Of the light beam, only the central light ray reaches a focal point FT, and marginal light rays reach positions separated from the focal point FT according to the positions of their origin. Hence, energy cannot be sufficiently concentrated.

Such phenomenon of light divergence is called diffusion. The error from an angle with a mathematically normal path determined by the shape of the reflection mirror or the maximum value of light rays suffering angular errors is defined as a diffusion angle. In case of a parabolic mirror, collimated light serves as a reference, and the diffusion angle means an angle the light ray makes with the collimated light. In case of a mirror having an elliptic section, the mathematically normal path is a straight line which connects each point on the elliptic mirror and the focal point, and the diffusion angle means an angle each light ray makes with the one which reaches the focal point. Note that "normal" merely means that it is intended in design of the mirror.

In FIG. 50, the width of the reflection mirror 5 is twice as large as that of the reflection mirror shown in FIG. 49. In this case, the diffusion angle becomes small, and the divergence at the focal point F1 is halved. The reason why a light beam diverges and the diffusion angle becomes large is that the light source that emits light essentially has a finite size. This point will be explained below with reference to FIG. 51. FIG. 51 is a view for explaining the cause of an angular error of light emitted by a light source having a finite size. In FIG. 51, reference numeral 2 denotes a filament serving as a light source; 5, a reflection mirror having a parabolic section. For the sake of easy understanding, the filament illustrated has a large diameter.

In this case, light emitted in the 45° direction behind the light source 2 will be taken as an example.

Light originating from a central point S1 of the light source 2 and emitted in the 45° direction behind the light source toward a point M1 of the reflection mirror 5 is reflected along a mathematically normal optical path, and reaches a mathematically normal focal point. However, light originating from an end point S2 of the light source 2 in the same direction as that of the above light, and propagating toward a point M2 of the reflection mirror 5 is reflected in a direction different from the above light. This light has an angular error of an angle θd from each optical path that reaches the mathematically normal focal point.

The angle ed takes different values depending on the angles of light emitted by the light source 2 toward the reflection mirror 5, but the angular error produced is proportional to the size of the light source 2 and is inversely proportional to the distance between the light source 2 and reflection mirror 5. In this manner, since the light source has a finite size, an angular error is produced thereby, and the diffusion angle increases. As a result, sufficiently high energy density cannot be obtained.

Furthermore, since the conventional light source device can only reflect and focus some of light components emitted by the light source, such mechanism also fails to obtain sufficiently high energy density.

BRIEF SUMMARY OF THE INVENTION

It is an object of the present invention to provide a light source device with a small divergence angle of emitted light.

It is another object of the present invention to provide a light source device which can project light onto an area within a given range to have a uniform light amount distribution.

It is still another object of the present invention to provide a light source device which can attach and adjust a discharge lamp at a correct position with respect to a reflection mirror.

It is still another object of the present invention to provide a light source device which can efficiently collect and use light emitted by a discharge lamp, and can reduce the divergence angle.

It is still another object of the present invention to provide a light source device which can further increase the energy density of light emitted by a discharge lamp.

It is still another object of the present invention to provide a focusing mirror device and optical fiber connection device which utilize some excellent features of the light source device according to the present invention.

According to a first aspect of the present invention, there is provided a reflection mirror device for reflecting light coming from a light source to apply the light onto an irradiation target portion, comprising:

a first mirror for reflecting light coming from the light source; and a second mirror for reflecting the light reflected by the first mirror, and guiding the reflected light toward the irradiation target portion, wherein one of the first and second mirrors has a first curved reflection surface having an elliptic or parabolic shape in section along an optical axis direction, the other of the first and second mirrors has a first linear reflection surface having a linear shape in section along the optical axis direction and facing the first curved reflection surface, and one of the light source and irradiation target portion is disposed substantially at a position of a focal point of the elliptic or parabolic shape of the first curved reflection surface.

According to a second aspect of the present invention, there is provided a light source device for applying light onto an irradiation target portion, comprising:

a light source for emitting light;

a first mirror for reflecting light coming from the light source, the first mirror having a first curved reflection surface with an elliptic or parabolic shape in section along an optical axis direction, and the light source being disposed substantially at a position of a focal point of the elliptic or parabolic shape of the first curved reflection surface; and a second mirror for reflecting the light reflected by the first mirror, and guiding the reflected light toward the irradiation target portion, the second mirror having a first linear reflection surface with a linear shape in section along the optical axis direction and facing the first curved reflection surface.

According to a third aspect of the present invention, there is provided an optical fiber connection device for optically connecting opposing end portions of first and second optical fibers, comprising:

first and second mirrors for respectively reflecting light coming from the end portions of the first and second optical fibers, the first and second mirrors having elliptic reflection surfaces each having an elliptic shape in section along an optical axis direction; and third and fourth mirrors for respectively reflecting the light reflected by the first and second mirrors and converging the reflected light at the end portions of the second and first optical fibers, the third and fourth mirrors having linear reflection surfaces each having a linear shape in section along the optical axis direction, and respectively face the elliptic reflection surfaces of the first and second mirrors.

According to a fourth aspect of the present invention, there is provided a light source device for applying light onto an irradiation target portion, comprising:

a discharge lamp for emitting light by discharge, the discharge lamp forming an emission point or emission line, a section along an optical axis direction of which is substantially a point light source; and a first mirror for reflecting light coming from the discharge lamp and guiding the reflected light toward the irradiation target portion, the first mirror having a first elliptic reflection surface having an elliptic shape in section along the optical axis direction, and the discharge lamp being disposed substantially at a position of one of two focal points of the elliptic shape.

According to a fifth aspect of the present invention, there is provided a light source device for applying light onto an irradiation target portion, comprising:

a discharge lamp for emitting light by discharge, the discharge lamp forming an emission point or emission line, a section along an optical axis direction of which is substantially a point light source; and a first mirror for reflecting light coming from the discharge lamp and guiding the reflected light toward the irradiation target portion, the first mirror having a first elliptic reflection surface having an elliptic shape in section along the optical axis direction, the discharge lamp being disposed substantially at a position of one of two focal points of the elliptic shape, and the first elliptic reflection surface being set to output the light reflected thereby as divergent light.

According to a sixth aspect of the present invention, there is provided a light source device for applying light onto an irradiation target portion, comprising:

a discharge lamp for emitting light by discharge, the discharge lamp forming an emission point or emission line, a section along an optical axis direction of which is substantially a point light source;

a first mirror for reflecting light coming from the discharge lamp, the first mirror having a first parabolic reflection surface having a parabolic shape in section along the optical axis direction, and the discharge lamp being disposed substantially at a position of a focal point of the parabolic shape;

a second mirror for reflecting light coming from the discharge lamp and first mirror, the second mirror having a linear reflection surface, which has a linear shape in section along the optical axis direction, and perpendicularly intersecting the optical axis direction to oppose the discharge lamp; and a third mirror disposed on that side of the discharge lamp which is opposite to the second mirror to reflect light coming from the discharge lamp and first mirror and guiding the reflected light toward the irradiation target portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
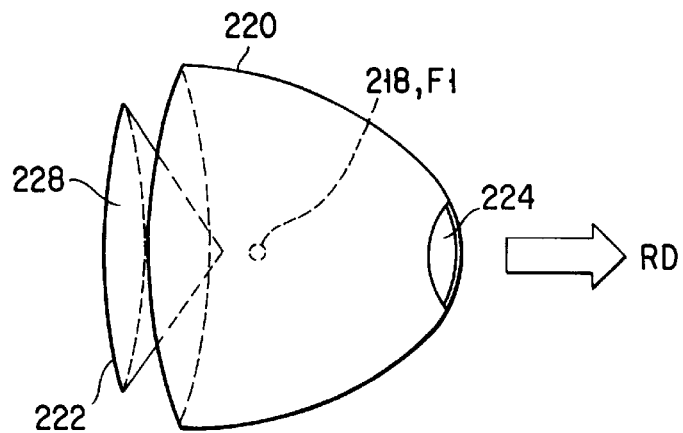
FIG. 1 is a perspective view showing a light source device according to an embodiment of the present invention.

In the following description, the same reference numerals denote constituting elements having nearly the same functions and arrangements, and a repetitive description will be made only when it is necessary.

Figure 2:
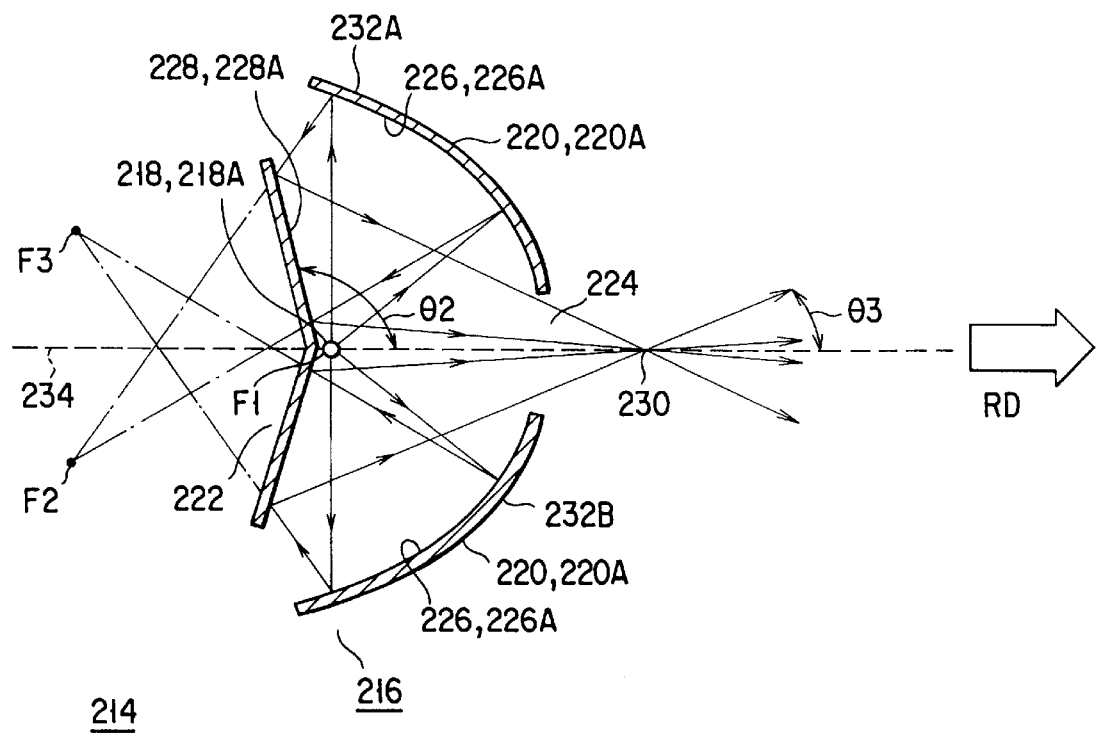
FIG. 2 is a sectional view of the device shown in FIG. 1.
Figure 3:
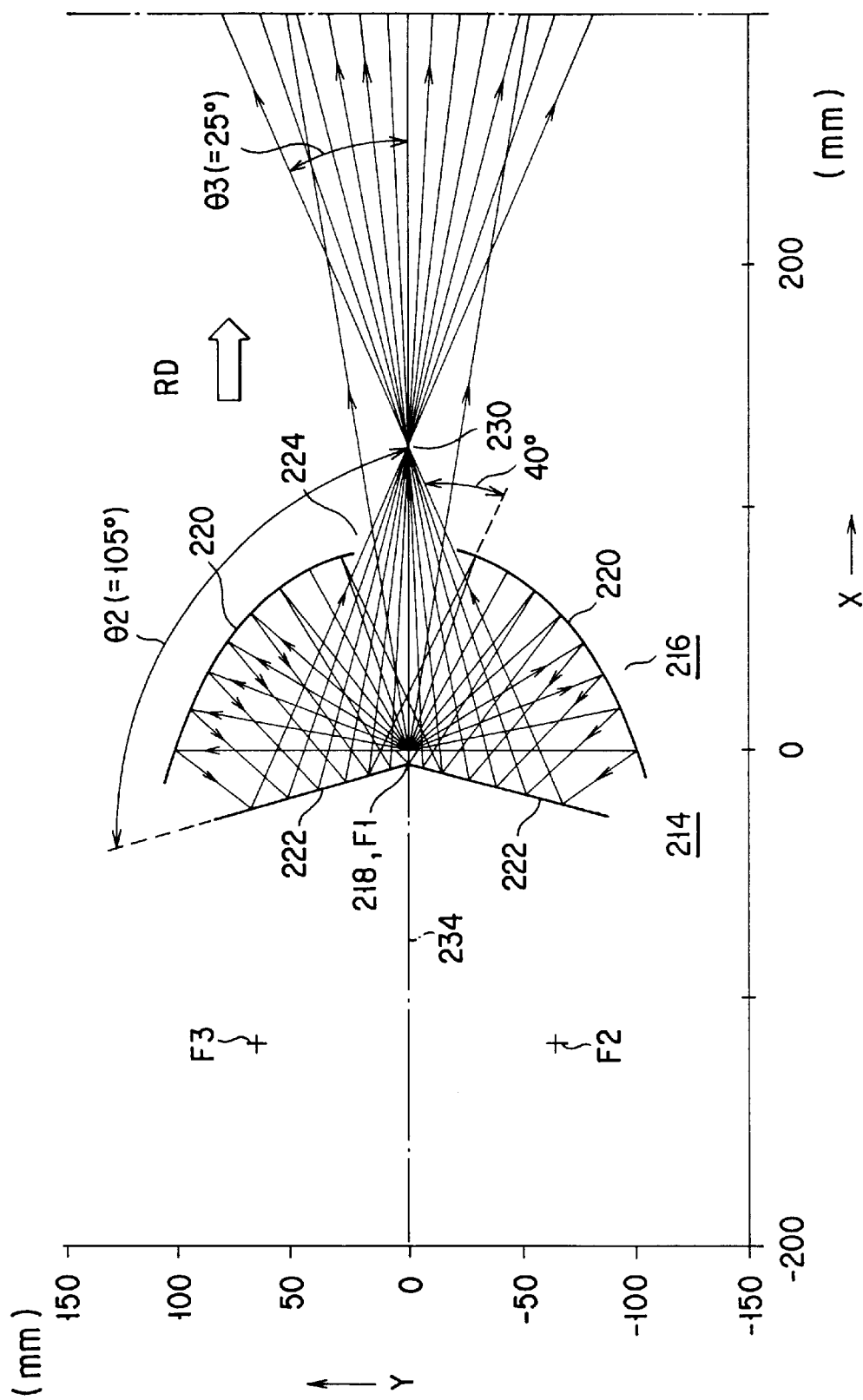
FIG. 3 is a view showing reflection of light in the device shown in FIG. 1.

FIG. 1 is a perspective view showing a light source device having a focusing mirror device according to an embodiment of the present invention, FIG. 2 is a sectional view of the device shown in FIG. 1, and FIG. 3 is a view showing the reflection state of light in the device shown in FIG. 1.

As shown in FIGS. 1 to 3, a light source device 214 is mainly formed of a focusing mirror device 216 and a light source 218 comprising, e.g., a light-emitting lamp or the like. The focusing mirror device 216 is mainly constituted by first and second mirrors 220 and 222.

More specifically, the first mirror 220 is formed into, e.g., a doom shape so that the section of its reflection surface has an elliptic shape in a light radiation direction RD, i.e., in the optical axis direction from the light source to a target object to be irradiated (toward the right side in FIG. 2). A circular light radiation opening 224 is open to the distal end of the first mirror 220 and, hence, the entire mirror 220 has an annular shape. The inner surface of the first mirror 220 is formed as a reflection surface 226.

By contrast, the second mirror 222 is formed into an umbrella shape so that the section of its reflection surface in the light radiation direction RD has a linear shape, and the entire reflection surface forms a portion of a circular cone of revolution. The front surface side of the second mirror 222 serves as a reflection surface 228, and the second mirror 222 is disposed inside the first mirror 220.

The light source 218 is placed on a focal point F1 of the semi-elliptic sectional shape of the first mirror 220 slightly in front of the center of the second mirror 222. Hence, light emitted by the light source 218 is reflected by the reflection surface 226 of the first mirror 220, and then travels toward the reflection surface 228 of the second mirror 222. The light is then reflected by the reflection surface 228, and emerges forward from the light radiation opening 224. The light coming from the opening 224 is focused to a converging portion 230. In this case, it should be noted that the upper and lower portions of ellipses in FIG. 2, i.e., an upper elliptic arc 232A and lower elliptic arc 232B do not form portions of a continuous single ellipse. More specifically, one focal point of an ellipse that forms the upper elliptic arc 232A is located at the point F1, which is the same point as one focal point of the upper elliptic arc 232A, but the other focal point F2 is located below a central line 234 in FIG. 2.

Also, one focal point of an ellipse that forms the lower elliptic arc 232B is located at the point F1, but the other focal point F3 is located above the central line 234 at a position symmetrical to the focal point F2 about the central line 234.

The reflection surface 228 having a linear sectional shape of the second mirror 222 makes a tilt angle θ2 relative to the central line 234 to satisfy the following conditions. Specifically, the virtual images of the focal points F2 and F3 are located at an identical point, i.e., the converging portion 230, where the corresponding straight lines in section of the reflection surface 228 are used as symmetry axes, respectively. In FIG. 2, only one section that passes through the central line 234 has been explained. Also, the above-mentioned relation holds for all the sections which are taken along the central line 234 from arbitrary directions.

The reflection state of light will be explained below with reference to FIG. 3.

In FIG. 3, the tilt angle θ2 the second mirror 222 makes with the light radiation direction RD on the central line 234 is set at 105°, and the distance between one focal point F1 where the light source 218 is located, and the converging portion 230 is set around 134 mm. Note that FIG. 3 illustrates the optical paths of only effective light components. Also, FIG. 3 illustrates the X- and Y-scales, and the same applies to other drawings.

Light emitted by the light source 218 is reflected by the reflection surface 226 having the elliptic sectional shape of the first mirror 220, and propagates toward the second mirror 222. The light is then reflected forward by the reflection surface 228, and is focused to the converging portion 230 via the light radiation opening 224. In this case, a divergence angle θ3 of the focused light is approximately 25°, and can be greatly reduced as compared to the divergence angle θ1=58° shown in FIG. 17.

At this time, light emitted forward by the light source 218 has an effective angular range from about 40° to 90°, and the emitted light is focused within this range. Hence, the light emitted forward by the light source 218 can be effectively used. Note that FIG. 3 does not illustrate light that travels backward from the light source 218. Normally, since the rear surface side of the light source is in the shade of the light source itself, and light in this portion suffers large converging errors, it cannot be used.

Figure 4:
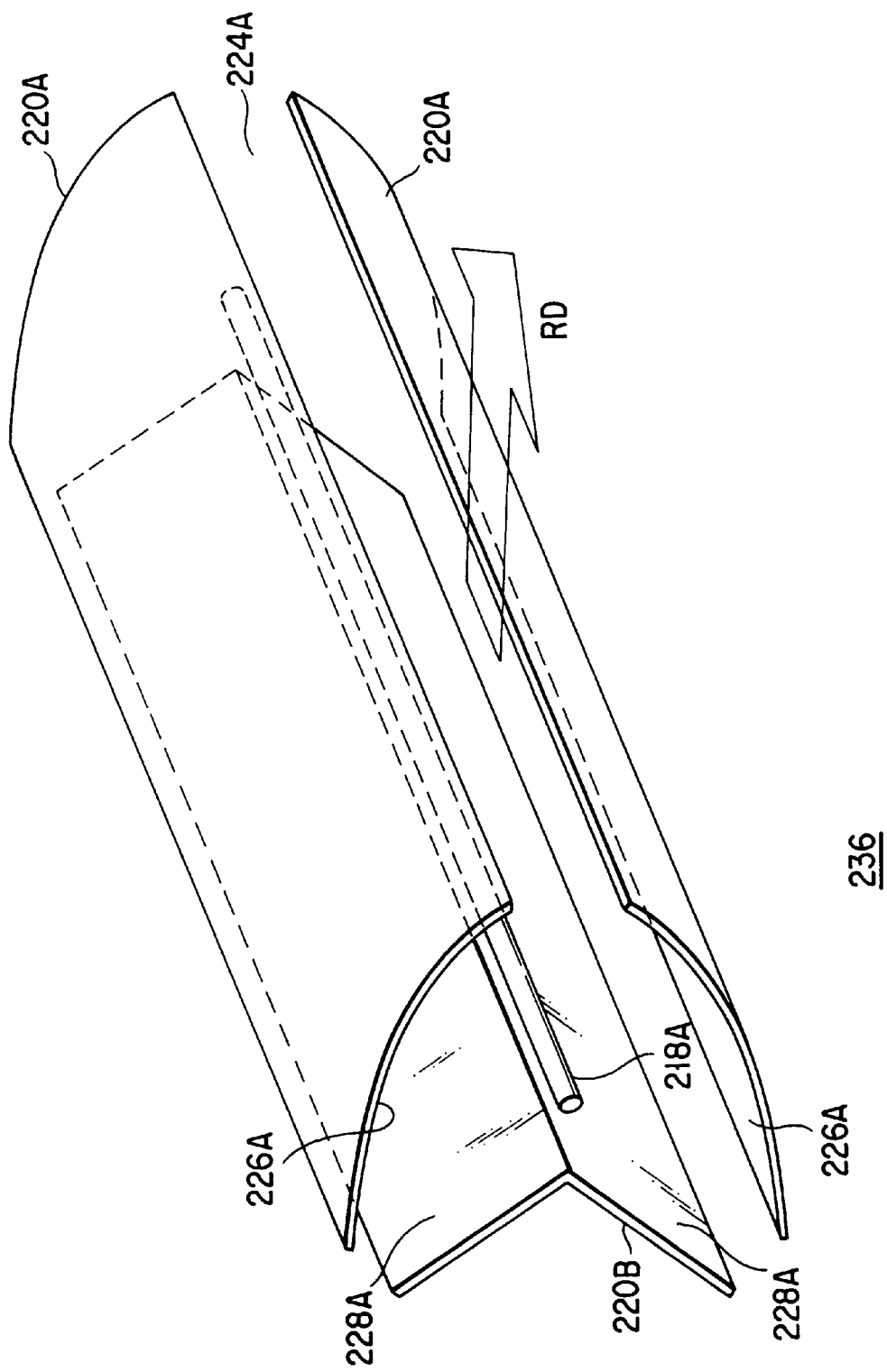
FIG. 4 is a perspective view showing the structure used when light is focused into a linear pattern.

In this case, the arrangement for converging light to one point has been exemplified. Alternatively, as shown in FIG. 4, a device arrangement for converging light on a single line may be used. At this time, the sectional view along the light radiation direction is the same as that shown in FIG. 2. A light source device 236 has the following differences from that in the focusing mirror device shown in FIG. 2. First and second mirrors 220A and 220B extend in a direction perpendicular to the light radiation direction, and a reflection surface 226A of the first mirror 20A is similarly formed into a curved surface so that its section forms a portion of an elliptic arc. On the other hand, a reflection surface 228B of the second mirror 220B is formed not into a curved surface as the surface of a circular cone but into a planar shape. A light source 218A comprises a light-emitting lamp such as a rod-like fluorescent lamp. In this case, light is focused into a single line in front of a light radiation opening 224A which is open to have a rectangular pattern.

The above-mentioned point and linear focusing type devices can be applied to all the devices except for an optical fiber connection optical member to be described later.

Figure 5:
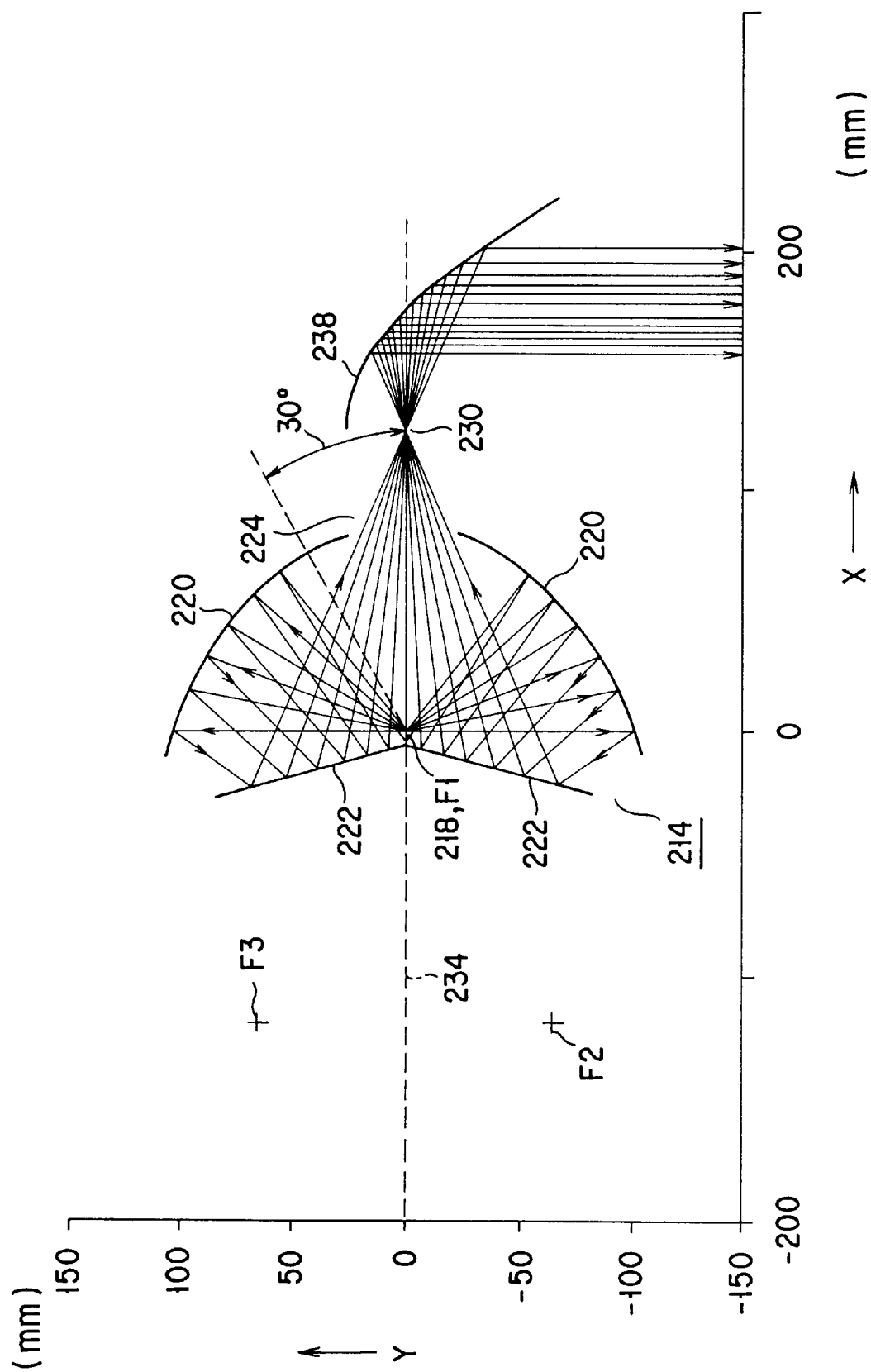
FIG. 5 is a view showing a modification of the device shown in FIG. 1.

FIG. 5 shows a modification of the light source device described above with the aid of FIGS. 1 to 3. In FIG. 5, a reflection mirror 238 having a parabolic reflection surface is inserted in front of the light radiation opening 224 of the light source device 214. The reflection mirror 238 is disposed so that the focal point of a parabola that defines its shape is located at the converging portion 230. Hence, light reflected by the reflection mirror 238 is converted into collimated light, and is projected toward infinity. In the illustrated example, the optical paths within the range from 0° to 30° with respect to the central line 234 in the light radiation direction are not shown.

Figure 6:
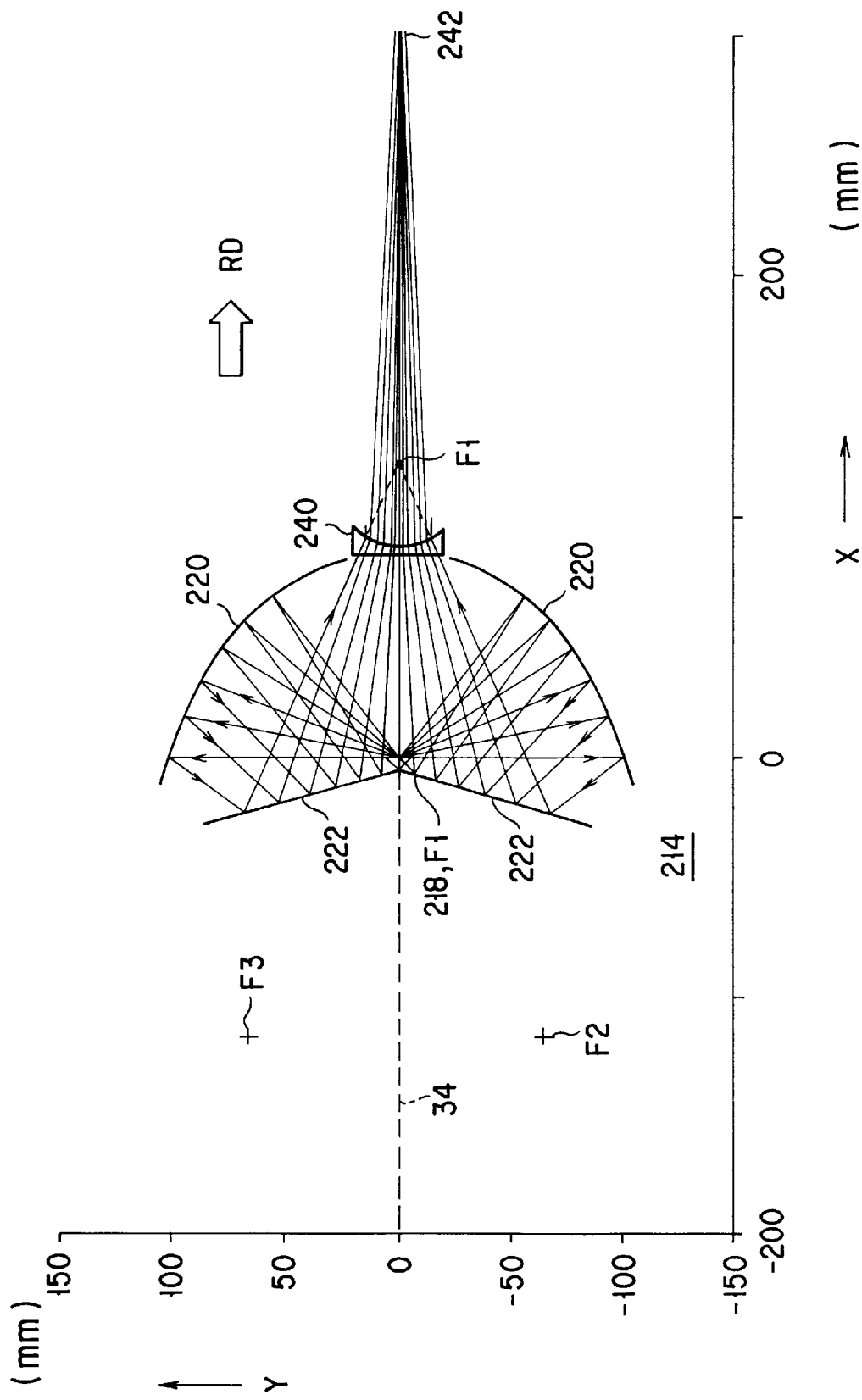
FIG. 6 is a view showing another modification of the device shown in FIG. 1.

FIG. 6 shows another modification of the light source device described above with the aid of FIGS. 1 to 3. In FIG. 6, a concave lens 240 is disposed in the vicinity of the light radiation opening 224 of the light source device 214. Upon operation of the concave lens 240, an actual converging point 242 is displaced from the original converging point 230 by a predetermined amount in the light radiation direction. In this case as well, FIG. 6 does not illustrate the optical paths within the range from 0° to 30° with respect to the central line 234 in the light radiation direction.

In order to change the position of the converging portion 230 on the central line, the concave lens need not always be used unlike in the above case. The converging portion 230 can be moved to an arbitrary position on the central line by changing the shape of the elliptic arc as the section of the first mirror 220, or the position or tilt angle of the second mirror 222.

Figure 7:
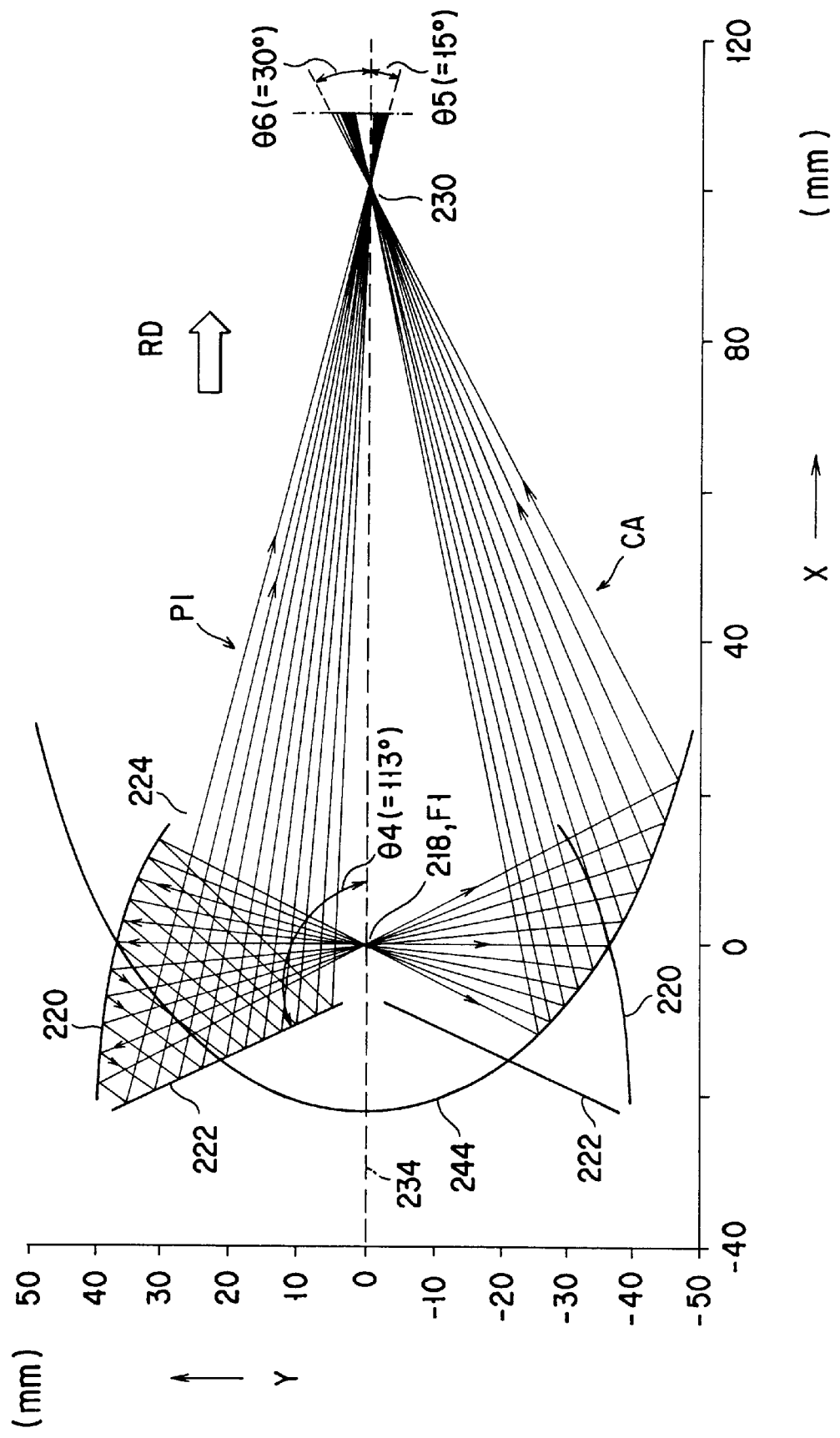
FIG. 7 is a view showing the device of the present invention and a conventional light source device, which are superposed on each other for the purpose of comparison.

FIG. 7 is a sectional view showing such example of the light source device, and superposes a light source device PI of the present invention and a conventional light source device CA on each other. FIG. 7 illustrates the respective mirrors as lines irrespective of their thickness, i.e., mainly illustrates their reflection surface positions.

Note that the upper half in FIG. 7 shows the optical paths of the device PI according to the embodiment of the present invention, and the lower half shows the optical paths of the conventional light source device CA for the sake of comparison.

In FIG. 7, in order to move the converging portion 230 to a farther position in the light radiation direction, the first mirror 220 is moved slightly backward and the elliptic arc portion used is changed as compared to the device shown in FIG. 3. Furthermore, the tilt angle of the second mirror 222 is set at 113°, which are slightly larger than 105° in FIG. 3. The distance between the light source 218 located at the focal point F1, and the converging point 230 is set around 110 mm.

As can be seen from FIG. 7, a divergence angle θ5 of light in the device of the present invention is smaller than a divergence angle θ6 of light reflected by a reflection mirror 244 having a semi-elliptic curved surface in the conventional device. As a result of calculations, the divergence angle θ6 of the conventional device is approximately 30°, while the divergence angle θ5 of the device of the present invention is about 15° which is around half the angle θ6. On the other hand, the size of the elliptic mirror (first mirror 220) can be smaller than that in the conventional device.

In the illustrated example, the optical paths to the first mirror 220 falling within the angular range from 65° to 125° with respect to the light radiation direction are shown.

Figure 8:
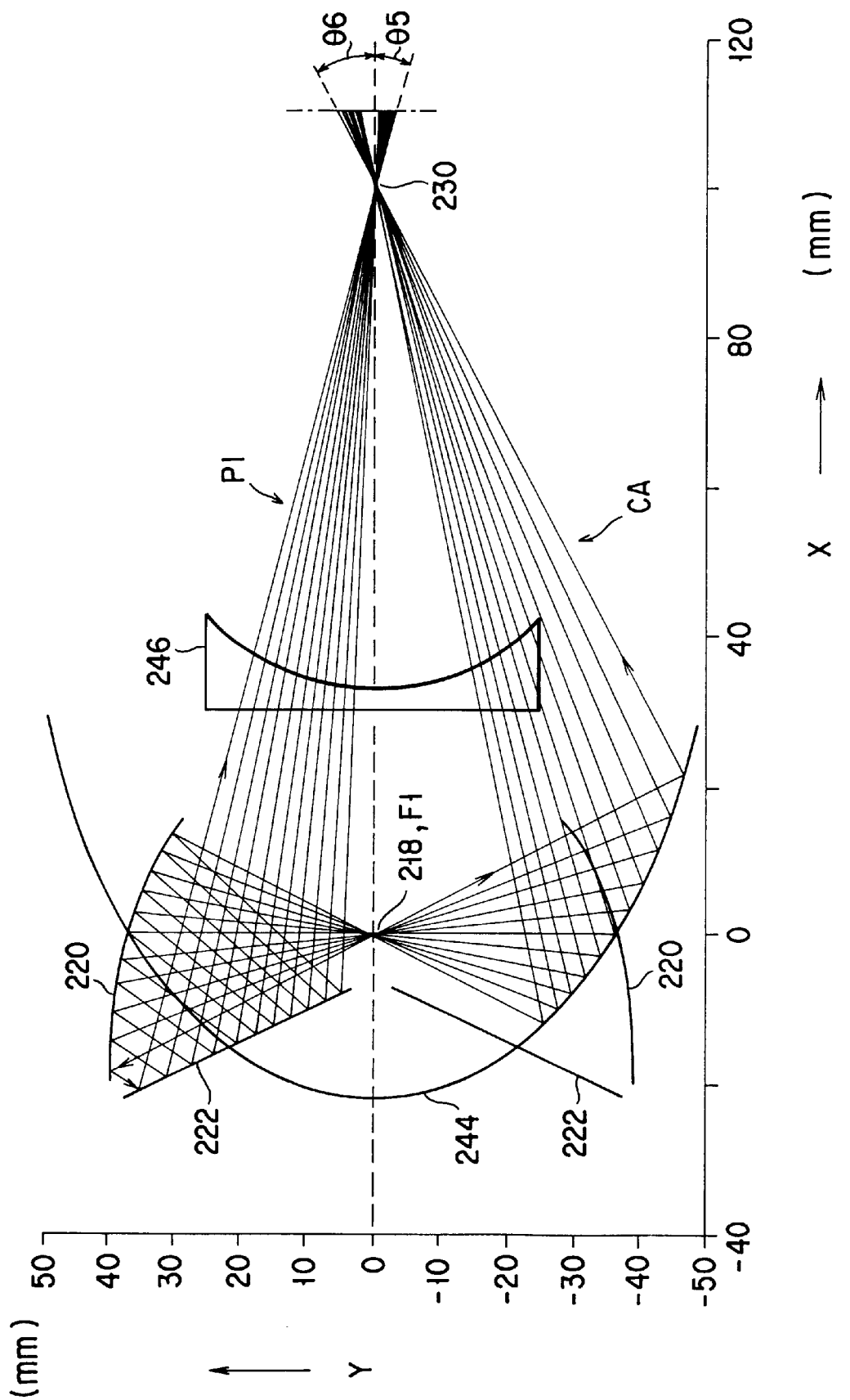
FIG. 8 is a view showing the evaluation results of effectiveness for a lens inserted in the device shown in FIG. 7.

FIG. 8 shows the evaluation results of effectiveness of light coming from the light source device shown in FIG. 7 with respect to a lens. In FIG. 8, a concave lens 246 that forms a focal point at the position of the converging portion 230 is inserted in front of the light source device to obtain collimated light, and other arrangements are the same as those in FIG. 7. In the illustrated example, the optical paths of collimated light components after the concave lens are not shown to clarify the difference from the conventional device.

As may be evident from FIG. 8, in case of the device PI according to the embodiment of the present invention, since the divergence angle θ5 of the focused light is as small as about 15°, all the light components reflected by the second mirror 222 can enter the concave lens 246 and can be efficiently used. By contrast, only nearly half the light components reflected by the reflection mirror 244 of the conventional device CA can enter the concave lens 246, resulting in considerably poor efficiency.

Therefore, even in an applied apparatus that must use a laser device due to low use efficiency of reflected light of the conventional device, the device of the present invention can be used. The device of the present invention can improve the use efficiency of reflected light and, hence, the applied apparatus can be realized using an inexpensive, general lamp device in place of the laser device.

The precisions of the converging positions of the device of the present invention and the conventional light source device will be compared. In each device described above, the light source is considered as a point light source in principle. However, in this case, converging point deviations produced when the point light source has slightly shifted in the X-direction (the horizontal direction on the plane of the drawing) and Y-direction (the vertical direction on the plane of the drawing) will be examined.

Converging point deviation produced when the light source has shifted in the X-direction will be described below.

Figure 9:
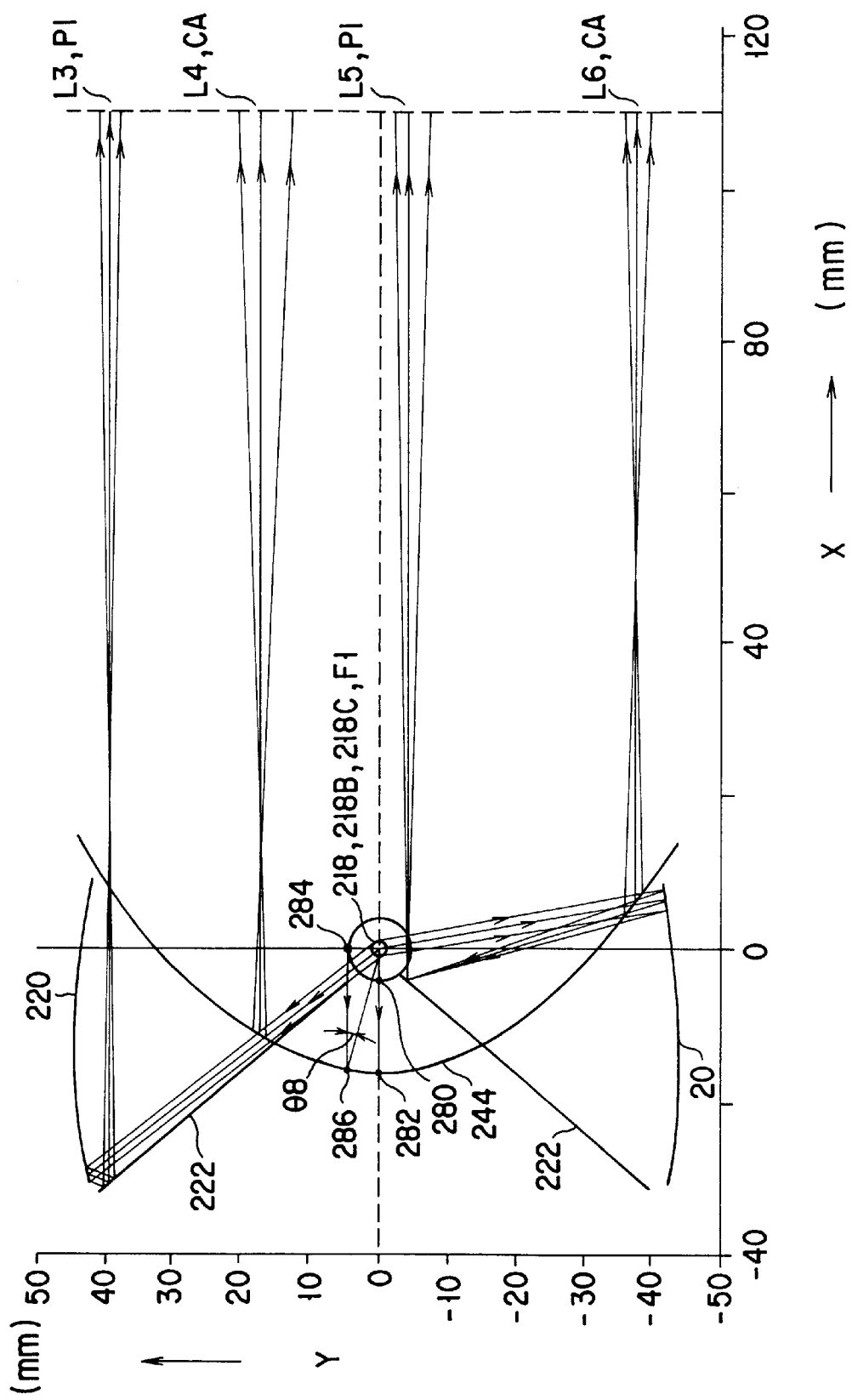
FIG. 9 is a view for comparing the precisions of the converging positions in the device of the present invention and the conventional device when the light source has a shift in the X-direction.
Figure 10:
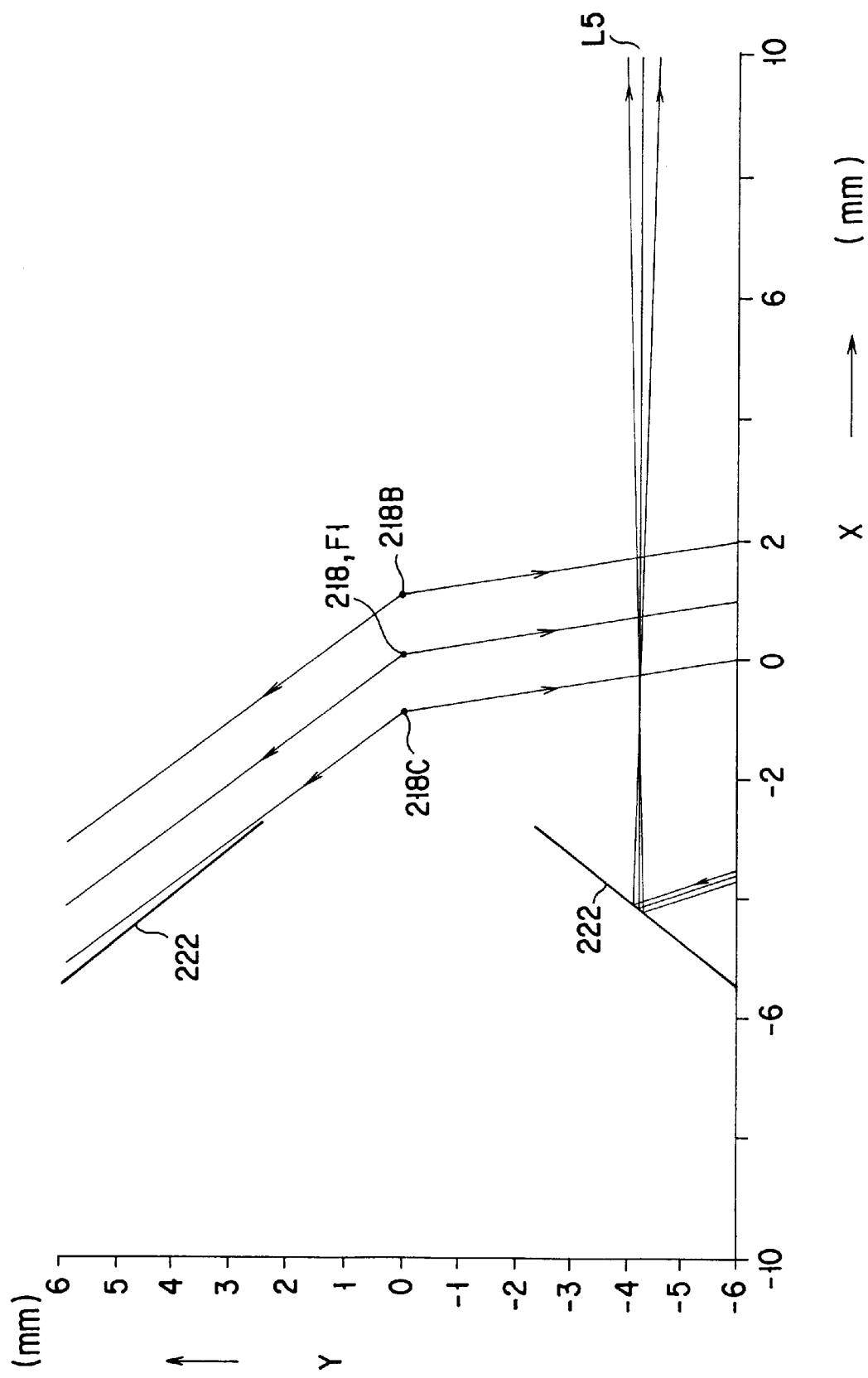
FIG. 10 is an enlarged view showing the vicinity of the light source in FIG. 9.

FIG. 9 is a view for comparing the precisions of the converging positions of the device PI of the present invention and the conventional device CA when the light source has shifted in the X-direction, and FIG. 10 is an enlarged view showing the vicinities of the light source in FIG. 9. FIG. 9 also superposes the device of the present invention and the conventional device on each other, and the optical paths of light components reflected by the device of the present invention and the conventional device are clearly distinguished from each other. Furthermore, to clarify the difference between the two devices, the position of the converging portion (converging point) is set at a position as far as approximately infinity. In other words, the sectional shape of the reflection surface of the first mirror 20 forms a parabola. Also, the outer diameters of the respective reflection surfaces are set to be the same as those in FIGS. 7 and 8.

As shown in FIG. 10, the light source 218 is considered as a point light source in this case, and light sources 218B and 218C have offsets by shifting the light source 218 by +1 mm and −1 mm in the X-direction.

The precision is evaluated by observing the degree of divergence of reflected light at a position about 110 mm in front of the light source 218. In the illustrated examples, the light components reflected by the front and rear portions of the first mirror 220 are shown as representative ones.

As may be apparent from FIGS. 9 and 10, reflected light L3 of light (upper half in FIG. 9) that travels toward a portion behind the first mirror 220 has a degree of divergence that is greatly smaller than that of reflected light L4 of the conventional mirror 224, and has good converging precision. On the contrary, reflected light L5 of light (lower half in FIG. 9) that travels toward a portion in front of the first mirror 220 has a degree of divergence that is considerably larger than that of reflected light L6 of the conventional mirror 244, and a result opposite to the above-mentioned case is obtained.

More specifically, when light is reflected on the side in front of the light source 218 (on the side of the light radiation direction), the converging precision of the reflected light of the device of the present invention is inferior to that of the conventional device. Hence, the two devices seem to have a small difference in precision. However, an actual light source device is normally designed so that light is reflected on the side behind the light source 218. Therefore, totally, the converging precision of the device of the present invention is superior to that of the conventional device.

Errors of a mirror reflection optical system arise from the finite size of the light source. Light emitted from a point 280 in FIG. 9 toward a point 282 propagates along a mathematically normal optical path, but light emitted from a point 284 toward a point 286 suffers an angular error of an angle θ8 from a mathematically normal angle. Although the values vary in units of angles, the angular error is proportional to the size of light source and is inversely proportional to the distance to the mirror. Upon comparing the device of the present invention with the conventional mirror, the distance between the light source and mirror is considerably different from that in the conventional device, and the angular error can be minimized.

Converging point deviation upon shifting the light source in the Y-direction will be explained below.

Figure 11:
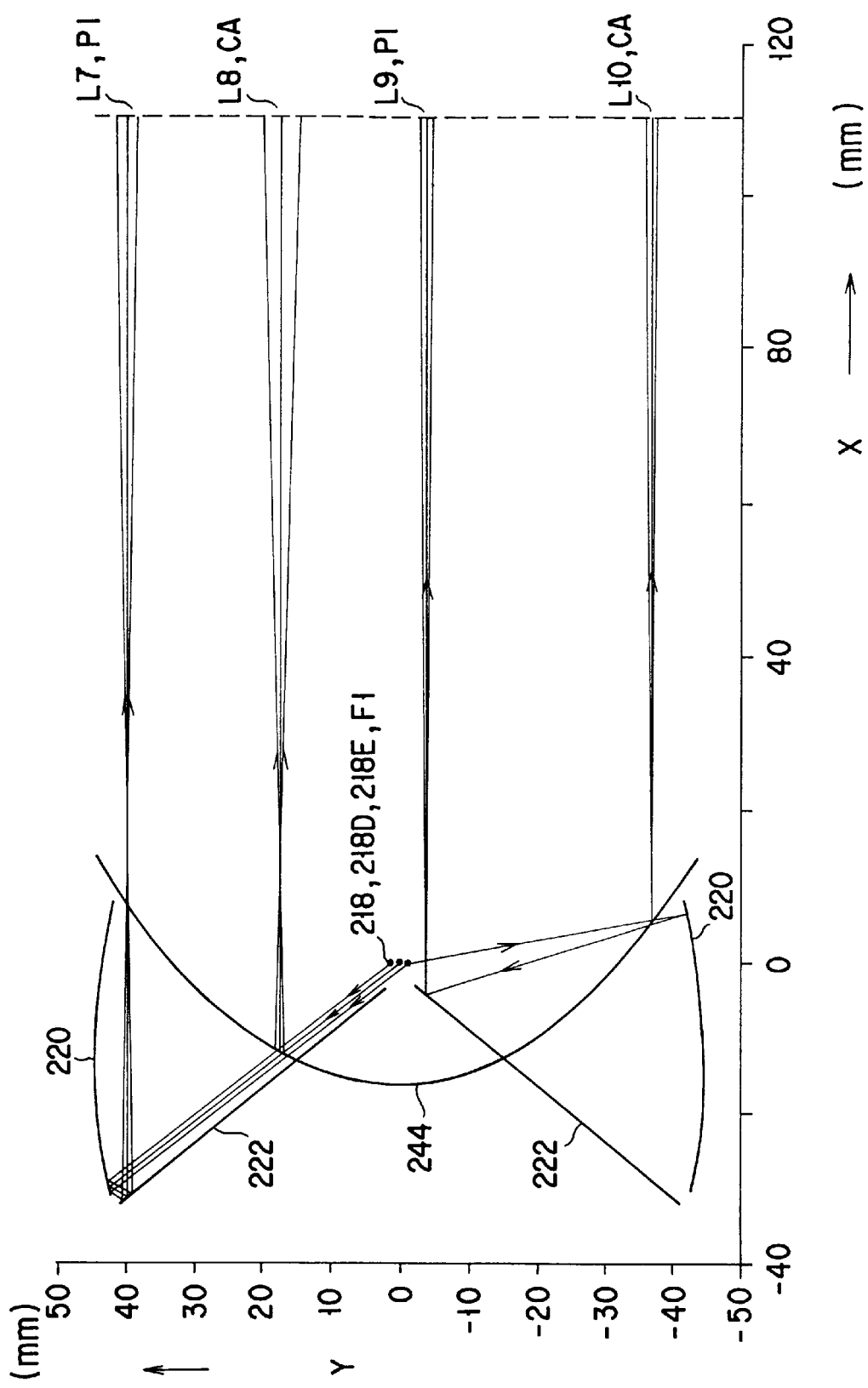
FIG. 11 is a view for comparing the precisions of the converging positions in the device of the present invention and the conventional device when the light source has a shift in the Y-direction.
Figure 12:
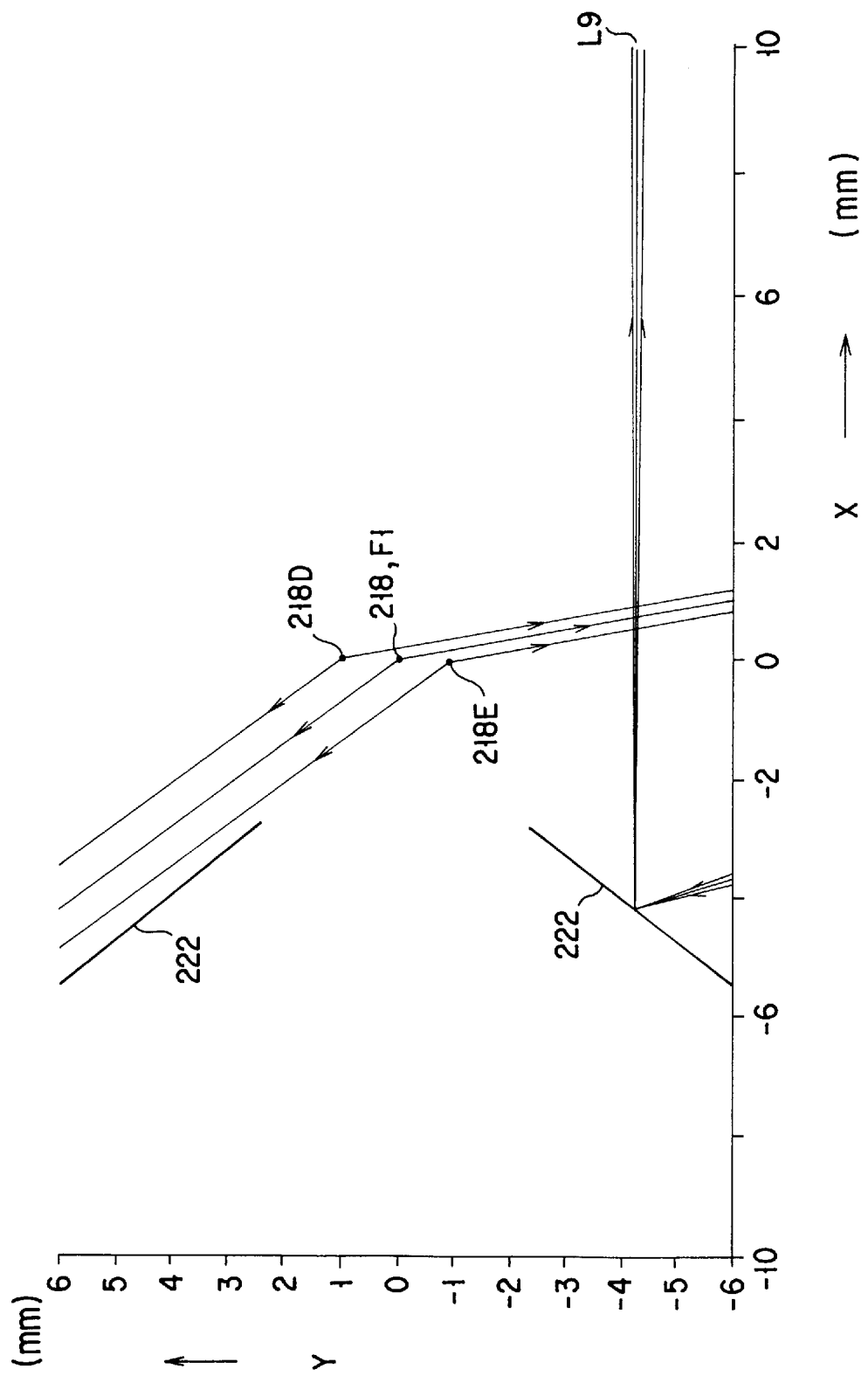
FIG. 12 is an enlarged view showing the vicinity of the light source in FIG. 11.

FIG. 11 is a view for comparing the precisions of the converging positions of the device PI of the present invention and the conventional device CA when the light source has shifted in the Y-direction, and FIG. 12 is an enlarged view showing the vicinities of the light source in FIG. 11. The descriptions of the respective mirrors are the same as those in FIGS. 9 and 10.

As shown in FIG. 12, the light source 218 is considered as a point light source in this case, and light sources 218D and 218E have offsets by shifting the light source 218 by +1 mm and −1 mm in the Y-direction.

As may be apparent from FIGS. 11 and 12, reflected light L7 of light (upper half in FIG. 11) that travels toward a portion behind the first mirror 220 has a degree of divergence that is greatly smaller than that of reflected light L8 of the conventional mirror 224, and has good converging precision. On the contrary, reflected light L9 of light (lower half in FIG. 11) that travels toward a portion in front of the first mirror 220 has a degree of divergence that is nearly equivalent to that of reflected light L10 of the conventional mirror 244. Consequently, the converging precision of the device of the present invention is superior to that of the conventional device.

Figure 13:
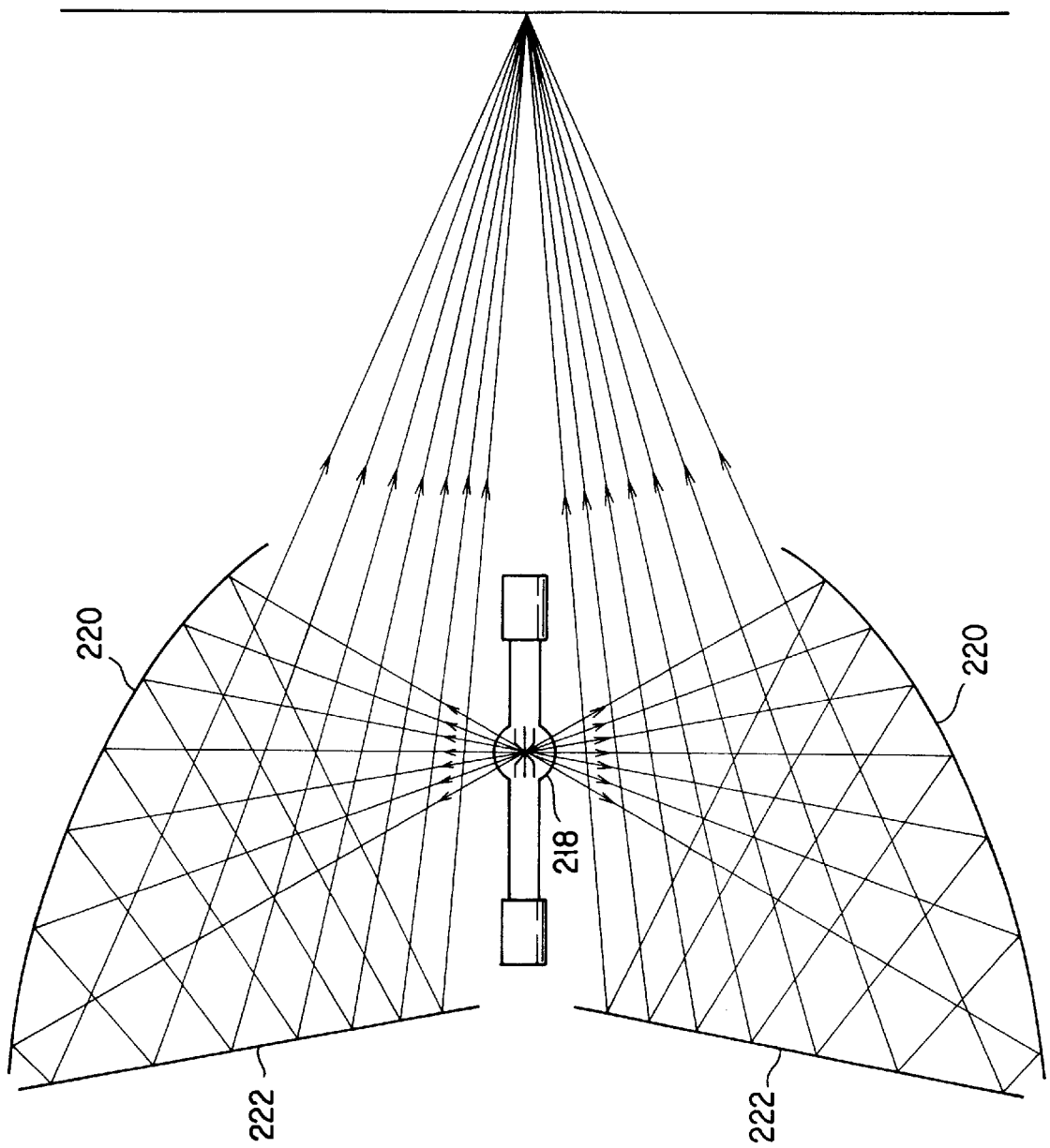
FIG. 13 is a view showing the arrangement of an example in which the device of the present invention is applied to a lamp that obtains emitted light upon generation of arcs.

FIG. 13 shows an example in which the device of the present invention is applied to a lamp (light source) which obtains radiation light by generating arcs by a discharge of, e.g., a xenon lamp or the like. Although no comparative view is prepared, the divergence angle of light incident on the object is nearly halved as compared to the conventional mirror. When the object is to be heated, light components reflected by the surface of the object decrease.

As can be understood from the above description, according to the present invention, even when the light source has shifted from the focal point F1 in the X- or Y-direction and has an offset, light having higher converging precision and higher intensity than those of the conventional device can be obtained. A lamp as an actual light source emits light by heating a filament or the like. When the filament is as small as it can be considered as a point light source, errors at the converging points need not be considered. However, in practice, the filament has certain dimensions in the directions of its length and width, and this leads to errors. In such case, according to the device of the present invention, the errors can be minimized.

An embodiment for obtaining collimated light by the device of the present invention will be described below.

Figure 14:
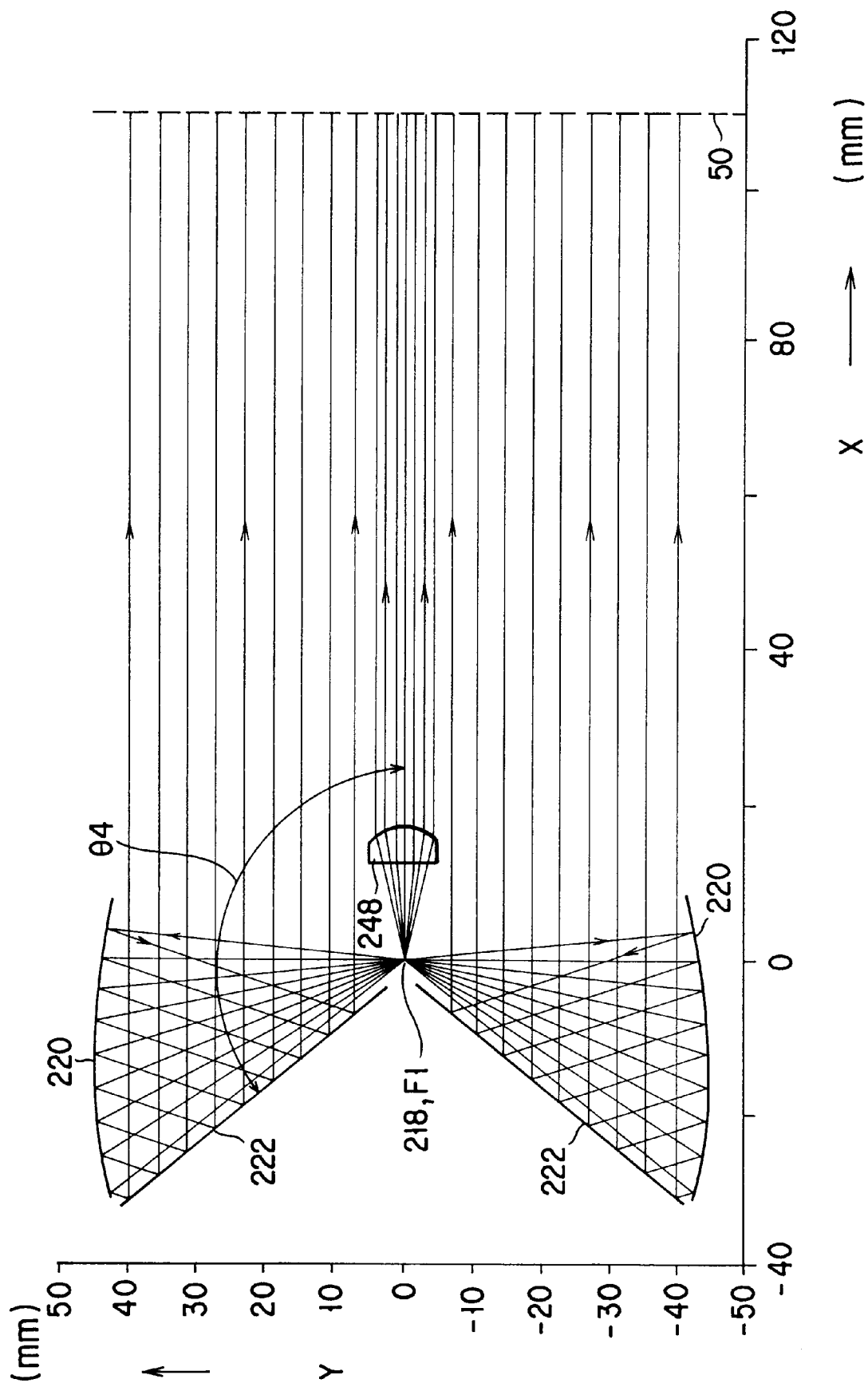
FIG. 14 is a perspective view showing a light source device that obtains collimated light according to an embodiment of the present invention.

FIG. 14 shows an embodiment of the device of the present invention, which obtains collimated light. More specifically, this light source device has substantially the same arrangement as that described above with reference to FIGS. 9 and 11, and is designed to set the converging portion (see FIG. 7) at infinity. At this time, the sectional shape of the reflection surface of the first mirror forms a parabola. In other words, the parabola is a variation of ellipses, the other focal point of which is located at infinity. In this case, the tilt angle θ4 of the second mirror 222 is set at about 127°.

A convex lens 248 with a small diameter is inserted in front of the light source 218 to also use light emitted forward from the light source 218 as collimated light.

Figure 17:
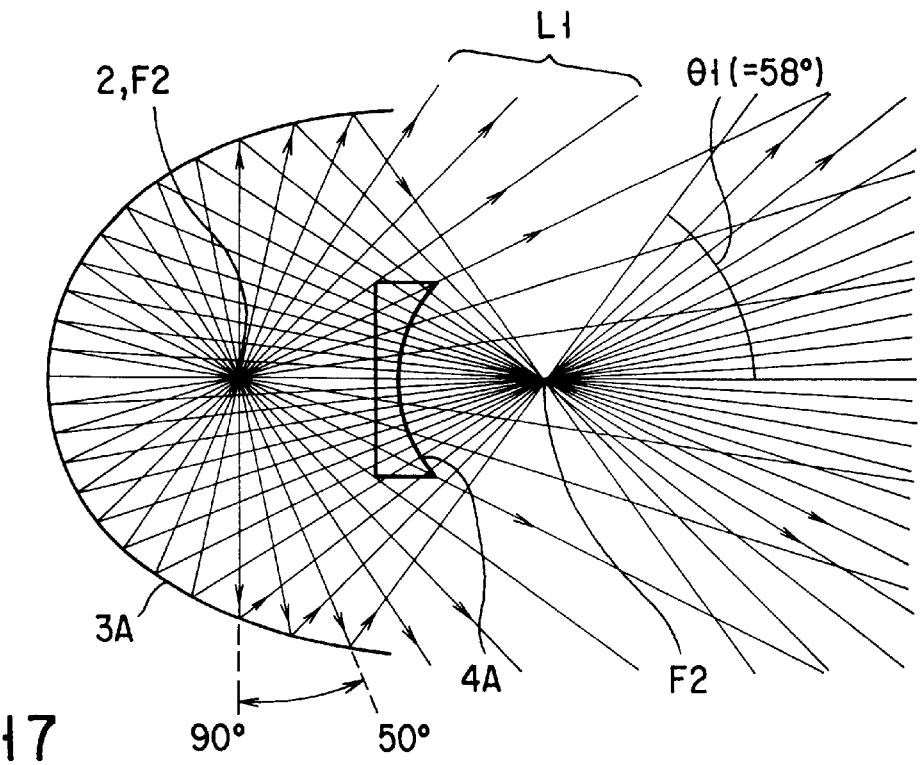
FIG. 17 is a view showing a conventional focusing mirror device.
Figure 18:
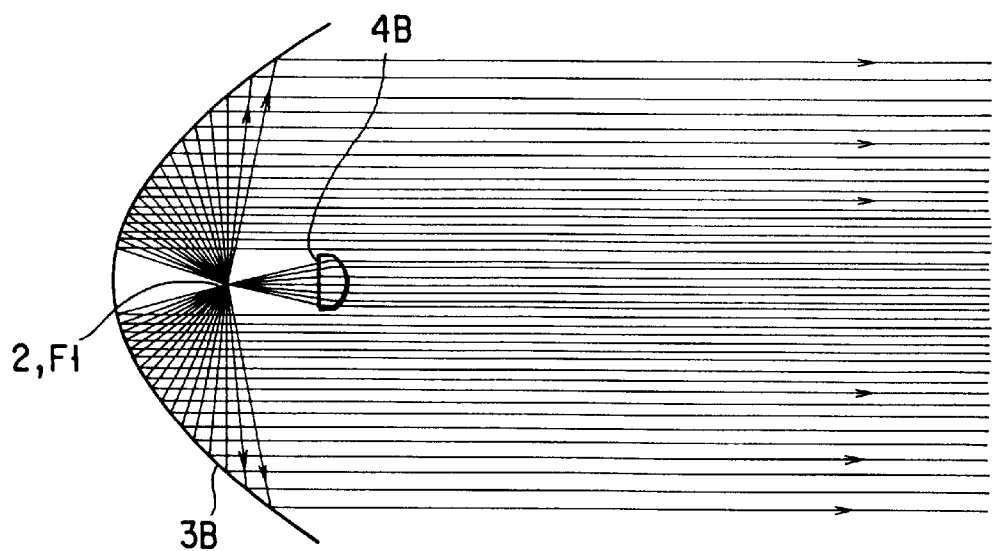
FIG. 18 is a view showing another conventional focusing mirror device.

Comparison between the light intensity distributions of collimated light obtained by the device of the present invention shown in FIG. 14 and that obtained by the conventional device shown in FIG. 17 will be explained below.

Figure 15:
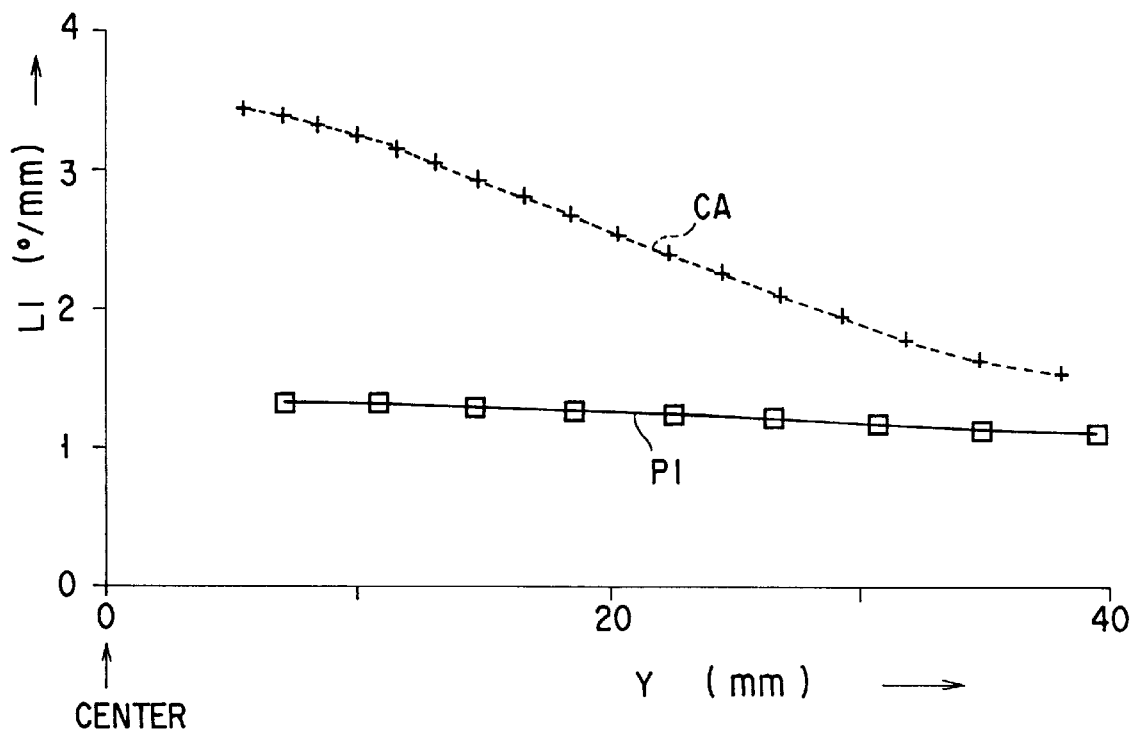
FIG. 15 is a graph showing the light intensity distribution of collimated light in the device of the present invention and the conventional device.

FIG. 15 is a graph showing the light intensity distributions of collimated light obtained by these devices, and a light intensity distribution at a predetermined position is obtained by differentiating the divergence angle of light that originates from the light source 218 and reaches a focusing plane 250 by the distance to the focusing plane 250.

As can be seen from the graph, in case of the conventional device CA, the light intensity gradually lowers as the distance from the center becomes larger. However, in case of the device PI of the present invention, the light intensity is roughly constant. Therefore, the device PI of the present invention has a nearly constant light intensity independently of the distance Y from the center and a uniform distribution of the light amount LI, as compared to the conventional device CA.

Hence, when a given surface is to be uniformly heated, the device of the present invention can provide better planar uniform heating characteristics. In this case, when a rod-like light source such as a fluorescent lamp and an elongated mirror shown in FIG. 4 are used in place of the doom-shaped reflection mirror shown in FIG. 11, a given rectangular surface can be uniformly heated.

Figure 16:
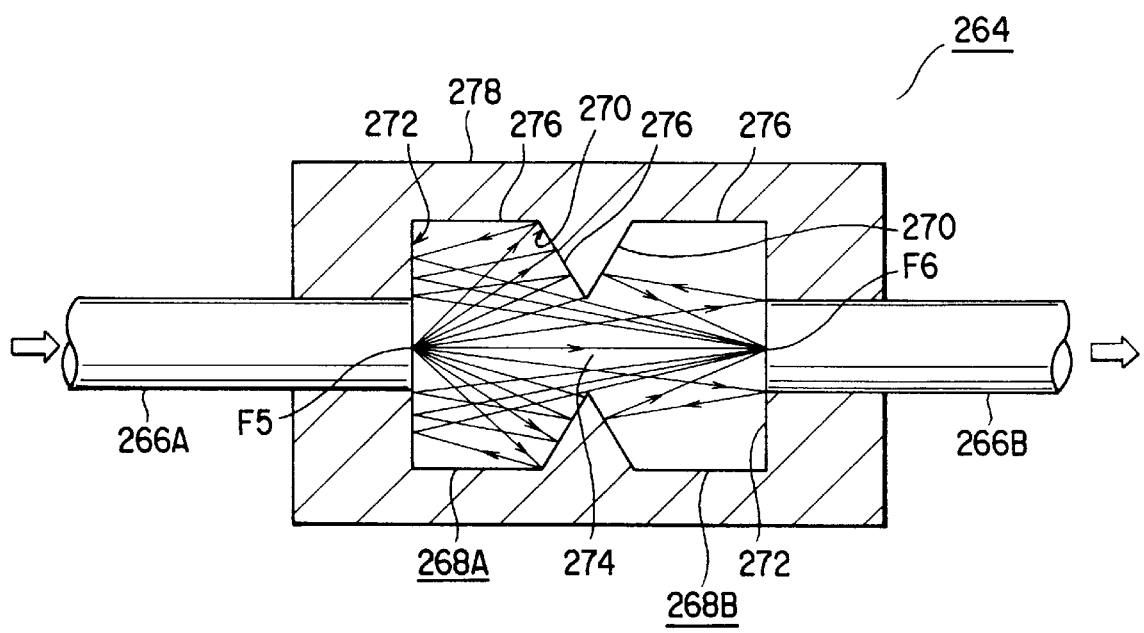
FIG. 16 is a sectional view showing an optical fiber connection optical member according to an embodiment of the present invention.

The above embodiments have exemplified the reflection mirror device and light source device using the same. Based on the above-mentioned convergence principle, an optical fiber connection optical member can also be constituted. FIG. 16 is a sectional view showing an example of such optical fiber connection optical member.

An optical member 264 is used for optically connecting two optical fibers 266A and 266B, and is formed into a bobbin shape by joining two reflection optical elements 268A and 268B having the same structure so that their distal ends face each other.

Each of the elements 268A and 268B has a first mirror surface 270 having an elliptic section, and a second mirror surface 272 having a linear section. The first mirror surface 270 corresponds to the reflection surface of the above-mentioned first mirror 220, and the second mirror surface 272 that of the second mirror 222. The two second mirror surface 272 have central openings, to which the end portions (end faces) of the optical fibers 266A and 266B are connected. Light entering from one optical fiber is reflected inside the element, and is guided into the other element via a central light passage window 274. The light is then directed to the other optical fiber 266B.

In the mirror shown in FIG. 2, the upper and lower elliptic arcs 232A and 232B of the elliptic section of the reflection surface of the first mirror 220 are set so that one focal point F1 is set at a common position, and the other focal points F2 and F3 are set at different positions. By contrast, in this fiber optical element, the section of the first mirror surface 270 is expressed by an elliptic arc of a single ellipse. Taking the left element 268A as an example in FIG. 16, one focal point F5 is set at the central portion of the end face of the optical fiber 266A, and the other focal point F6 is set at the central portion of the end face of the other optical fiber 266B. The same relationship applies to the other element 268B.

The tilt angle θ4 the second mirror surface 272 makes with the central line 234 is set at 90°. Such element can be formed of, e.g., a transparent material such as plastic, and a plating layer 276 can be formed on its peripheral surface. The entire element may be housed in a protection case 278 to improve durability.

In the illustrated example, light entering from the end face of the left optical fiber 266A is reflected by the first and second mirror surfaces 270 and 272 of the left element 268A, and then enters the right element 268B via the light passage window 274. The light reaches the end face of the right optical fiber 266B. Note that light entering from the end face of the left fiber 266A with a divergence angle falling within the range from about 0° to 15° directly enters the right element 268B without being reflected by the inner surface of the left element 268A, and then enters the end face of the right optical fiber 266B after it is reflected by the inner surface of the element 268B.

With this arrangement, light coming from the end face of the optical fiber with a divergence angle falling within the range from 0° to 50° can be efficiently sent to the other optical fiber.

Still another embodiment of the present invention will be described below.

As described above, in the conventional light source device, the diffusion angle increases due to angular errors arising from the finite size of the light source, and a sufficiently high energy density cannot be set. In order to prevent such problem, in the present invention, a discharge lamp in which the diameter of a portion for emitting light in practice is as very small as about 0.3 mm and which generates discharge arcs is used in place of a lamp using a filament, in which the diameter of a portion for emitting light in practice is as large as about 3 mm. With this discharge lamp, any angular errors caused by the size of the light source can be minimized to obtain a high energy density.

Figure 52:
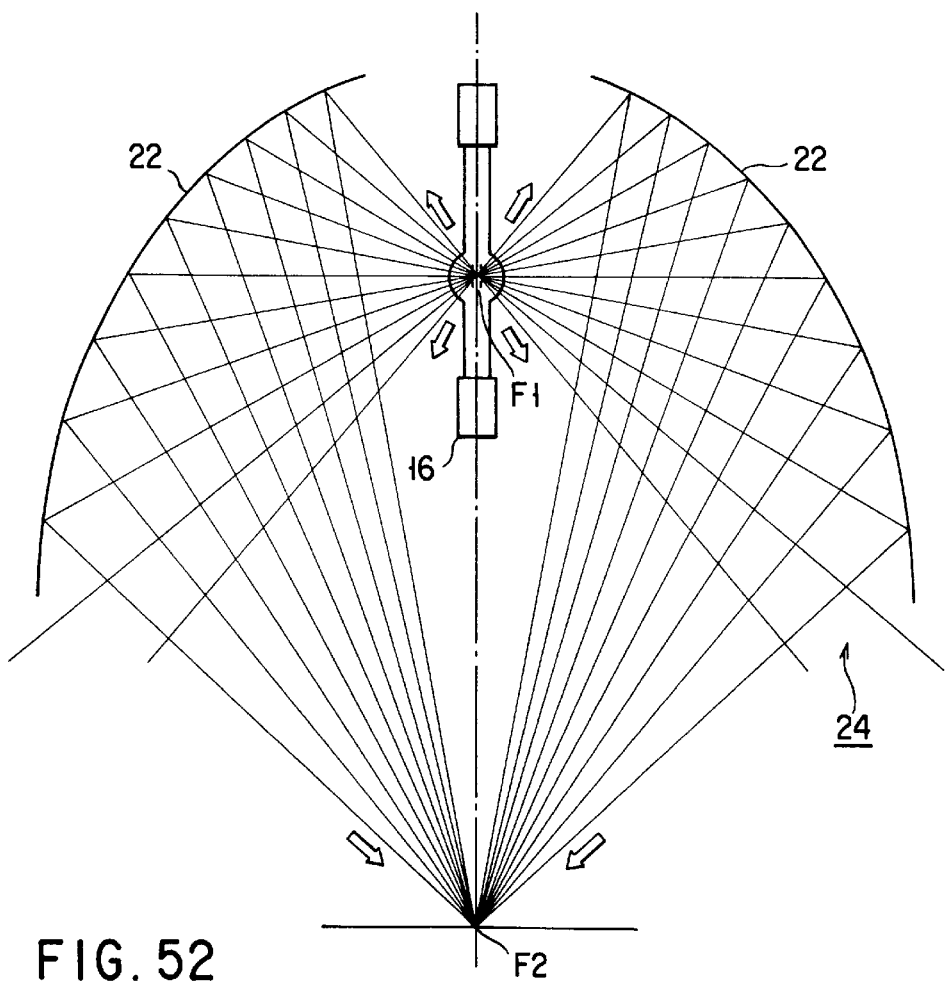
FIG. 52 is a view showing the principle of the light source shown in FIG. 19.
Figure 53:
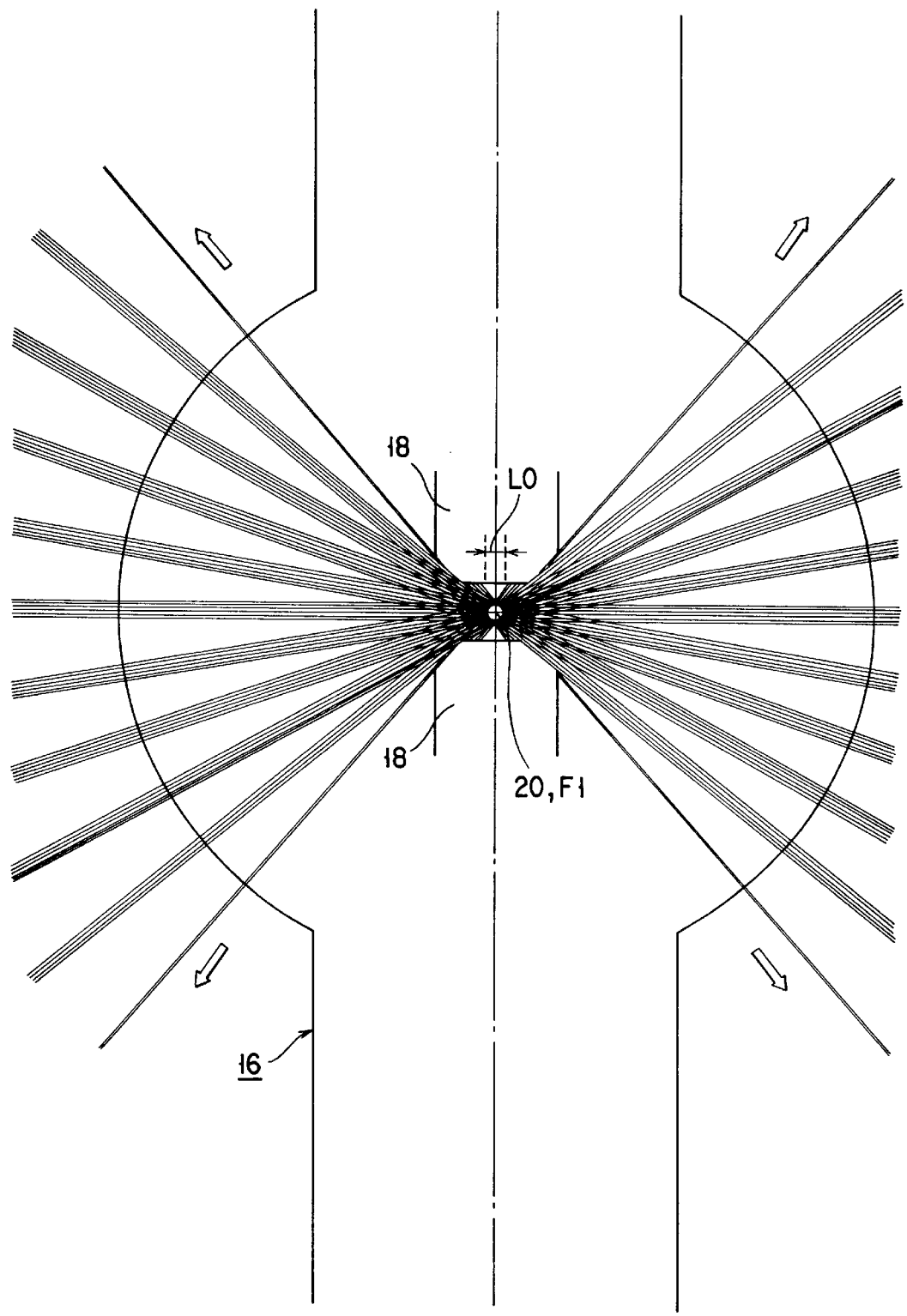
FIG. 53 is an enlarged view showing a light source portion in FIG. 52.
Figure 54:
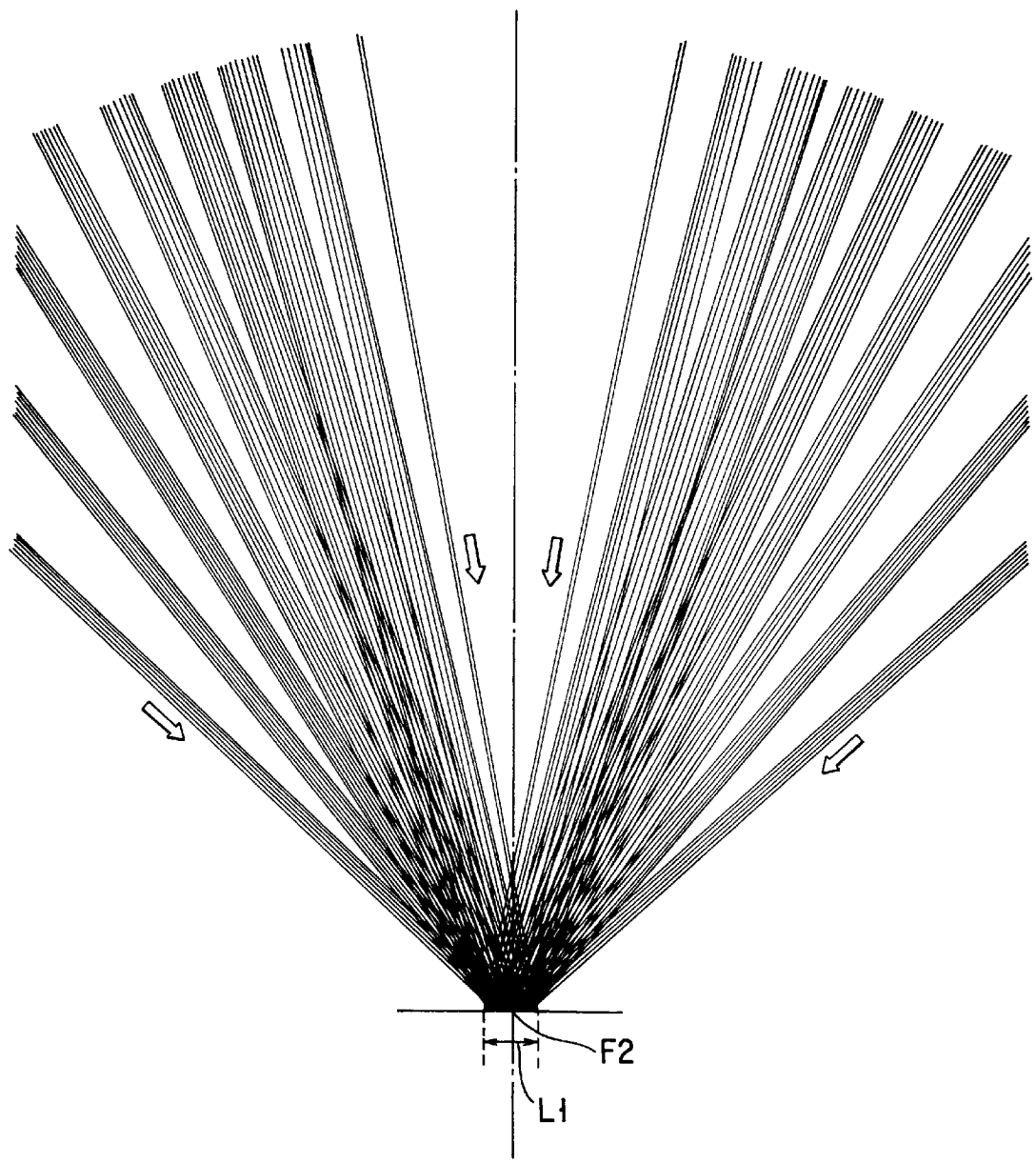
FIG. 54 is an enlarged view showing a converging portion in FIG. 52.
Figure 55:
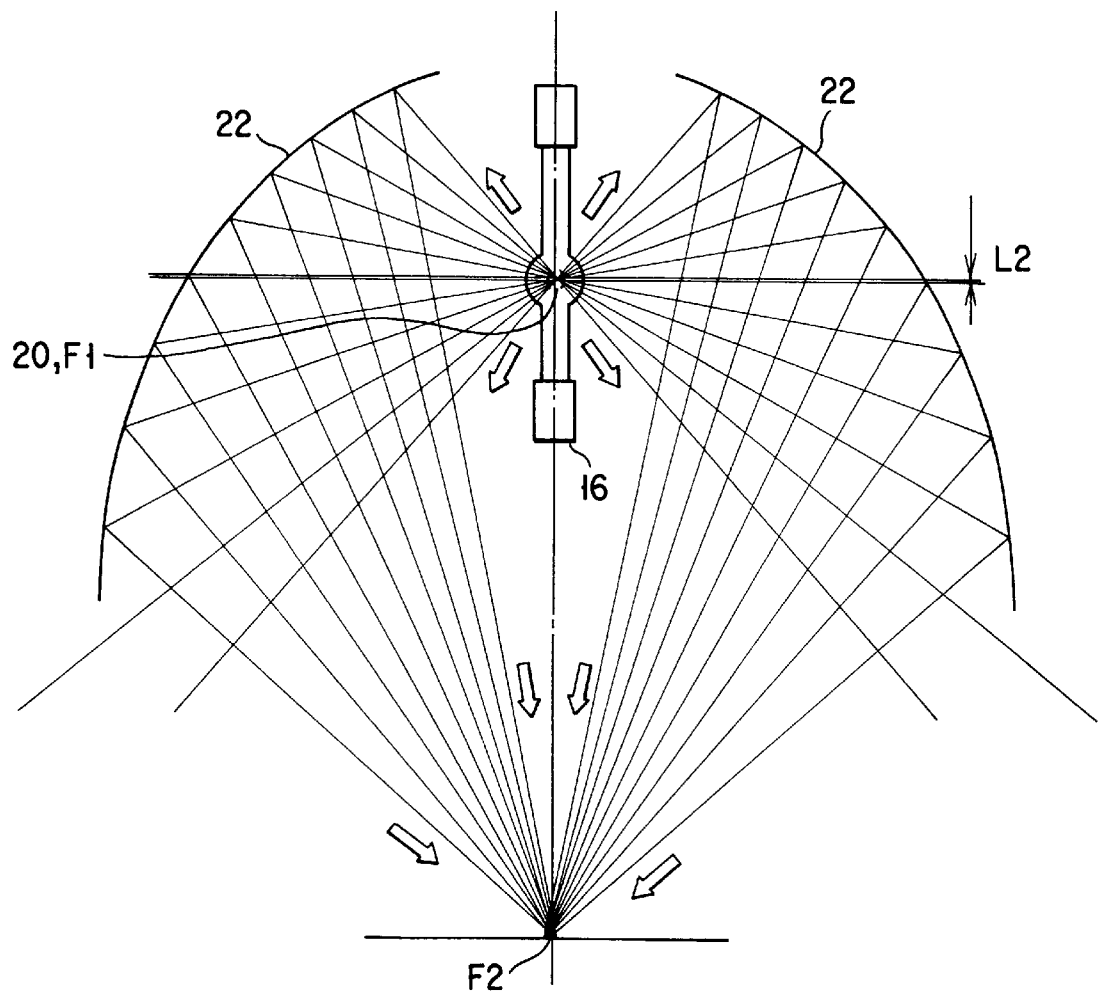
FIG. 55 is a view showing the state wherein a discharge lamp in FIG. 52 has a shift of 0.5 mm from a normal position.
Figure 56:
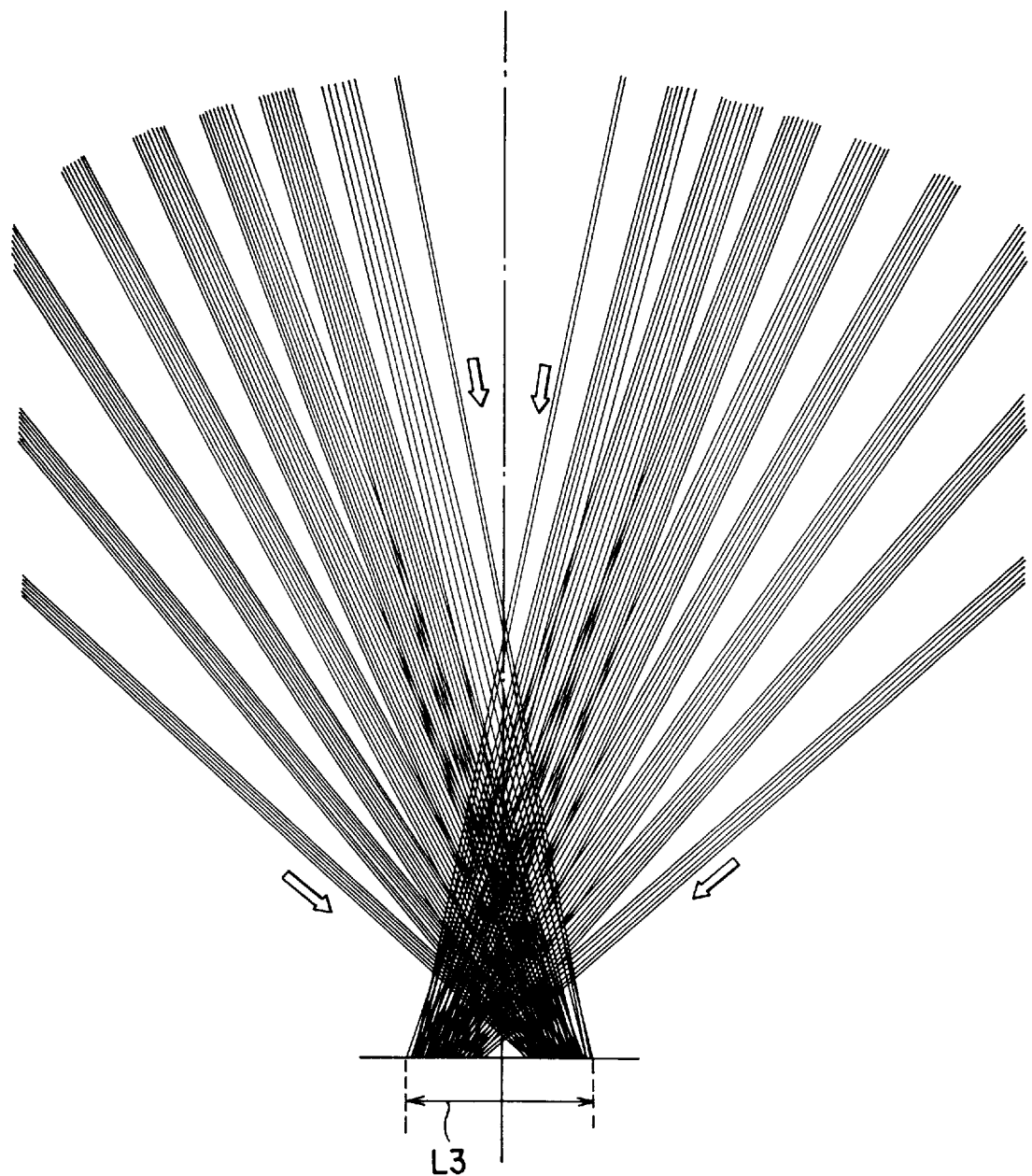
FIG. 56 is an enlarged view showing a converging portion in FIG. 55.

FIG. 52 shows the principle of a light source device using a discharge lamp as a light source, FIG. 53 is an enlarged view showing a light source portion in FIG. 52, and FIG. 54 is an enlarged view showing a converging portion in FIG. 52. FIG. 55 shows the state wherein the discharge lamp in FIG. 52 is offset from a normal position by 0.5 mm, and FIG. 56 is an enlarged view showing a converging portion in FIG. 55.

In the illustrated example, reference numeral 16 denotes a discharge lamp such as a xenon lamp. Two electrodes 18 (See FIG. 53) are disposed in the lamp 16 to have a small gap therebetween, and light is emitted by generating arcs between the two electrodes 18. At this time, a diameter L0 of an emission point 20 of the arcs is around 0.3 mm, and it can be substantially considered as a point light source. In the illustrated example, the diameter of the emission point 20 is set at 0.3 mm.

Note that the diameter of the filament of a rod-like halogen lamp having a so-called fluorescent lamp shape is around 3 mm, and is considerably larger than the emission point of an arc. On the other hand, in case of a halogen lamp used in the home and having a shape of a white lamp, its filament normally has a diameter of 10 mm and a length of 20 mm, and is still larger than the emission point. The size of the filament is determined by the relationship between the output of the lamp, i.e., the current to be supplied, and the temperature of the filament, and cannot be reduced.

A reflection mirror 22 having an elliptic section is disposed around the discharge lamp 16. One end of the reflection mirror 22 is open to form a radiation opening 24. In the discharge lamp 16, the emission point is precisely located at a first focal point F1 of the reflection mirror 22 with an elliptic section, and the reflection mirror 22 focuses light to a second focal point. Note that the diameter of the reflection mirror 22 with an elliptic section is set at 200 mm in this embodiment.

FIG. 53 shows the arc discharge portion at the center in FIG. 52 in an enlarged scale, and represents light components radiated from the emission point 20 in all the directions by those emitted by points in directions of 40°, 50°, 60°, 70°, 80°, 90°, 100°, 110°, 120°, 130°, and 140° on the perimeter of the emission point 20 having a diameter of 0.3 mm. Since the emission point 20 has a finite size, when light in a specific direction is extracted, it seems like a light beam having a width equal to the size of the light source.

FIG. 54 is an enlarged view at the second focal point F2 as the converging point at this time. As can be seen from FIG. 54, the focused light reaches a circular range having a diameter L1 of about 1 mm. When the emission point 20 is precisely located on the first focal point F1, light can be focused while restricting the divergence of light to the circular range having a diameter of approximately 1 mm at the converging point.

The power of the discharge lamp 16 at that time is 75 W (watts), and the energy density becomes about 4,700 W/cm$^2$ at efficiency=50%. More specifically, performance much better than the energy density=400 W/cm$^2$ of a commercially available carbon dioxide laser can be theoretically realized. When the diffusion angle of the discharge lamp 16 is converted into that of collimated light, it is 5.0 mrad (0.28°). The carbon dioxide laser used as the control has an output of 8 W, a beam diameter of 1.6 mm, and a diffusion angle of 8.4 mrad.

As described above, the light source device as a combination of the discharge lamp 16 and reflection mirror 22 having an elliptic section has a potential of exhibiting performance higher than that of a laser as, e.g., a heating source. As is known, a laser repetitively reflects and amplifies light induced and emitted from a gas ionized by a discharge using two opposing mirrors, and picks up some light components (e.g., 1%) by passing them through a mirror. Hence, in terms of the structure, the light source device as a combination of a discharge lamp and elliptic mirror should be more efficient as an energy source than the laser.

However, such a light source device utilizing the discharge lamp and elliptic mirror is limited in usage, and is hardly used as a heating source for generating heat at a high energy density. This is because the emission point 20 of the discharge lamp 16 must be precisely set at a normal position of the reflection mirror having an elliptic section, i.e., at the first focal point F1. If the emission point 20 has an offset, the beam spot size at the converging point, i.e., the second focal point F2 becomes large, and focusing performance deteriorates considerably.

This point will be explained below with reference to the accompanying drawings. FIG. 55 shows the converging state obtained when the emission point is offset by a small distance L2 (e.g., 0.5 mm) from the normal position as compared to FIG. 52 above, and FIG. 56 is an enlarged view at the converging point in FIG. 55. As can be seen from FIGS. 55 and 56, when the emission point 20 is slightly offset by 0.5 mm, light diverges in a circular range having a diameter L3 of about 4 mm, and the energy density lowers drastically. More specifically, in the light source device as a combination of a discharge lamp and mirror having an elliptic section, the position of arc discharge must be accurately set in correspondence with its size.

However, it is very hard to determine the position of arc discharge with the above-mentioned positional precision. This is because the arc position moves along with temperature rise of the electrodes, and it is difficult to confirm the arc position.

In general, the temperature of the central portion of arc discharge reaches an absolute temperature of 6,000° or higher, and even the pin base of the discharge lamp becomes 200° C. For this reason, the electrodes are displaced, and the arc position must be confirmed and adjusted in a state wherein the discharge lamp has stable temperature.

In a normal optical system, adjustment is done by placing some object at the focal point position, and observing a spot formed at the focal point. This adjustment method is to optimize three-dimensionally defined position errors using two-dimensional data, i.e., the spot formed on the object. Hence, this method is simple but information obtained is not enough. When this method is applied to an optical system comprising a discharge lamp, the object melts down due to too high an energy density, and the spot state is hardly confirmed.

Furthermore, in the light source device shown in, e.g., FIG. 52, the reflection mirror 22 having an elliptic section can focus light reflected thereto to one point with approximately high precision if the positional precision of the emission point 20 is improved. However, such light source device suffers the second problem. That is, light, which is directly emitted by the emission point 20 forward, i.e., toward the second focal point F2 side without being reflected by the reflection mirror 22, cannot be used at all.

Even when light falls within the angular range that can be reflected by the reflection mirror 22, the above-mentioned diffusion errors become large, and the energy density at the focal point cannot be increased, thus posing the third problem. In FIG. 54, the width of light, which is reflected by the distal end portion of the reflection mirror and becomes incident on the object at a shallow angle, is small, but the width of light, which is reflected by a position close to the light source lamp of the reflection mirror, is large, thus disturbing the effect of increasing the energy density.

FIG. 54 shows the range from 40° to 130°. The effect of increasing the energy density for light falling within the range from 90° to 130° is half or less that for light falling within the range from 40° to 90°. As can be easily understood from the above description, this is because the above-mentioned diffusion error is proportional to the size of the light source, and is inversely proportional to the distance from the light source to the reflection mirror. The portion close to the light source lamp of the reflection mirror is not so effective in terms of increasing the energy density.

In the above description, the problems posed upon emitting light by one point, i.e., emission point, of the discharge lamp 16 have been discussed. Also, the same problems are experienced in a discharge lamp which generates an emission line, the arc generation distance of which is linearly large, e.g., a metal halide lamp for an ultraviolet setting resin, or the like. The above-mentioned problems are encountered not only in an elliptic reflection mirror, but also in a parabolic mirror which is formed by locating the second focal point of an ellipse at an infinity.

According to the present invention, a light source device which can efficiently collect and use light emitted by a discharge lamp, and can minimize its divergence angle, is provided. This can be realized by overlapping light rays emitted by a single discharge lamp within a limited angular range. Also, according to the present invention, the energy density of light emitted by the discharge lamp can be further increased. This can also be realized by overlapping light rays emitted by a single discharge lamp within a limited angular range.

A method of realizing overlapping of light rays will be briefly described below.

Note that a discharge lamp such as a xenon lamp, mercury lamp, or the like, the sectional diameter of which is essentially considered as a point light source, and a discharge lamp such as a metal halide lamp, long arc xenon lamp, or the like, which is formed into a rod shape to form an emission line, and is essentially considered as a line light source, are available as the light source, but are not particularly distinguished from each other in the following description. When the path of a light ray is examined in a section including the central line that connects the light source and focal point, both a light ray emitted by a point light source and that emitted by a line light source travel along the same path. The difference between the point and line light sources is produced upon manufacturing a reflection mirror, but is irrelevant in the description of overlapped light rays.

Figure 23:
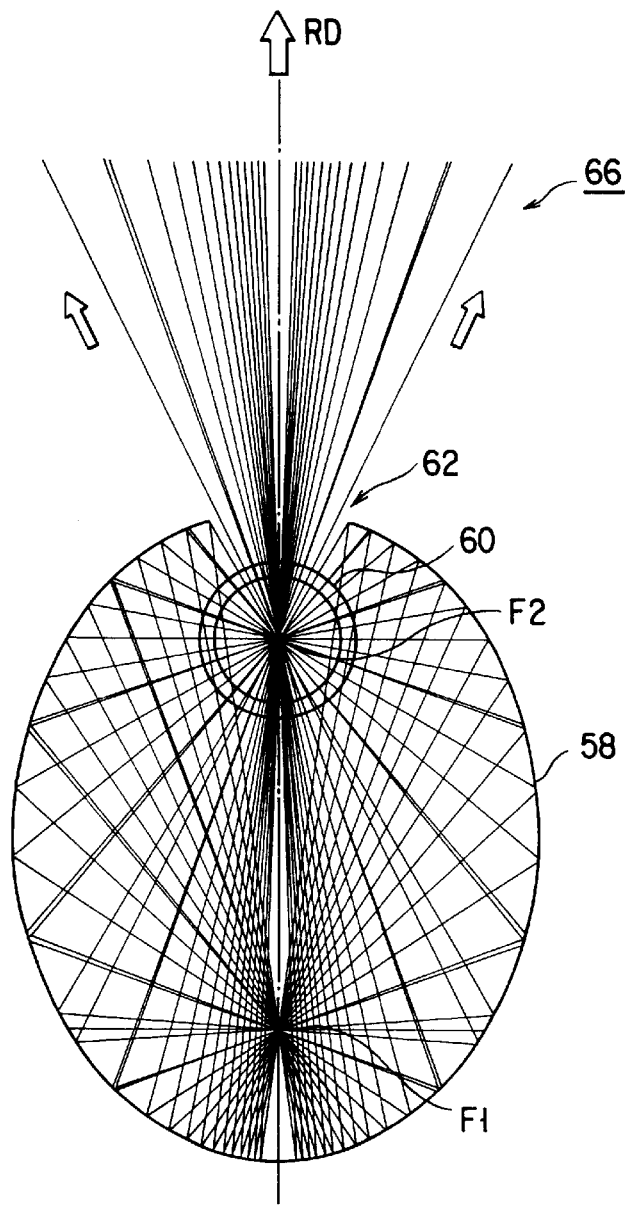
FIG. 23 is a schematic sectional view showing a light source device according to still another embodiment of the present invention.
Figure 25A:
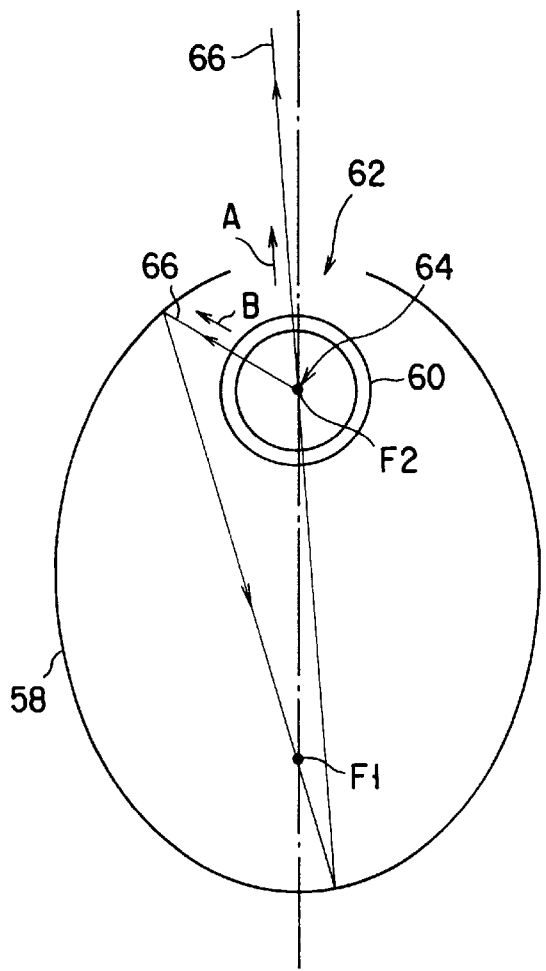
FIGS. 25A and 25B are views showing the paths of a single light ray emitted from an emission line of the device shown in FIG. 23.
Figure 25B:
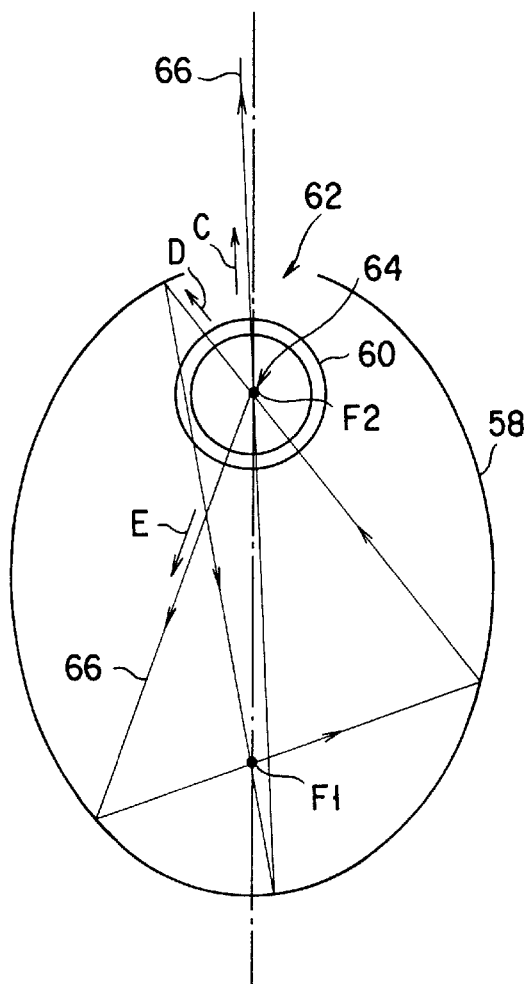

In FIG. 23, a light source is disposed at the second focal point of a reflection mirror which is formed with a radiation opening having a relatively small diameter at one end, and has an elliptic sectional shape. FIG. 23 shows the tracing results of light rays emitted by the center of the light source. FIG. 25A shows only a light ray in the 60° direction of those shown in FIG. 23, and FIG. 25B shows only a light ray in the 150° direction. In FIG. 25A, after emitted light 66 is directed in the direction B, it is reflected twice by a reflection mirror 58 to be deflected in the direction A, and finally leaves a radiation opening 62. Note that the light source also originally emits a light ray in the direction A, and the light ray emitted in the direction B and that originally emitted in the direction A trace the same path, thus overlapping the two light rays.

In FIG. 25B, light emitted by an emission line 64 in the direction E is reflected by the reflection mirror 58 to go in the direction D, and is then reflected again by the reflection mirror 58 to finally go in the direction C. The light then leaves the radiation opening 62. In this case, the light ray emitted in the direction E overlaps those which are originally emitted in the directions C and D.

As shown in FIG. 23, light rays emitted in the 360° range leave the mirror as those within a nearly 90° range from the radiation opening 62. Thus, the energy density can be increased. This overlapping can be realized only when the light source is a lamp having a structure for emitting light by, e.g., arc discharge. In a halogen lamp having, e.g., a tungsten filament, light rays are intercepted by the filament, and overlapping cannot be realized.

In the above description, the light source has been explained as a point having no size. However, even in a lamp with a structure for emitting light by arc discharge, the arc is small but has a finite size. The structure shown in FIG. 23 suffers a problem that the diffusion angle of light rays to be overlapped increases due to the finite size of the light source.

Figure 26:
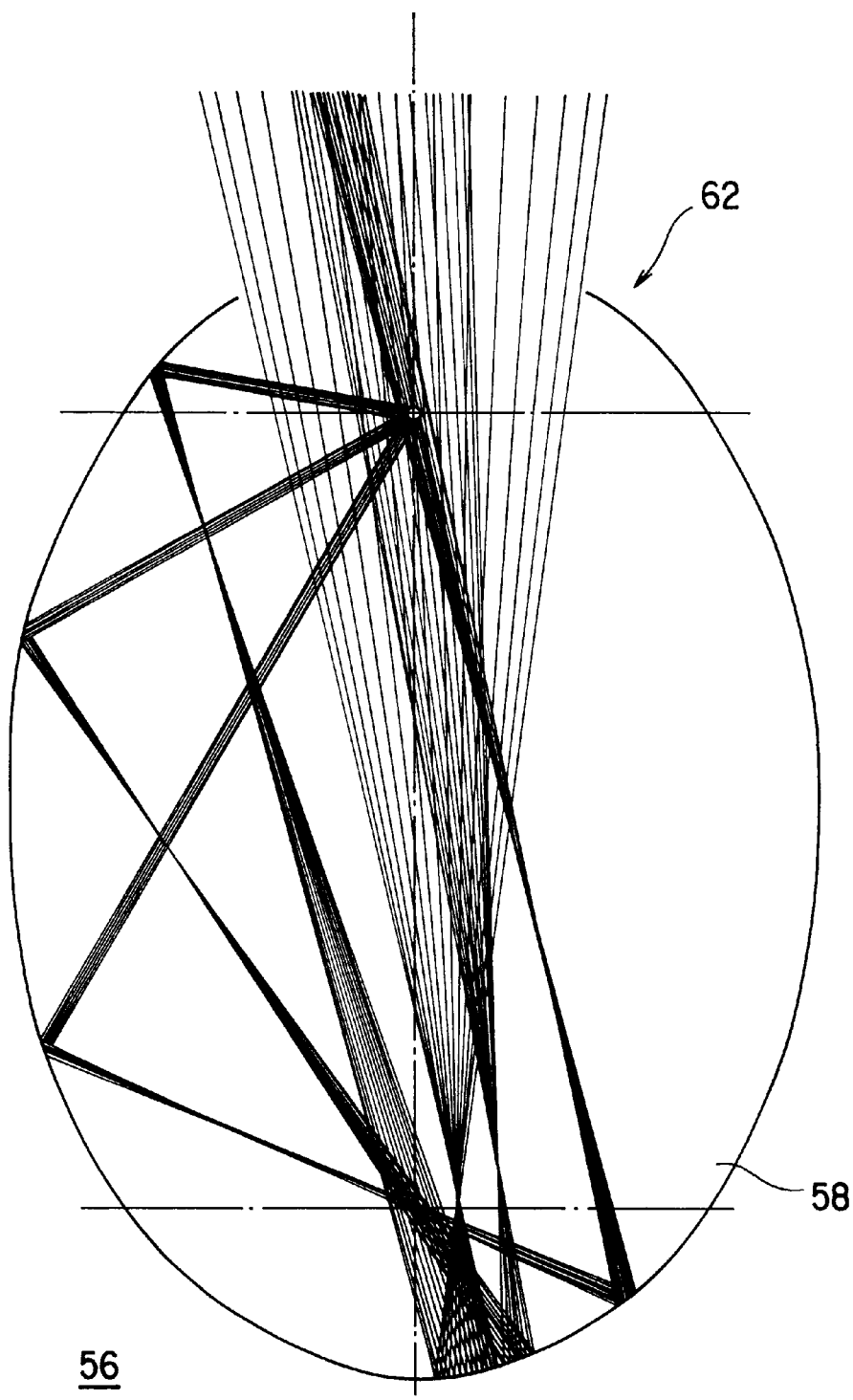
FIG. 26 is a view showing the ray tracing calculation results of light rays emitted from the emission line of the device shown in FIG. 23 in 80°, 120°, and 150° directions under the assumption that the light source has a finite size.

FIG. 26 shows the ray tracing results of light rays in the 80°, 120°, and 150° directions under the assumption that the light source has a finite size in the light source device shown in FIG. 23. In FIG. 26, a light ray emitted in the 80° direction initially has a width equal to that of the light source. However, after the light ray is reflected twice, it has a width nearly 20 times the initial width when it passes through the original light source position. The reason why the width increases is explained by the above-mentioned fact that the diffusion error is proportional to the size of the light source and is inversely proportional to the distance from the light source to the reflection mirror. As a result, the effect of increasing the energy density lowers. The light ray emitted in the 80° direction in FIG. 26 has nearly no contribution to an increase in energy density.

Figure 30:
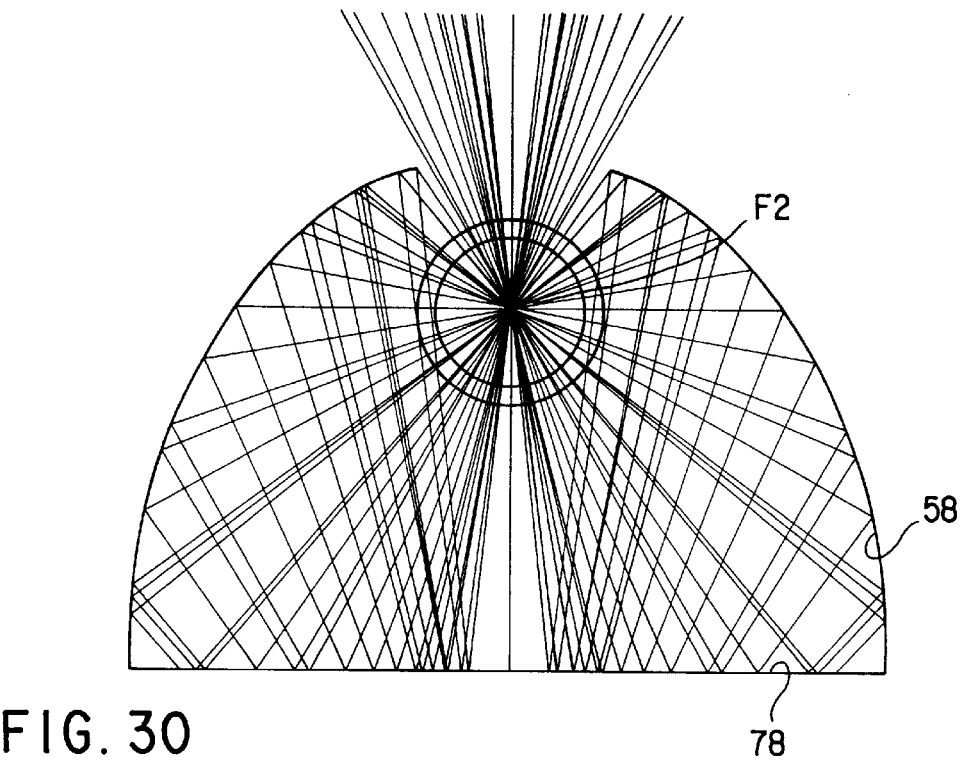
FIG. 30 is a schematic view showing a light source device according to still another embodiment of the present invention.

In FIG. 30, a light source is disposed at the second focal point of a reflection mirror which is formed with a radiation opening having a relatively small diameter at one end, and has an elliptic sectional shape. A rear plane reflection mirror is disposed at the intermediate point between the second and first focal points to extend in a direction perpendicular to the radiation direction. FIG. 30 shows the tracing results of light rays emitted by the center of the light source at the second focal point. In FIG. 30, light rays emitted in the 360° range leave the mirror as those within a nearly 90° range from the radiation opening 62, as in FIG. 23. Thus, the energy density can be increased.

Figure 32:
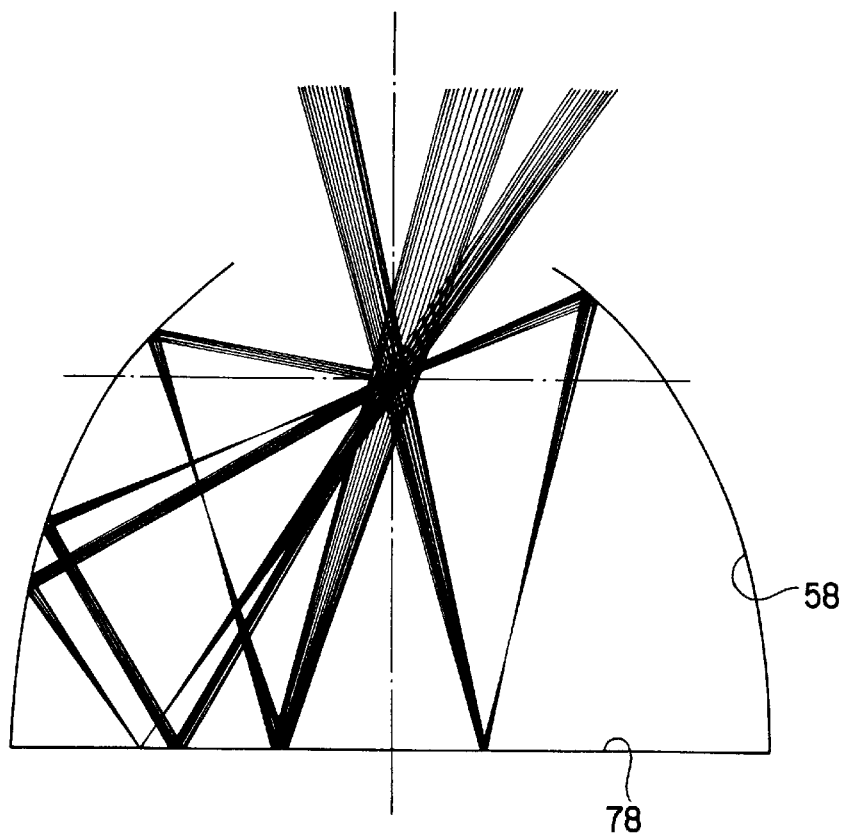
FIG. 32 is a view showing the ray tracing calculation results of light rays emitted from the emission line of the device shown in FIG. 30 in 80°, 120°, and 150° directions under the assumption that the light source has a finite size.

FIG. 32 shows the ray tracing results of light rays in the 80°, 120°, and 150° directions from the light source lamp under the assumption that the light source has a finite size in the light source device shown in FIG. 30. In FIG. 32, the width of a light ray emitted in the 80° direction increases only by approximately four times the initial width when it passes through the original light source position. In terms of the effect of increasing the energy density, the structure shown in FIG. 30 is more effective than that shown in FIG. 23. However, even in this structure, the diffusion angle of light rays to be overlapped inevitably increases.

Figure 38:
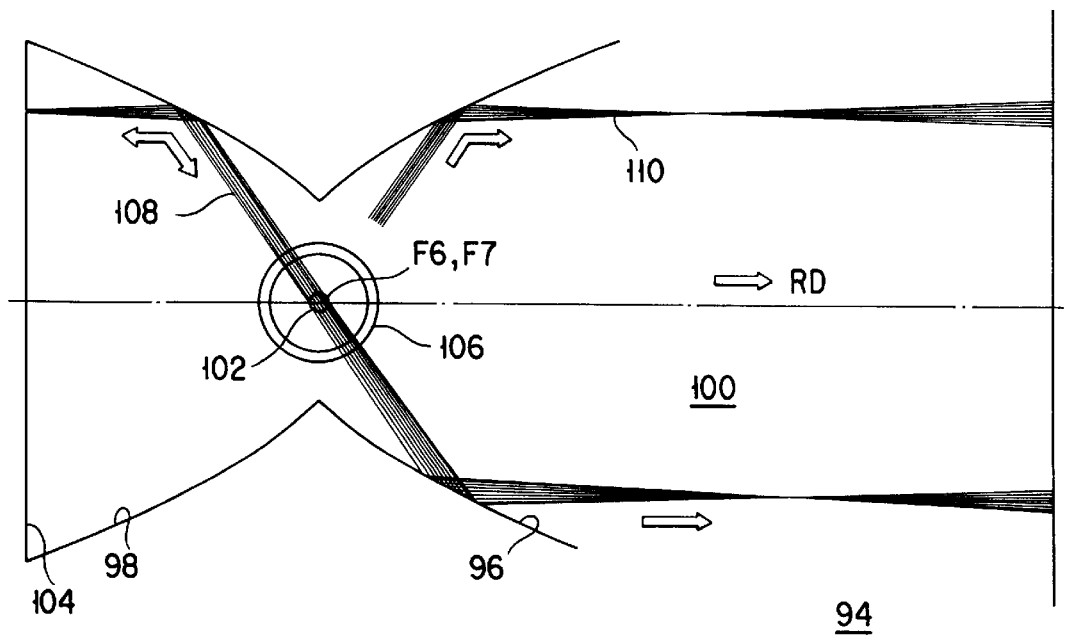
FIG. 38 is a principle view showing a light source device according to still another embodiment of the present invention.

In FIG. 38, a reflection mirror which is formed with a radiation opening at one end, and has a parabolic sectional shape, and another reflection mirror, the focal point of which is common to that of the parabolic shape, and which has a symmetrical parabolic sectional shape to that of the former mirror, are used. Also, a rear plane reflection mirror is inserted to extend in a direction, perpendicular to the radiation direction (from the light source to a target object to be irradiated). Furthermore, a light source is disposed at the focal point of the parabolic shape. FIG. 38 shows the ray tracing result of a light ray emitted in the 120° direction by the center of the light source under the assumption that the light source has a finite size.

FIG. 38 illustrates only the light ray in the 120° direction, which overlaps that in the −60° direction. In FIG. 38, light rays emitted by the light source can be made to overlap each other as in FIG. 23. However, the angular range within which light can be collected becomes nearly half that of FIG. 23. In FIG. 38, the width of the reflected light ray remains the same when it passes through the original light source position, and the light ray passes through the original light source range. This demonstrates that light rays can be made to overlap each other without increasing the diffusion angle.

Figures 40, 41:
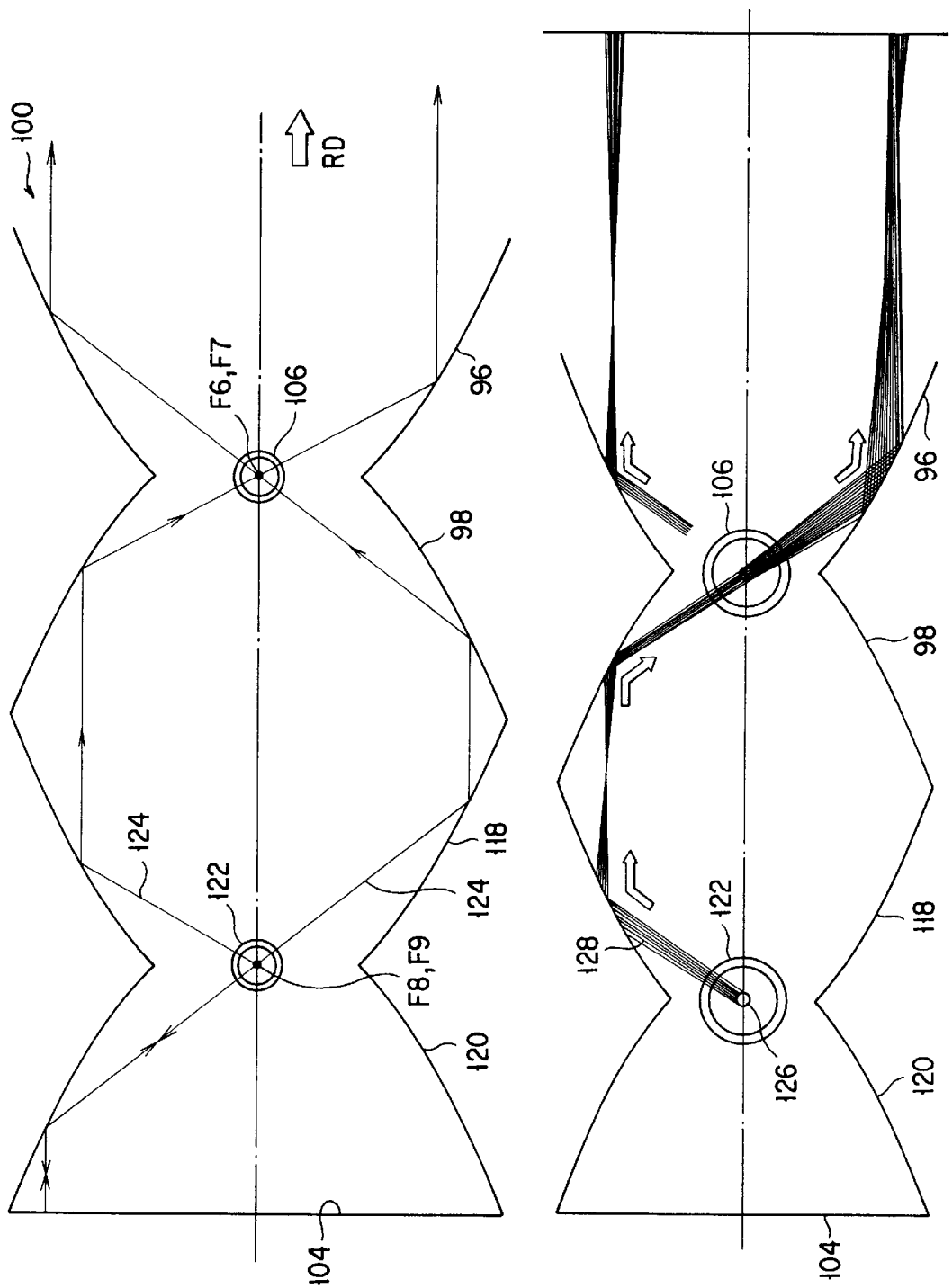
FIG. 40 is a principle view showing a light source device according to still another embodiment of the present invention.
FIG. 41 is a view showing the paths of some of light components originating from the device shown in FIG. 40.

FIG. 41 shows a system in which the structure in FIG. 38 is stacked in two stages. FIG. 41 shows the ray tracing result of a light ray emitted in the 60° direction by a rear light source under the assumption that the light source has a finite size.

Figure 42:
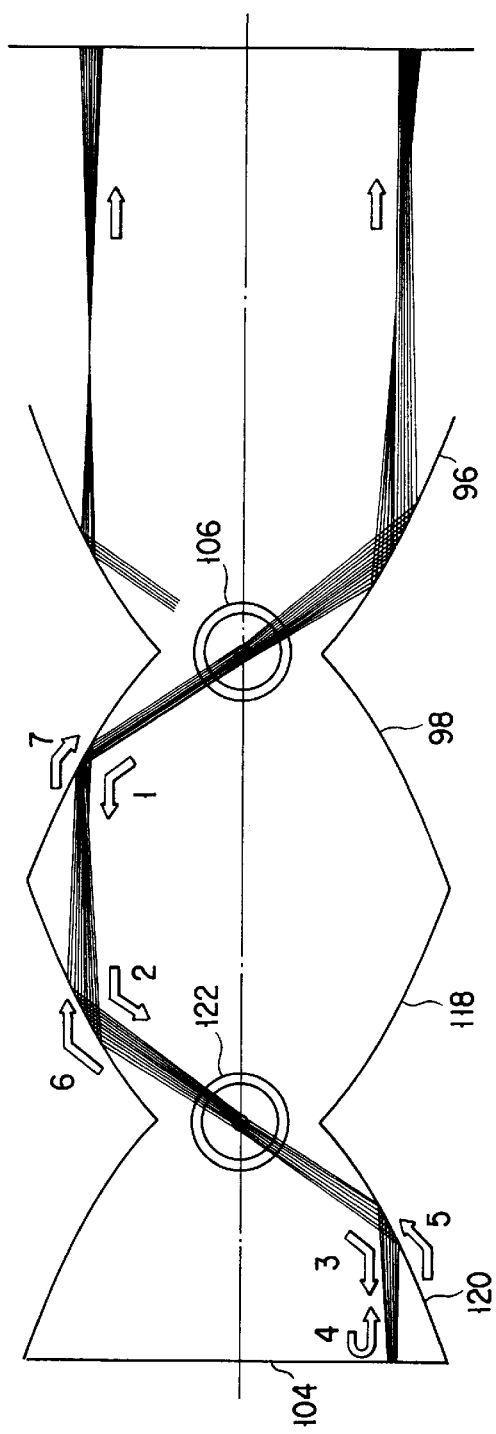
FIG. 42 is a view showing the paths of some other light components originating from the device shown in FIG. 40.

In FIG. 41, a light ray emitted by the rear light source reaches the position of a front light source, and its width remains the same as that equal to the original size of the light source when it passes through the front light source position. This indicates that light rays coming from the rear and front light sources can be optically added up to each other. FIG. 42 shows a system in which the structure in FIG. 38 is stacked in two stages as in FIG. 41. FIG. 42 shows the ray tracing result of a light ray emitted in the −120° direction by the rear light source under the assumption that the light source has a finite size. In FIG. 42 as well, a light ray emitted by the rear light source reaches the position of the front light source, and its width remains the same as that equal to the original size of the light source when it passes through the front light source position. In FIG. 42, a collimated light beam diverges when it passes through the position of the front light source. However, since the front light source emits light rays in all the directions, and these light rays pass through the same range, some light rays always have the same path.

As is known, a laser repetitively reflects and amplifies light induced and emitted from a gas ionized by a discharge using two opposed mirrors. Then, some light components (e.g., 1%) are picked up by passing them through a mirror. The laser makes the paths of light rays match each other by induced emission; it amounts to overlapping the light rays. According to the present invention, light rays can be made to overlap each other by combining reflection mirrors, and an energy density equivalent to that of the laser can be attained.

Figure 19:
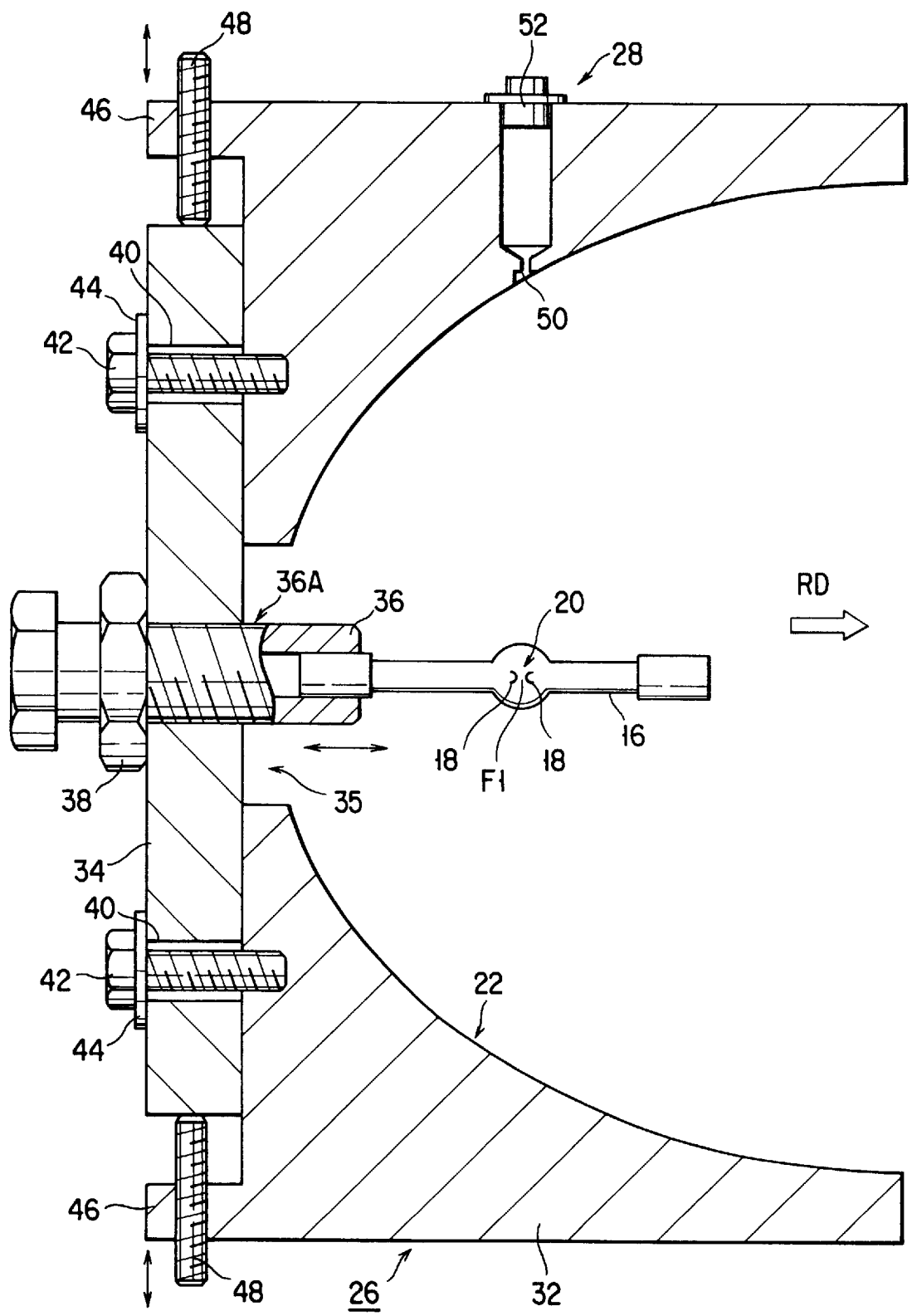
FIG. 19 is a sectional view showing a light source device according to still another embodiment of the present invention.
Figure 20:
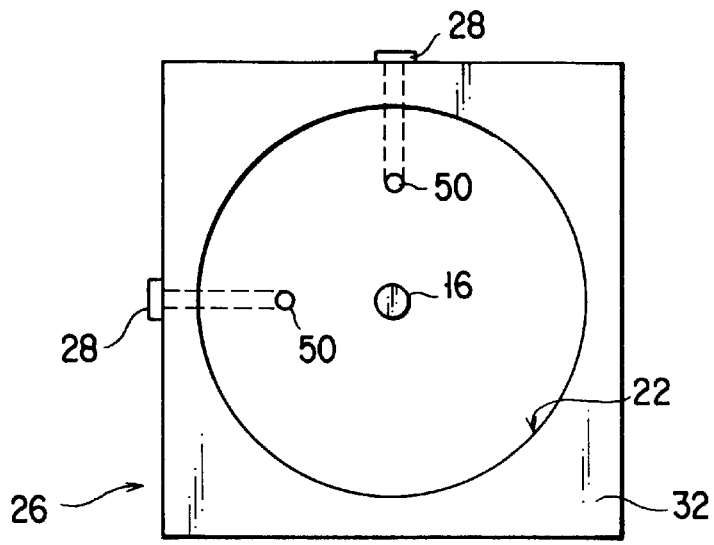
FIG. 20 is a reduced front view seen from the radiation direction of the light source device shown in FIG. 19.

FIG. 19 is a sectional view showing a light source device according to still another embodiment of the present invention, on the basis of the principle shown in FIG. 52. FIG. 20 is a schematic reduced front view of the light source device shown in FIG. 19 when viewed from the radiation direction, FIG. 21 is a schematic reduced rear view of the light source device shown in FIG. 19, and FIG. 22 shows a modification of a position detection means.

Figure 21:
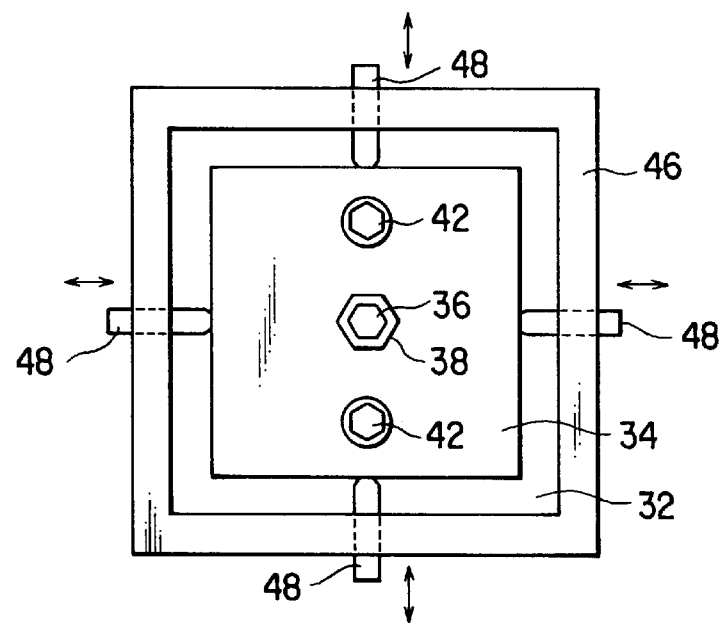
FIG. 21 is a reduced rear view of the light source device shown in FIG. 19.
Figure 22:
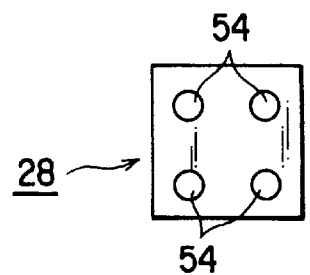
FIG. 22 is a view showing a modification of a position detection means.

As shown in FIGS. 19 to 21, a light source device 26 has a discharge lamp 16 and reflection mirror 22 having an elliptic section, which are the same as those described above with reference to FIGS. 52 to 54, a position detection means 28, and a position adjustment means 30. More specifically, as described with reference to FIG. 53, the discharge lamp 16 uses a discharge tube that generates an emission point 20 which has a sectional diameter L0 of about 0.3 mm and is essentially considered as a point light source by arc discharge, for example, a xenon lamp, metal halide lamp, mercury lamp, or the like.

Counter electrodes 18 are disposed in the discharge lamp 16 to have a small gap therebetween. By producing arc discharge between the electrodes 18, the emission point 20 is formed, thereby emitting a large amount of light (see FIG. 53).

On the other hand, the reflection mirror 22 has a nearly semi-elliptic sectional shape, and is formed with a radiation opening 24 having a relatively large diameter. The discharge lamp 16 is set so that the emission point 20 is located at a first focal point F1 of this elliptic shape.

The position of the discharge lamp 16 is adjusted by the position adjustment means 30. The position adjustment means 30 has an attachment plate 34 disposed on the back surface side of a mirror main body 32. An attachment rod 36 is inserted from the attachment plate 34 in a radiation direction RD, i.e., in the optical axis direction from the light source to a target object to be irradiated, via an opening 35 formed at the center of the mirror main body 32. The discharge lamp 16 is supported by the distal end of the attachment rod 36.

A thread 36A is formed on the outer circumferential surface of the attachment rod 36. By rotating the attachment rod 36, the discharge lamp 16 can be moved back or forth in the radiation direction RD. A lock nut 38 for locking the rod 36 at a predetermined position is fitted on the attachment rod 36.

The attachment plate 34 is formed with a plurality of adjustment holes 40 at appropriate positions. A set screw 42 having a diameter smaller by about several mm than the inner diameter of the hole 40 is inserted into each adjustment hole 40. By screwing the screw distal ends into the mirror main body 32, washers 44 loosely fitted on the set screws 42 press and fix the attachment plate 34.

An adjustment frame 46 is provided to the rear end of the attachment plate 34 to surround its four sides. The adjustment frame 46 has four retractable, planar adjustment screws 48 in the up, down, right, and left directions, as also shown in FIG. 21. The distal ends of the adjustment screws 48 contact the side surfaces of the attachment plate 34. Note that the number of planar adjustment screws 48 is not limited to four.

Hence, by adjusting the planar adjustment screws 48 while the set screws 42 are loosened, the attachment plate 34 can be moved by small amounts in the up, down, right, and left directions, thus adjusting the position of the discharge lamp 16 in the up, down, right, and left directions.

Note that the position adjustment means 30 with the above arrangement need only be slightly movable to adjust the discharge lamp 16 in the radiation direction RD and the up, down, right, and left directions, and is not limited to the above-mentioned arrangement.

On the other hand, two position detection means 28 are provided to have a 90° angular difference therebetween in a plane perpendicular to the radiation direction (the direction perpendicular to the plane of the drawing in FIG. 20), as also shown in FIG. 20. More specifically, pinholes 50 each having a diameter around 0.5 mm extend through the mirror main body 32 toward the reflection mirror 22 to face the vicinity of the first focal point F1 as the normal position. Semiconductor position detectors 52 that can two-dimensionally detect the position of the brightest point are disposed at the base portions of the pinholes 50. Each detector 52 is commercially available as a two-dimensional PSD (Position Sensor Head), and can precisely determine the position of the emission point 20. Each detector 52 can cover, e.g., a 10 mm×10 mm area. In this case, the detector 52 is precisely aligned and attached so that the center of the diagonal lines of a 10 mm×10 mm square detection surface agrees with the first focal point F1.

Note that the position detection means 28 is not limited to the above-mentioned semiconductor position detector 52. For example, as shown in FIG. 22, four photodiodes 54 may be disposed in a square pattern to be spaced by about 10 mm, and the two-dimensional position of the emission point 20 may be determined by comparing the output values of the four photodiodes 54.

The above-mentioned position detection means 28 and position adjustment means 30 are managed as individual products, and their precision can be easily maintained at 1/100 mm. This precision value is smaller than the size of the light source lamp (e.g., 0.3 mm), and assures sufficiently high performance.

The operation of the light source device shown in FIGS. 19 to 21 will be explained below.

As also shown in FIGS. 52 and 55, of the light components emitted by the emission point 20, the sectional diameter of which falls within the range from 0.1 mm to 0.3 mm and which is produced by arc discharge of the discharge lamp 16, those that are incident on the reflection mirror 22 having an elliptic section are reflected thereby, and converge toward the second focal point F2.

Even when the discharge lamp 16 initially has high attachment precision, the electrodes 18 and the like, exposed to high temperatures due to discharge thermally expand/ shrink, and the emission point 20 tends to deviate from the first focal point F1. Even when this deviation becomes only 0.5 mm, the beam spot spreads considerably at the converging point, and the energy density cannot be sufficiently increased, as has been described above with reference to FIGS. 55 and 56.

By contrast, in this device, the two position detection means 28 are provided to have a 90° angular difference therebetween, and their position detectors 52 detect the position of the emission point 20. The position adjustment means 30 adjusts the position of the discharge lamp 16 by moving it by a small amount so that the emission point 20 is located at the center of, e.g., the 10 mm×10 mm square detection surface.

More specifically, in order to slightly move and adjust the discharge lamp 16 in the radiation direction in FIG. 19, the lock nut 38 that locks the attachment rod 36 is loosened. In this state, the threadably engaged attachment rod 36 is rotated to move the discharge lamp 16 back or forth, thereby adjusting the position of the lamp 16 in the radiation direction.

Position adjustment in the plane perpendicular to the radiation direction is done as follows. That is, the set screws 42 are loosened to make the attachment plate 34 movable. In this state, the right, left, upper and lower planar adjustment screws 48 are appropriately moved back/forth to slightly move the attachment plate 34 in the right or left, or up or down direction in FIG. 21. In this way, the position adjustment of the discharge lamp 16 in the plane perpendicular to the radiation direction is attained.

Note that the position detection and adjustment may be automatically done using, e.g., stepping motors.

With this arrangement, the emission point 20 of the discharge lamp 16 can be precisely located on the first focal point F1, as shown in FIG. 52. Hence, the converging spot on the second focal point F2 has only a small spread arising from the sectional diameter of the emission point 20, as shown in FIG. 54, and its angular error and diffusion angle can be minimized.

As described above, since the discharge lamp that uses arc discharge that can assure a very small sectional diameter of the emission point is used as the light-emission source in place of a filament with a large sectional diameter of the emission point, light can be collected and converged to have an energy density equivalent to or higher than that of the laser.

The above embodiment uses a discharge lamp which emits light from an arc discharge point. However, the present invention is not limited to such specific lamp. For example, the present invention can be applied to a tubular discharge lamp which emits light by producing a linear arc in a tubular discharge tube having a given length to form a so-called emission line. In this case as well, the sectional diameter of the emission line is as small as it can be considered as a point light source, as in the above-mentioned case, and falls within the range from 0.1 mm to 0.3 mm.

In this case, the reflection mirror having an elliptic section used has a semi-elliptic sectional shape, and is elongated in the longitudinal direction of the discharge lamp, as shown in FIG. 19.

Figure 24:
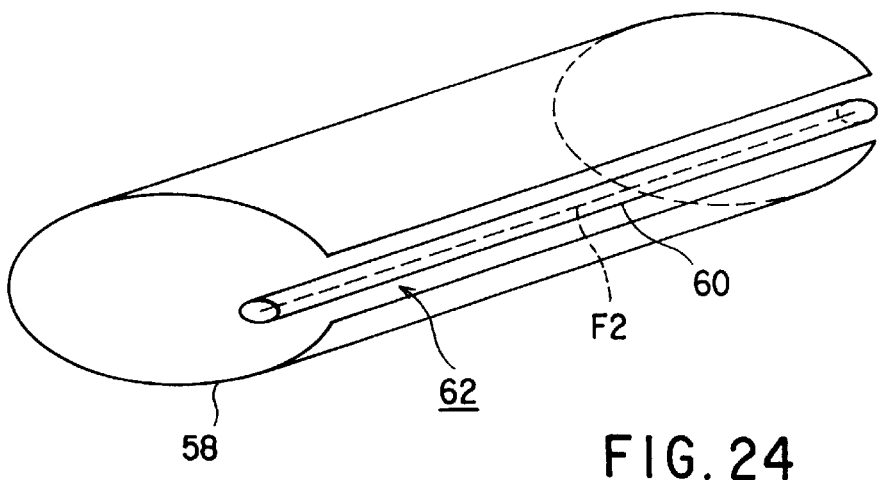
FIG. 24 is a perspective view showing the light source device shown in FIG. 23.

FIG. 23 is a schematic sectional view showing a light source device according to still another embodiment of the present invention, and FIG. 24 is a perspective view showing the light source device shown in FIG. 23. FIGS. 25A and 25B show the path of a single light ray emitted by an emission line of the device shown in FIG. 23. FIG. 26 shows the ray tracing calculation results of light rays emitted by the emission line of the device shown in FIG. 23 in the 80°, 120°, and 150° directions, under the assumption that the light source has a finite size.

Figure 27:
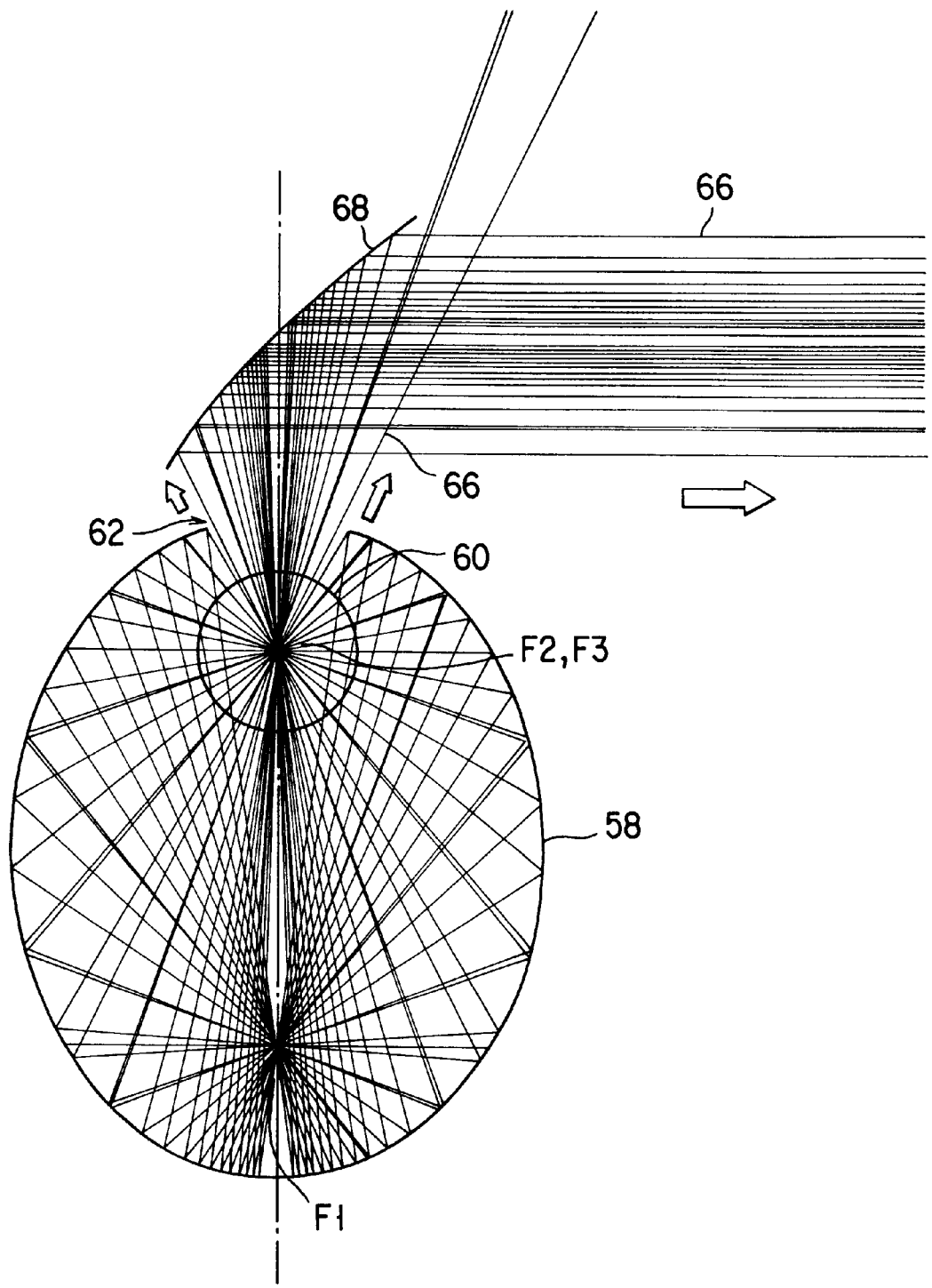
FIG. 27 is a view showing the state wherein an external parabolic reflection mirror is disposed at the emission port side of the light source device shown in FIG. 23.
Figure 28:
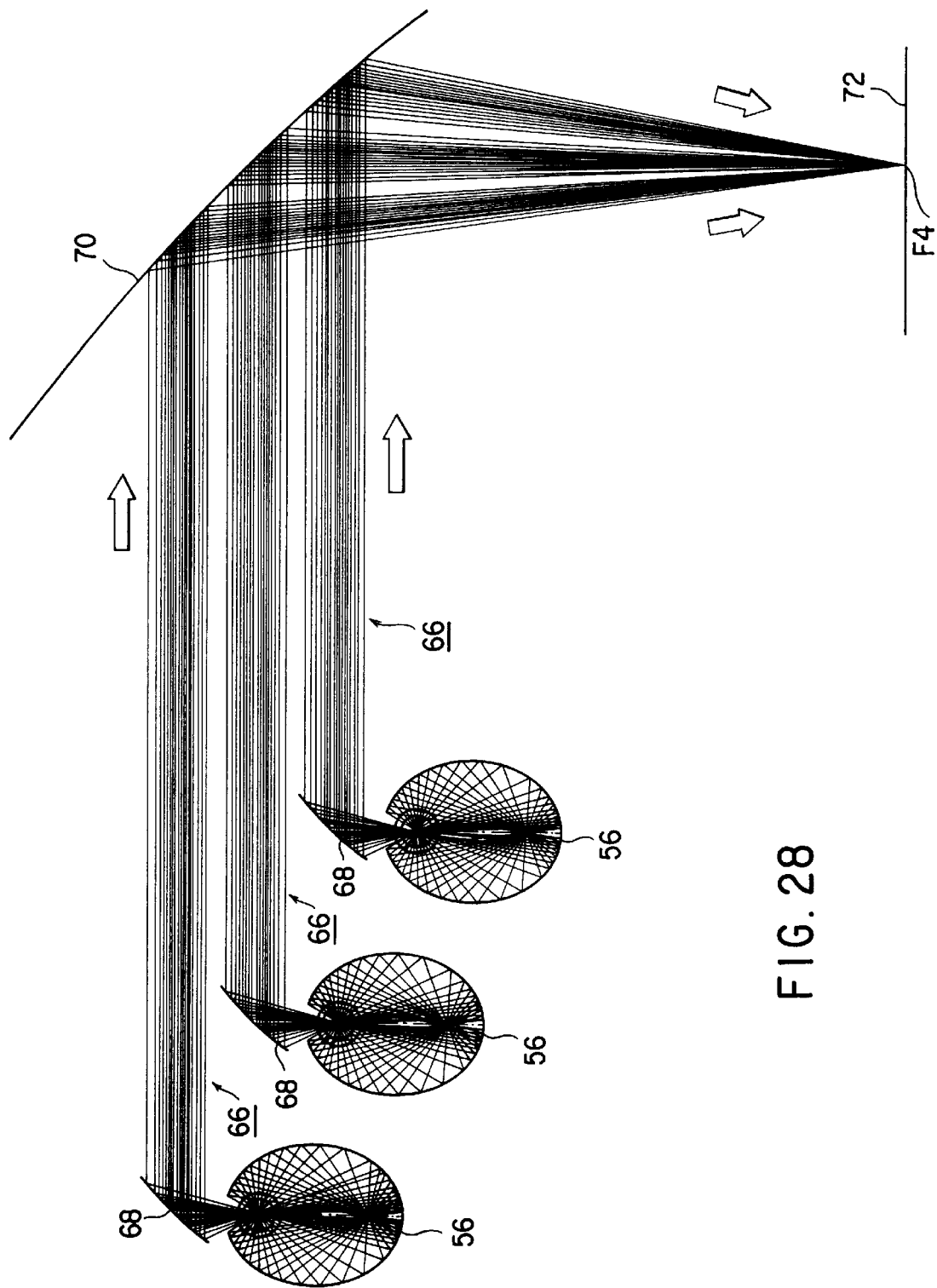
FIG. 28 is a view showing an embodiment using a plurality of light source devices each shown in FIG. 23.
Figure 29:
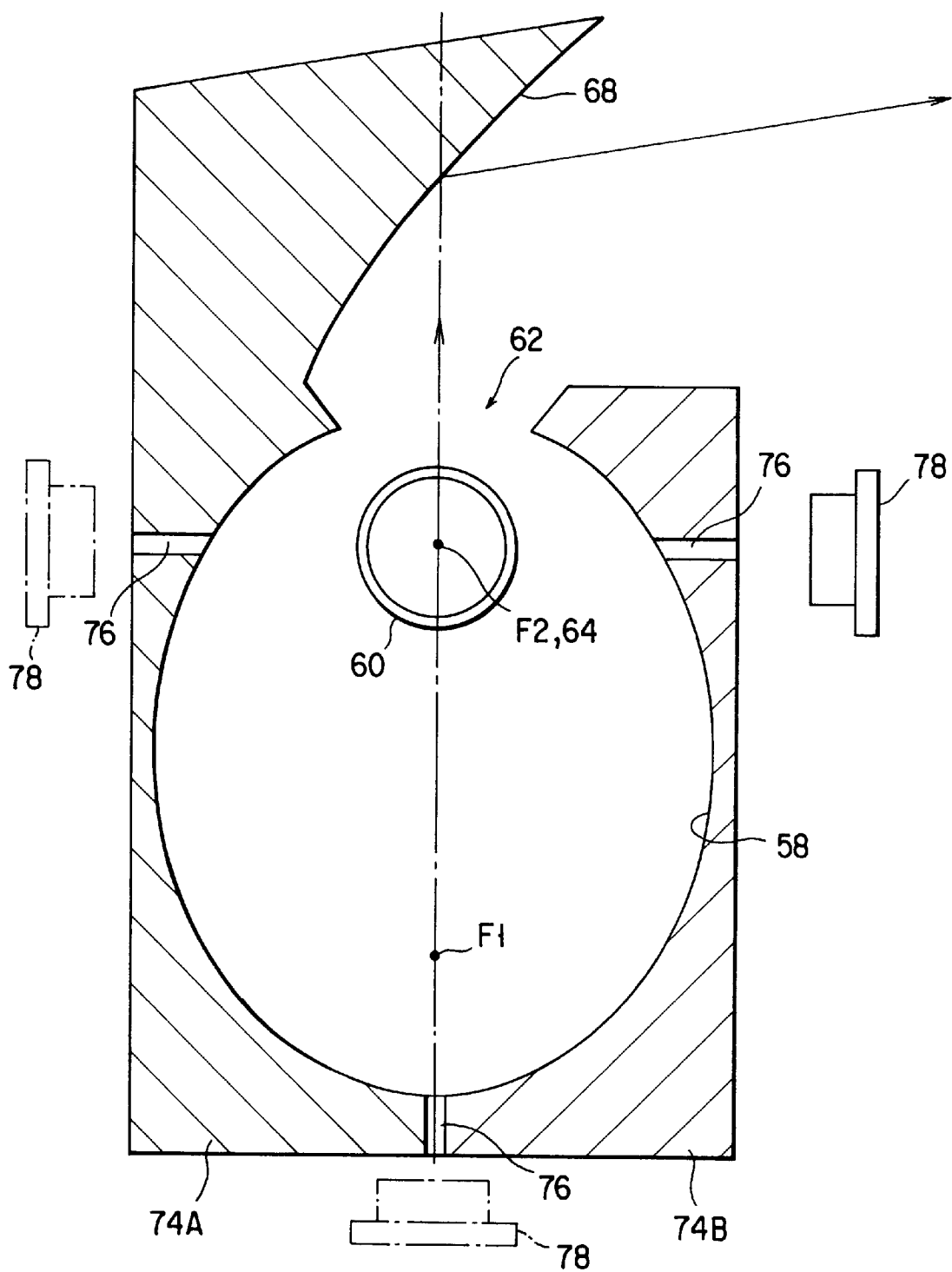
FIG. 29 is a view showing an example of the detailed arrangement of the light source device shown in FIG. 23.

FIG. 27 shows the state wherein an external parabolic reflection mirror is set at the radiation opening side of the light source device shown in FIG. 23. FIG. 28 shows an embodiment when a plurality of light source devices like that shown in FIG. 23 are used. FIG. 29 shows an example of the detailed arrangement of the light source device shown in FIG. 23.

Figure 31:
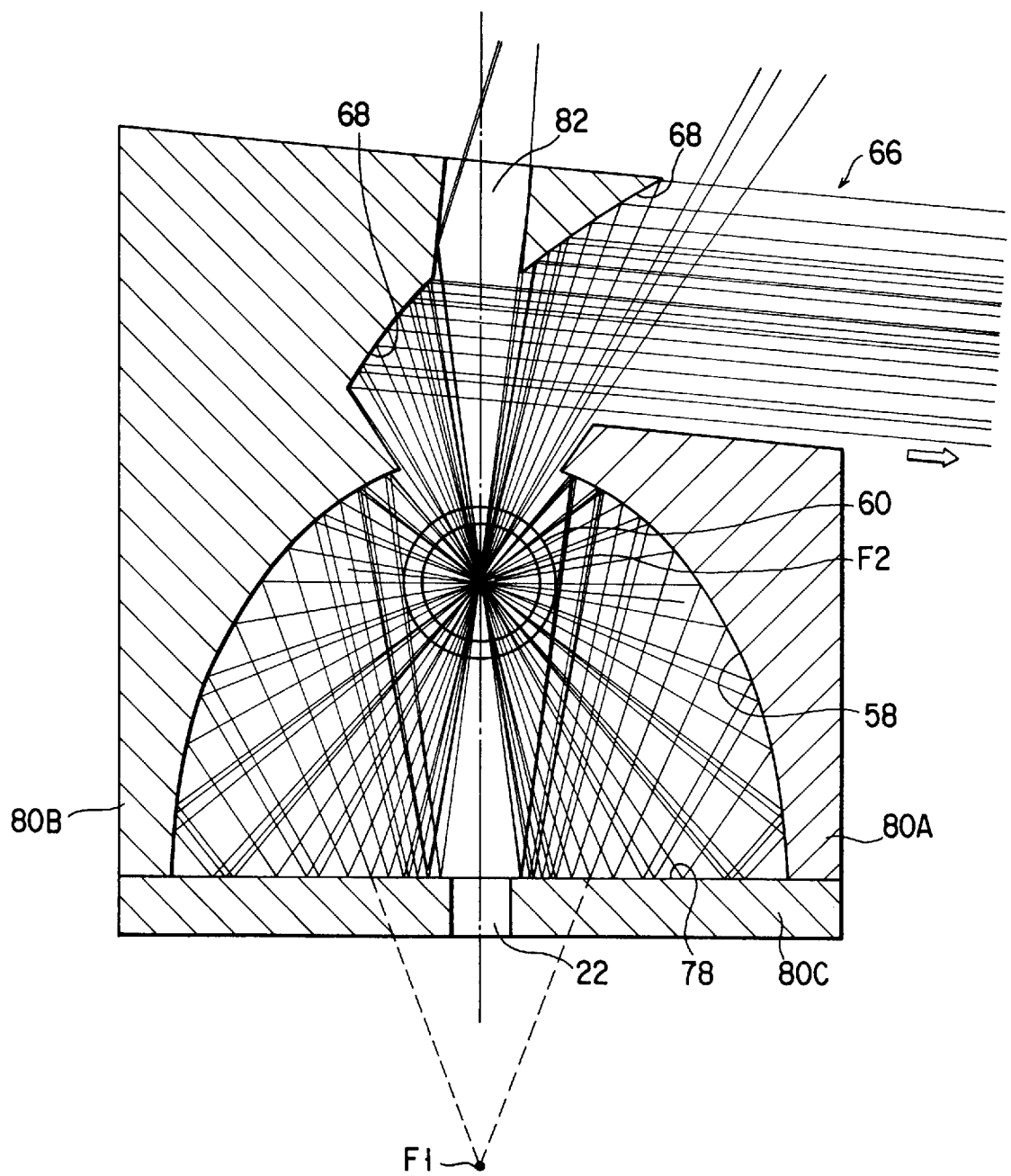
FIG. 31 is a view showing an example of the detailed arrangement of the light source device shown in FIG. 30.

FIG. 30 shows a modification of the embodiment shown in FIG. 23. FIG. 31 shows an example of the detailed arrangement of the light source device shown in FIG. 30. FIG. 32 shows the ray tracing calculation results of light rays emitted by the emission line of the device shown in FIG. 30 in the 80°, 120°, and 150° directions, under the assumption that a light source has a finite size.

Figure 33:
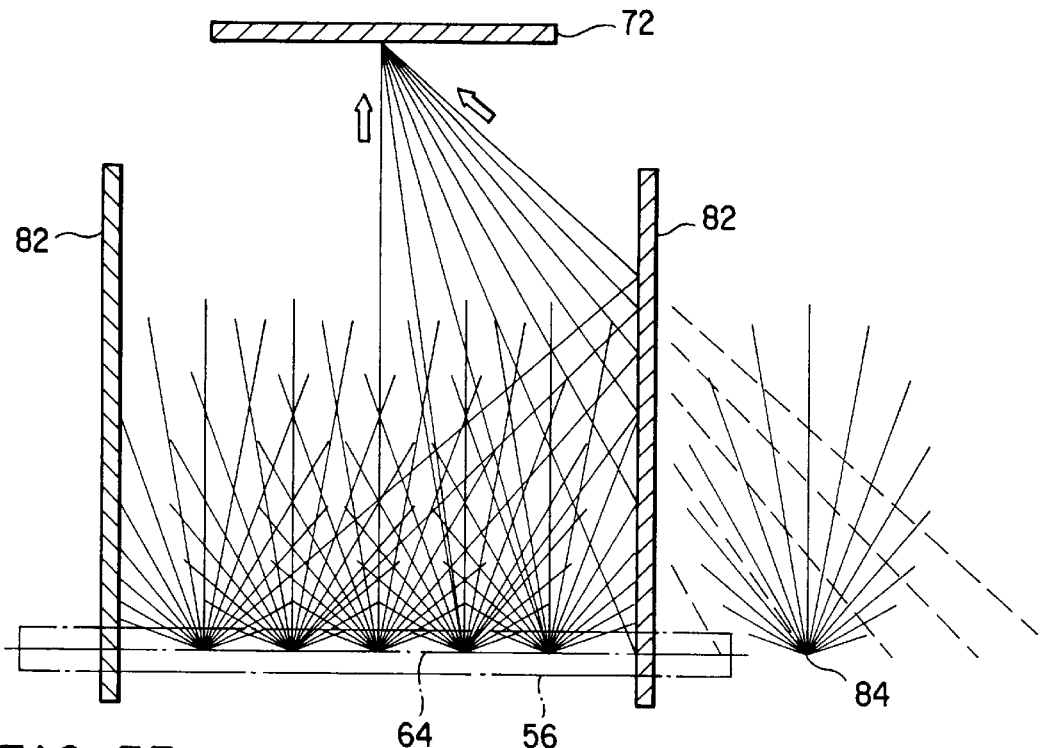
FIG. 33 is a view showing an embodiment in which a side plane reflection mirror is disposed at an end portion of a discharge lamp of each of the light source devices shown in FIGS. 23 to 31.
Figure 34:
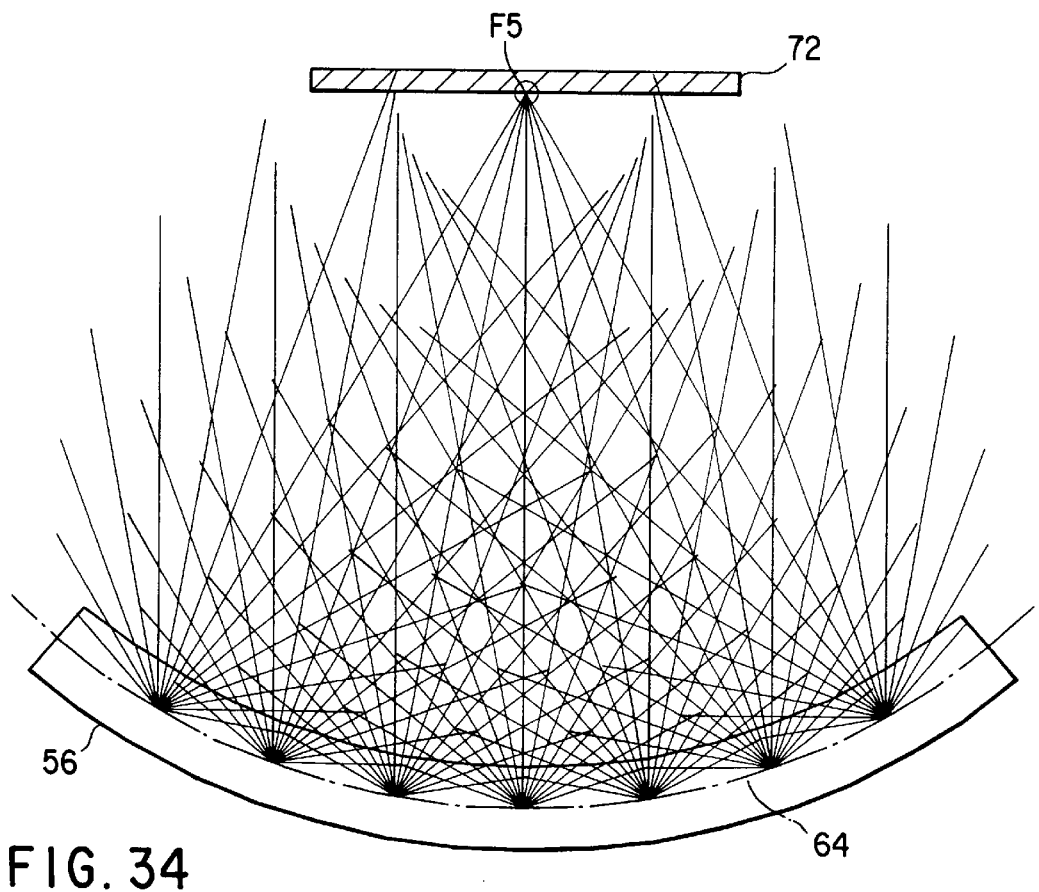
FIG. 34 is a view showing an embodiment in which the discharge lamp of the light source device shown in FIG. 33 is formed into an arc shape.

FIG. 33 shows an embodiment in which a side plane reflection mirror is placed at the end portion of the discharge lamp of the light source device shown in each of FIGS. 23 to 32. FIG. 34 shows an embodiment when the discharge lamp of the light source device shown in FIG. 33 has an arcuated shape.

In the following description, a discharge lamp that produces a linear emission line by arc discharge in place of a lamp that generates an emission point will be exemplified. However, the present invention can also be applied to the lamp that produces an emission point, as described above.

As shown in FIGS. 23 and 24, a light source device 56 has a reflection mirror 58 having an elliptic section, and a discharge lamp 60. The elliptic reflection mirror 58 is formed into an elongated shape, as shown in FIG. 24, and a radiation opening 62 smaller than that in the embodiment shown in FIGS. 19 to 21 is formed at its front portion. The mirror surface of the elliptic reflection mirror 58 covers not only a rear first focal point F1 but also a second focal point F2 on the radiation opening 62 side, so that the two focal points F1 and F2 are located inside the mirror.

The discharge lamp 60 has a rod-like discharge tube, as described above, and is disposed along the second focal point F2 extending in the horizontal direction. Especially, the lamp 60 is set so that a linear emission line 64 formed by an arc discharge produced in the discharge tube roughly matches the position of the second focal point F2. The emission line 64 is as thin as its sectional diameter is essentially considered as a point light source, e.g., around 0.1 mm to 0.3 mm.

As in the embodiment shown in FIGS. 19 to 21, the position detection means 28 and position adjustment means 30 may also be arranged to remove the positional errors of the emission line 64 (see FIG. 19).

The operation of the device shown in FIGS. 23 and 24 will be explained below.

Light 66 emitted by the emission line 64 of the discharge lamp 60 on the second focal point F2 in all the directions is output from the entire radiation opening 62 to have a given divergence angle. More specifically, light components emitted by the emission line 64 toward the radiation opening 62 leave the reflection mirror 58 without being reflected thereby. Other light components are reflected several times by the reflection mirror 58 with an elliptic section to go in the radiation direction RD, and finally leave the radiation opening 62.

FIG. 25A shows the state wherein the emitted light 66 is reflected twice by the reflection mirror 58, and finally leaves the radiation opening 62 via the first focal point F1. FIG. 25B shows the state wherein the emitted light 66 is reflected four times by the reflection mirror 58, and finally leaves the radiation opening 62 via the first and second focal points F1 and F2.

Note that two or more light rays can be overlapped on an identical path. More specifically, in FIG. 25A, light rays emitted by the emission line 64 in the directions A and B are finally deflected in the direction A, and are output to overlap each other. In FIG. 25B, light rays emitted by the emission line 64 in the directions D and E are finally deflected in the direction C and are output to overlap each other.

Hence, with this arrangement, light rays can be made to overlap each other within the range in which light rays or an arc discharge and light rays do not influence each other, and the energy density of the light can be increased.

Unlike in the embodiment shown in FIGS. 19 to 21, light rays emitted in nearly all the directions can be output within a given divergence angle or less and used, thus also improving the use efficiency of light.

FIG. 27 shows a light source device according to still another embodiment of the present invention as a modification of the embodiment shown in FIG. 23.

In FIG. 27, an external parabolic reflection mirror 68 having a parabolic sectional shape is disposed outside the radiation opening 62. In this case, the position of a focal point F3 of the parabolic reflection mirror 68 is set to agree with that of the second focal point F2 of the reflection mirror 68 with an elliptic section.

Figure 48:
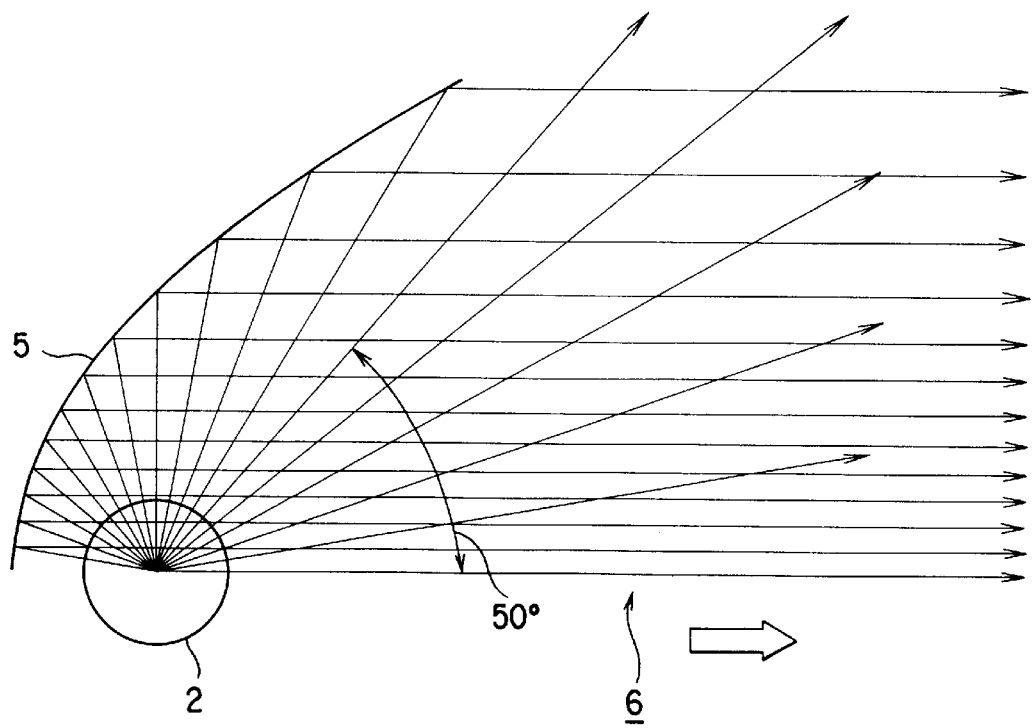
FIG. 48 is an enlarged view showing one of the lamps shown in FIG. 47.
Figure 49:
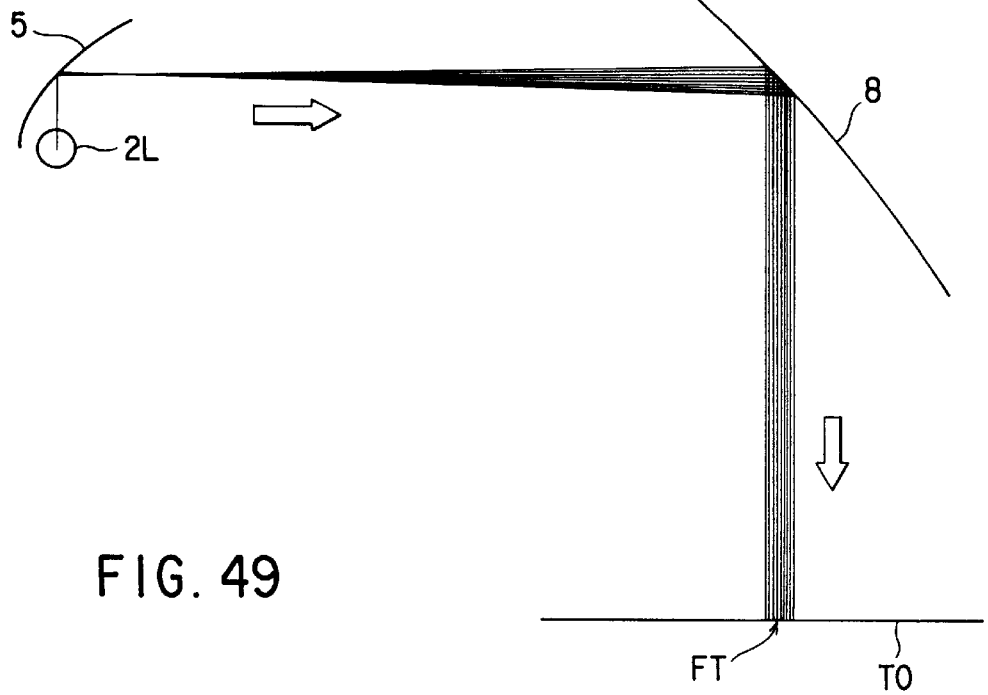
FIG. 49 is a view showing only light emitted in the 90° direction from the light source lamp.
Figure 50:
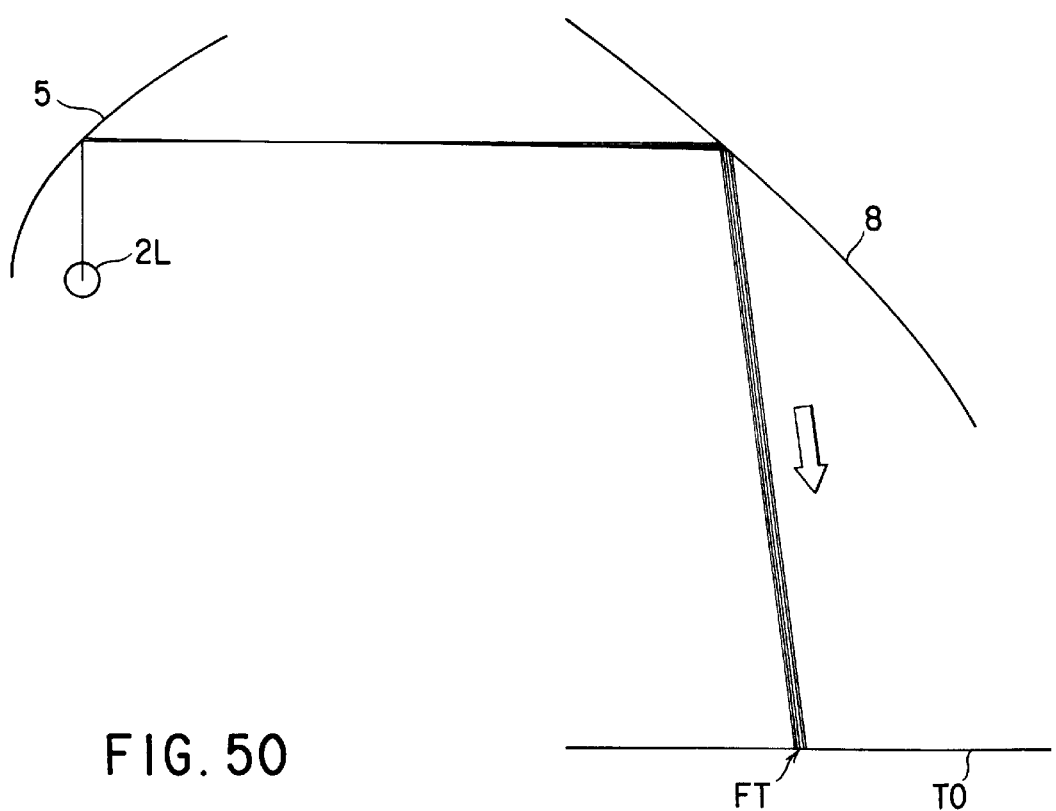
FIG. 50 is a view showing the case using a reflection mirror having a size twice as large as that shown in FIG. 49.
Figure 51:
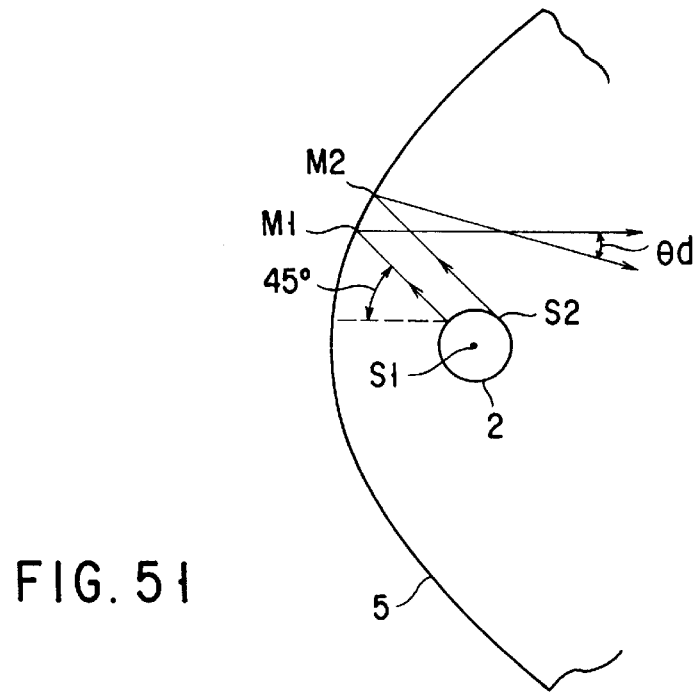
FIG. 51 is a view for explaining the cause of angular errors of light emitted by a light source having a finite size.

With this arrangement, light 66 that leaves the radiation opening 62 with a given divergence angle is reflected by the external parabolic reflection mirror 68, and is converted into collimated light. Hence, collimated light with high energy density can be used in the next stage. In this modification, as may be apparent from comparison with FIG. 48, light rays twice or more (e.g., nearly four times) those in FIG. 48 are obtained from a narrow region of the identical external parabolic reflection mirror 68, and the energy density can be increased very much.

FIG. 28 shows still another embodiment of the present invention, and collimated light obtained by the device shown in FIG. 27 is converged to one point and is used.

In FIG. 28, a plurality of (three in FIG. 28) light source devices 56 each having the external parabolic reflection mirror 68 shown in FIG. 27 are juxtaposed. The directions of collimated reflected light beams 66 coming from the respective parabolic reflection mirrors 68 are parallel to each other. Note that only one light source device 56 may be arranged, as a matter of course. A second external parabolic reflection mirror 70 which is large enough to receive these reflected light beams 66 and has a parabolic sectional shape is inserted in the reflection direction.

Figure 47:
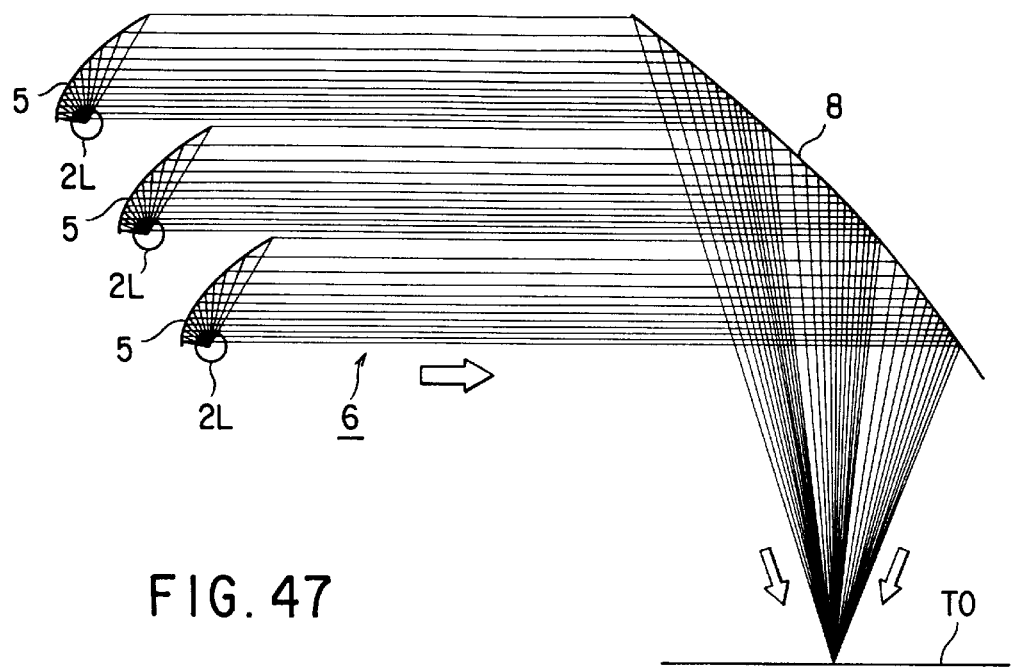
FIG. 47 is an explanatory view showing the concept of the conventional structure for obtaining light with high energy density by converging light beams coming from a plurality of lamps.

With this arrangement, the collimated reflected light beams 68 obtained by reflection by the external parabolic reflection mirrors 68 arranged outside the corresponding radiation openings 62 are reflected by the second external parabolic reflection mirror 68, and converge to an object 72 to be heated on a focal point F4. In this case, as can be seen from comparison with FIG. 47, light rays nearly four times those in FIG. 47 converge within a divergence angle roughly half that in FIG. 47, and a very high energy density can be realized.

FIG. 29 shows the arrangement when the external parabolic reflection mirror 68 is integrally formed with the device main body in the example of the arrangement of the device shown in FIG. 27.

In this device example, for example, an aluminum block body is divided into two block bodies 74A and 74B. After the joint surface side portions of the block bodies 74A and 74B are hollowed out, the reflection mirror 58 with an elliptic section and the external parabolic reflection mirror 68 outside the radiation opening 62 are integrally formed by gold-plating them, depositing mercury on the inner surfaces, or the like. Pinholes 76 each having a diameter of around 0.5 mm are formed from 90° different directions to face the discharge lamp 60. Two-dimensional PSDs 78 as position detection means are arranged at the outer end portions of the pinholes 76. With these detectors, the position of the emission line 64 is accurately detected.

Note that the position adjustment means for adjusting the position of the discharge lamp 60 is also arranged, but its description will be omitted here.

This device example can exhibit the same operation and effect as those in FIG. 27, as a matter of course.

FIG. 30 shows a light source device according to still another embodiment of the present invention. In this embodiment, a rear plane reflection mirror 78 is disposed behind the reflection mirror 58 with an elliptic section at the central point between the first and second focal points F1 and F2 to extend in a direction perpendicular to the radiation direction at the radiation opening 62. The entire device can be formed by appropriately dividing, e.g., an aluminum block body into a plurality of block bodies 80A, 80B, and 80C, hollowing out their joint surface side portions, and gold-plating them or depositing mercury thereon, as shown in FIG. 31.

In this device example, a cooling hole 82 is formed along the central axis extending in the reflection direction. By supplying, e.g., cooling air along the cooling hole 82, the interior of the device can be cooled.

In case of this modification, light rays overlap each other on an identical path while suppressing an increase in divergence angle to some extent, and the energy density can be increased. In the illustrated example, the external parabolic reflection mirror 68 has steps to sandwich the cooling hole 82 therebetween, but these steps do not pose any problem as long as reflected light 66 can be guided in an identical direction as collimated light.

FIG. 33 is a schematic plan view showing another embodiment as a modification of the embodiment shown in FIGS. 23 to 32.

In the embodiments shown in FIGS. 23 to 32, at the two end portions of the rod-like discharge lamp 60, light emitted by the rod-like emission line 64 escapes externally. However, as shown in FIG. 33, side plane reflection mirrors 82 are disposed at the two ends of the rod-like light source device 56 to extend in a direction perpendicular to the longitudinal direction of the light source device 56. With this arrangement, light emitted sideways from the light source device 56 is reflected by the two plane reflection mirrors 82 toward the object 72 to be heated. More specifically, since the plane reflection mirrors 82 form a virtual image 84 of the light source device 56 sideways, the light source can be considered as an infinitely long line light source. Hence, not only the light energy can be efficiently used, but also a high energy density can be realized.

In the illustrated example, some representative light rays emitted by the emission line 64 are discretely shown. However, in practice, light is emitted continuously along the emission line 64. The plane reflection mirrors 82 can be arranged in all the light source devices described above with reference to FIGS. 23 to 32.

FIG. 34 is a schematic plan view showing an embodiment in which the discharge lamp of the light source device shown in FIG. 33 is formed into an arcuated shape.

In the embodiments shown in FIGS. 23 to 32, the light source device 56 and discharge lamp 60 are formed into a linear rod shape. However, the present invention is not limited to such specific shape. For example, the light source device and discharge lamp may be bent in an arcuated shape to have one point on the object 72 to be heated as a focal point F5., as shown in FIG. 34.

With this embodiment, heat energy can be concentrated on a portion around the focal point F5. Note that the side plane reflection mirrors 82 shown in FIG. 33 may be placed at the two ends of, the light source device 56.

Note that the side plane reflection mirrors 82 and the rod-like light source device 56 are formed into an arcuated shape in other embodiments and inventions to be described below as well as in FIGS. 33 and 34.

Figure 35:
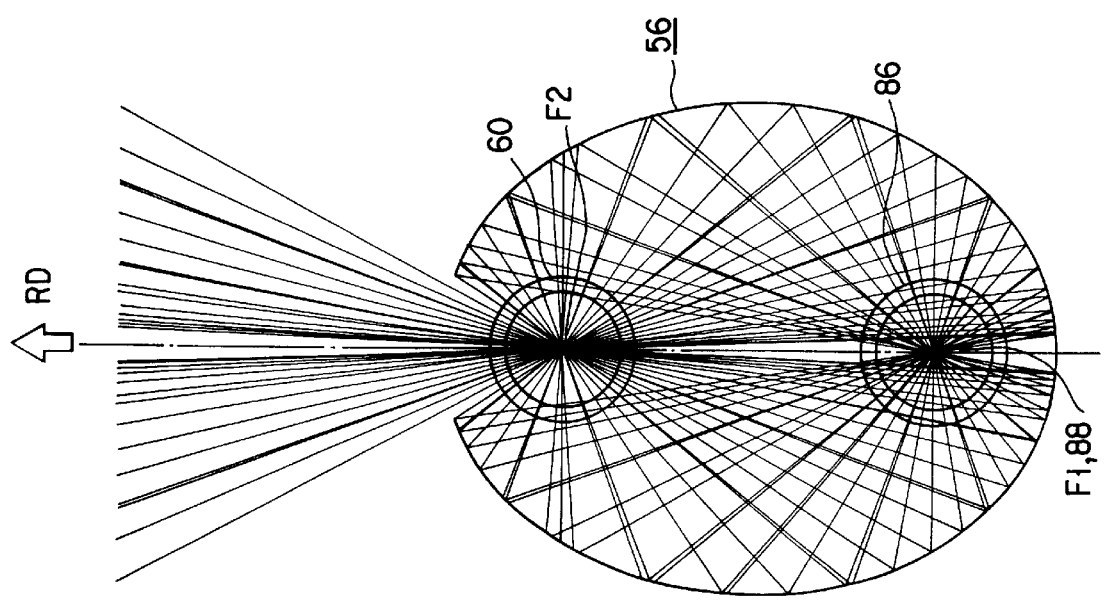
FIG. 35 is a view showing the arrangement of a light source device according to still another embodiment of the present invention.

FIG. 35 shows a light source device according to still another embodiment of the present invention as a modification of the embodiment shown in FIG. 23.

In this embodiment, a discharge lamp 86 is also disposed at the first focal point F1 in the embodiment shown in FIG. 23. The discharge lamp 86 can use a lamp having the same structure as the discharge lamp 60 disposed on the second focal point F2. More specifically, the discharge lamp 86 generates, by arc discharge, a linear emission line 80, the sectional diameter of which is as small as it is roughly considered as a point light source.

With this arrangement, light rays emitted by the two discharge lamps 60 and 86 are made to overlap each other, and light with a higher energy density than that described in FIG. 23 can be obtained.

Nearly all light rays emitted by the discharge lamp 86 disposed on the first focal point F1 can be used, as a matter of course.

Figure 36:
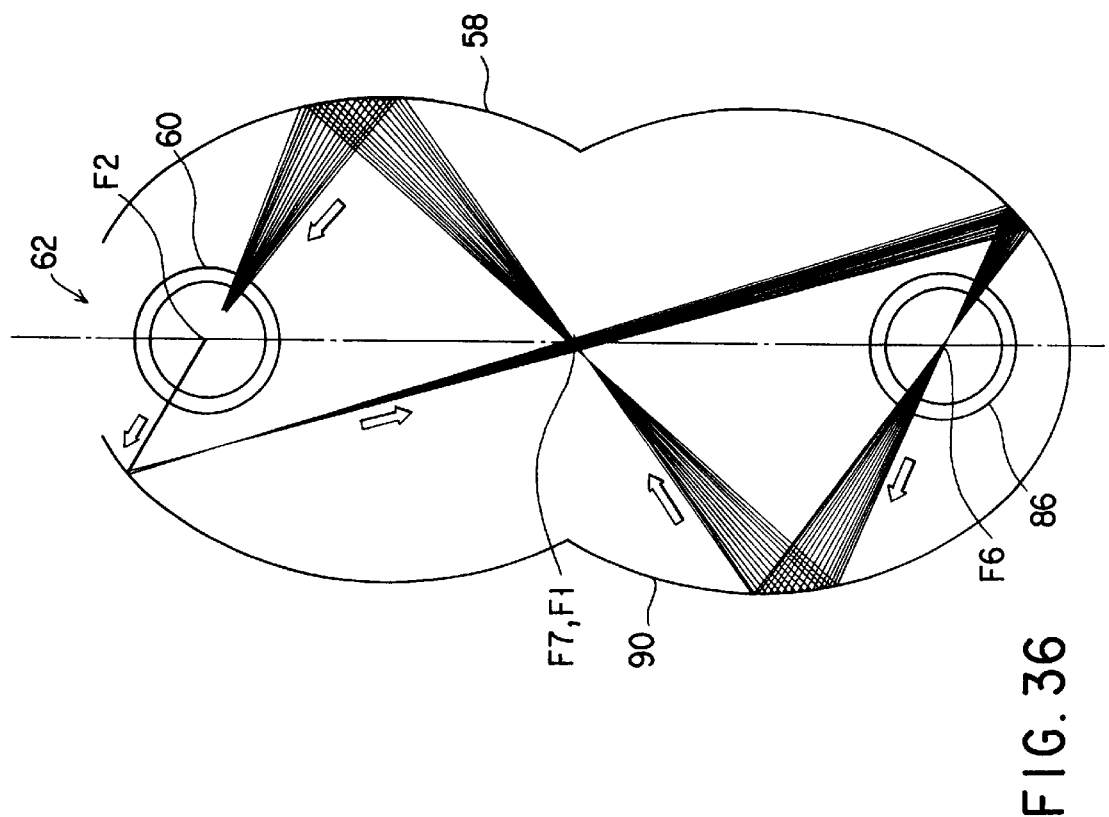
FIG. 36 is a view showing the arrangement of a light source device according to still another embodiment of the present invention.

FIG. 36 shows a light source device according to still another embodiment of the present invention as a modification of the embodiment shown in FIG. 23.

In the embodiment shown in FIG. 23, only one reflection mirror 58 with an elliptic section is used. However, the present invention is not limited to such specific arrangement. As shown in FIG. 36, a plurality of (two in FIG. 23) reflection mirrors 58 and 90 each having an elliptic section are connected in series with each other to form a so-called bi-elliptic shape. In this case, the two mirrors 58 and 90 are connected so that the position of a second focal point F7 of the rear reflection mirror 90 with an elliptic section connected with respect to the radiation opening 62 matches the position of the first focal point F1 of the front reflection mirror 58 with an elliptic section.

Not only at the second focal point F2 of the front reflection mirror 58 with an elliptic section but also at a first focal point F6 of the rear reflection mirror 90 with an elliptic section, discharge lamps 60 and 86 having a linear emission line are used.

With this arrangement, light emitted by one discharge lamp 60 or 86 is reflected by the mirrors 58 and 90, and becomes incident on the emission line of the other discharge lamp 86 or 60 to have an original divergence angle. FIG. 36 shows the ray tracing result of a light ray emitted by an arc emission line having a sectional diameter of 0.3 mm in the 70° direction. Angular errors arising from the sectional diameters of the light sources cancel each other since the light is reflected twice by the similar reflection mirrors 58 and 90, and the light restores to an original arc diameter size at one focal point. As a result, the two discharge lamps 60 and 86 enhance arc discharge intensities each other by their emitted light. Then, emitted light is picked up from the radiation opening 62 formed on the front reflection mirror 58 in the same manner as in the above embodiment. Hence, light having a very high energy density can be obtained.

In this embodiment, two reflection mirrors are connected in series with each other. However, the number of reflection mirrors is not limited to two. For example, three or more similar reflection mirrors may be connected in series with each other, and the number of discharge lamps may be increased accordingly.

Figure 37:
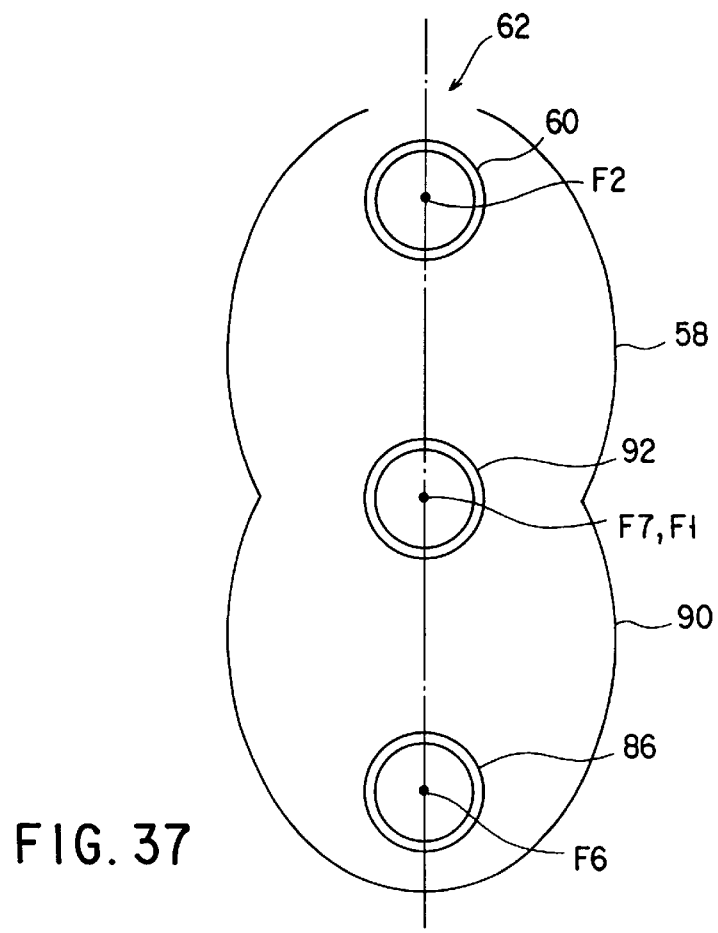
FIG. 37 is a view showing a modification of the light source device shown in FIG. 36.

FIG. 37 shows a light source device according to still another embodiment of the present invention as a modification of the embodiment shown in FIG. 36.

In this embodiment, in the device example shown in FIG. 36, a discharge lamp 92 having the same structure as that of the discharge lamps 60 and 86 is disposed on the common focal point F1 (F5) located at the joint portion between the two reflection mirrors 58 and 90 with elliptic sections.

With this arrangement, light rays emitted by the three discharge lamps 60, 86, and 92 can be made to overlap each other, and can be emitted from the radiation opening 62, thus obtaining light rays with a higher energy density.

In the embodiments described so far, the reflection mirror for directly reflecting light emitted by the lamp has an elliptic sectional shape. Instead, a reflection mirror in which one focal point of an ellipse is set at infinity and which has a parabolic sectional shape may be used.

Figure 39:
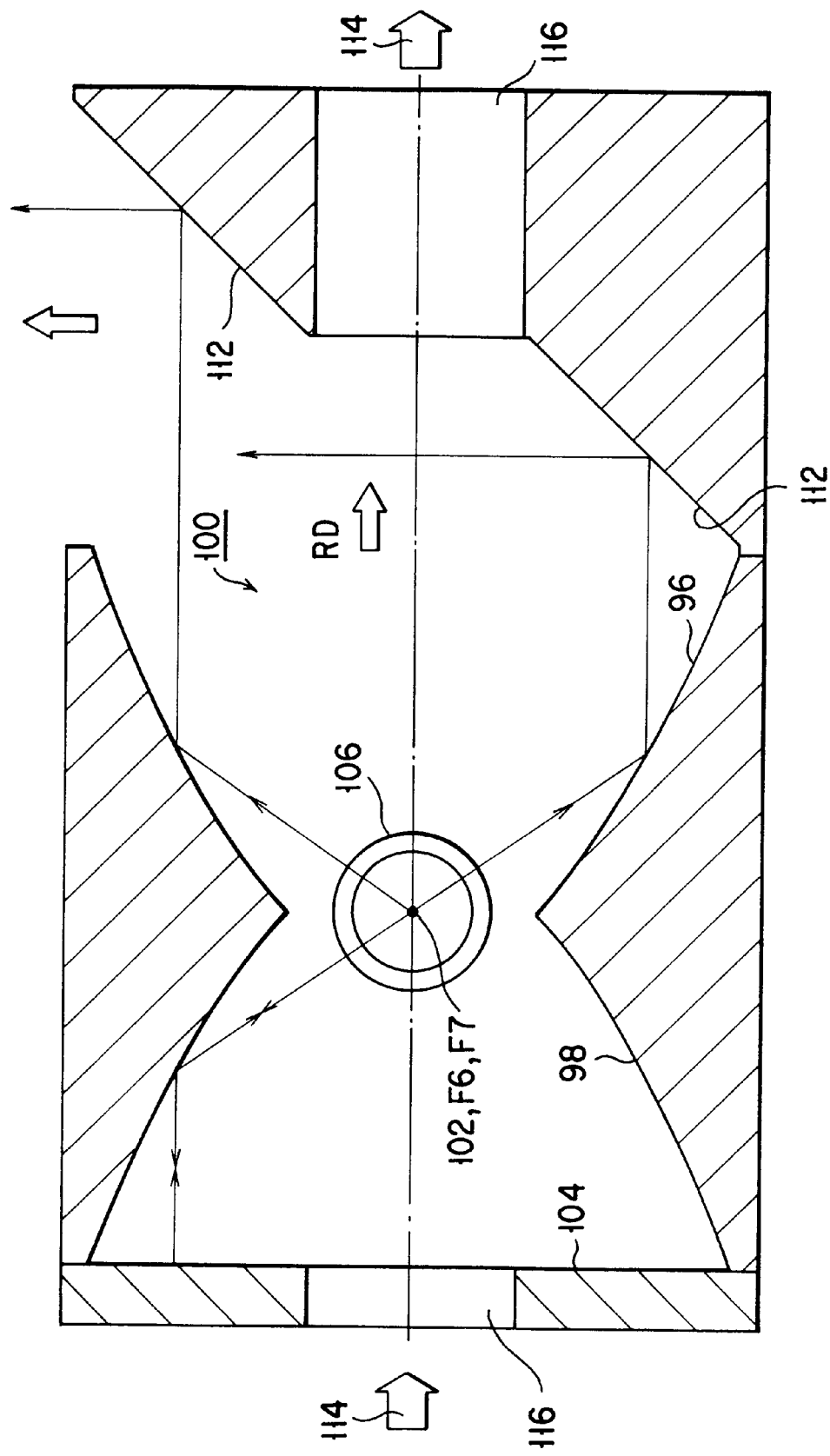
FIG. 39 is a view showing an example of the detailed arrangement of the light source device shown in FIG. 38.

FIG. 38 shows a light source device according to still another embodiment of the present invention, and FIG. 39 shows the detailed arrangement of the embodiment shown in FIG. 38.

As shown in FIG. 38, a light source device 94 uses two reflection mirrors 96 and 98 having a parabolic section, and the two reflection mirrors 96 and 98 are reversed and joined in the opposite directions. In this case, the two reflection mirrors 96 and 98 are connected in series with each other, so that the position of a focal point F6 of one, i.e., the front reflection mirror 96 matches that of a focal point F7 of the other, i.e., the rear reflection mirror 98. A discharge lamp 106 for generating, by arc discharge, an emission line 102, the sectional diameter of which is as small as it is considered as a point light source (e.g., around 0.1 mm to 0.3 mm), is placed on the focal point F6 (F7), as in the above invention.

One end of the front reflection mirror 96 is open to form a radiation opening 100, so as to emit light in the forward radiation direction. On the other hand, a rear plane reflection mirror 104 is disposed behind the rear reflection mirror 98 to extend in a direction perpendicular to the radiation direction. When the reflection mirror has an elliptic sectional shape, the rear plane reflection mirror 104 must be located on the focal point. However, when the reflection mirror has a parabolic sectional shape like in this embodiment, the mirror 104 can be disposed at any position behind the focal point F7.

In the device example with the above arrangement, the emission line 102 of the discharge lamp 106 emits light rays in all the directions of the light rays emitted forward, the light rays reflected by the front reflection mirror 96 with a parabolic section are nearly collimated in the radiation direction, and leave the radiation opening 102. Also, of the light rays emitted backward by the discharge lamp 106, the light rays reflected by the rear reflection mirror 98 with a parabolic section are reflected by the rear plane reflection mirror 104 disposed behind the mirror 98, and return nearly along original paths. After these light rays pass through the focal points F6 and F7 and their vicinities, they are reflected by the front reflection mirror 96, and are output outside the radiation opening 102. In this case, these light rays overlap those directly emitted forward by the discharge lamp 106.

FIG. 38 shows the paths of some representative light rays when the diameter of the emission line 102 is set as large as 4 mm, for the sake of easy understanding. Light 110 emitted obliquely forward by the discharge lamp 106 is emitted to have some angular errors arising from the size of the sectional diameter of the light source.

On the other hand, light 108 emitted obliquely backward by the discharge lamp 106 is reflected three times in turn by the parabolic reflection mirror 98, rear plane reflection mirror 104, and parabolic reflection mirror 98, and returns to the initial position of the discharge lamp 106. Note that a light beam having a diameter of 4 mm upon emission is restored to roughly the initial diameter range when it returns to the initial position after it is deflected several times, and the angular error is not enhanced geometrically.

Hence, although the convergence angle becomes smaller than that in the above embodiment, light rays can be made to overlap each other without increasing diffusion errors.

FIG. 39 is a sectional view showing the detailed arrangement of the device example shown in FIG. 38. For example, after, e.g., an aluminum block body is appropriately divided into some pieces, and the inner surfaces of the divided bodies are gold-plated, the divided block bodies are re-joined to form the two parabolic reflection mirrors 96 and 98 and rear plane reflection mirror 104.

A slant plane mirror 112 is obliquely formed in front of the radiation opening 100 to make an angle of 45° with the radiation direction, so as to deflect the light emission direction through 90°. A cooling opening 116 for supplying cooling air 114 is formed on the central axis along the radiation direction so as to drop the lamp temperature.

Reflection of light by this device is the same as that shown in FIG. 38, except that the final light emission direction is changed through 90° by the slant plane mirror 112.

FIG. 40 shows a light source device according to still another embodiment of the present invention as a modification of the embodiment shown in FIG. 38. FIG. 41 shows the paths of some light rays of those emitted by the device example shown in FIG. 40, and FIG. 42 shows the paths of some other light rays of those emitted by the device example shown in FIG. 40.

In the embodiment shown in FIG. 39, the two parabolic reflection mirrors 96 and 98 are combined. As shown in FIG. 40, a plurality of light source devices shown in FIG. 38 may be stacked. More specifically, as shown in FIG. 40, in addition to the two parabolic reflection mirrors 96 and 98, a pair of parabolic reflection mirrors 118 and 120 having the same structures as those of the mirrors 96 and 98 are connected in series with each other. In this case as well, the two reflection mirrors 118 and 120 are connected while being reversed to face the opposite directions, as in the two reflection mirrors 96 and 98. The two reflection mirrors 118 and 120 are aligned, so that the position of a focal point F8 of the reflection mirror 118 matches that of a focal point F9 of the reflection mirror 120, as a matter of course. The rear plane reflection mirror 104 is disposed at the rear end portion of the final reflection mirror, i.e., the reflection mirror 120.

Furthermore, a discharge lamp 122 which has the same structure as the discharge lamp 106 and generates an arc emission line is set on the focal point F8 (F9) of the reflection mirrors 118 and 120.

With this arrangement, light 124 emitted by the rear discharge lamp 122 propagates toward the reflection mirrors 96 and 98 in the front stage along the same path as that shown in FIG. 38, and is emitted forward from the radiation opening 100 while overlapping light emitted by the front discharge lamp 106.

Light rays emitted by the front and rear discharge lamps 106 and 122 are output forward while overlapping on identical paths without increasing their diffusion angles. Hence, in this case as well, light rays coming from the plurality of discharge lamps can be added up to each other. Hence, a higher energy density than that of the embodiment shown in FIG. 38 can be attained.

FIG. 41 shows the paths of some light rays emitted forward by the rear discharge lamp 122. Light 128 emitted obliquely forward by an emission line 126 having a given sectional diameter is reflected by the reflection mirrors 120 and 98, and reaches the position of the front discharge lamp 106. At this time, the divergence of light is nearly the same as that upon emission from the original discharge lamp 122. Hence, light emitted by the rear discharge lamp 122 reaches the front discharge lamp 106 without increasing its angular error. In other words, the reached light is equivalent to that emitted obliquely forward by the front discharge lamp 106.

FIG. 42 shows the paths of some light rays emitted backward by the rear discharge lamp 122. Light 130 is reflected in turn by the rear reflection mirror 120, rear plane reflection mirror 112, and rear reflection mirror 120 in the rear stage, and the rear reflection mirror 98 in the front stage, and then reaches the position of the front discharge lamp 106. At this time, the divergence of light is nearly the same as that upon emission from the original discharge lamp 122. Hence, light emitted backward by the rear discharge lamp 122 is equivalent to that emitted forward by the front discharge lamp 106.

Therefore, since light rays emitted by the two discharge lamps 106 and 122 are overlapped on identical paths and are output, light having a very high energy density can be obtained.

Figure 43:
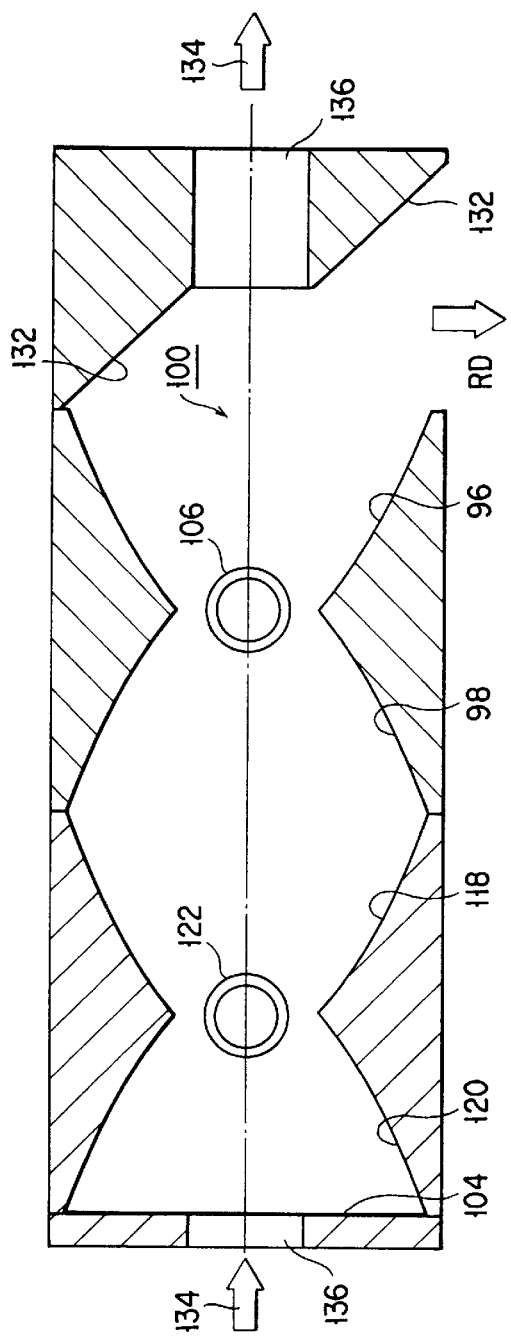
FIG. 43 is a view showing an example of the detailed arrangement of the light source device shown in FIG. 40.

FIG. 43 is a sectional view showing an example of the detailed arrangement of the device shown in FIG. 40. For example, after an aluminum block body is divided into some pieces, and these divided block bodies are hollowed out, the block bodies are re-joined to form the four reflection mirrors 96, 98, 118, and 120, and the rear plane reflection mirror 104.

A slant plane mirror 132 for changing the light emission direction through 90° is obliquely inserted in front of the radiation opening 100 to make an angle of 45° with the radiation direction.

Furthermore, a cooling hole 136 for supplying cooling air 134 is formed on the central axis along the radiation direction so as to lower the lamp temperature.

Reflection of light by this device is the same as that shown in FIGS. 40 to 42, except that the final light emission direction is changed through 90° by the slant plane mirror 132.

In this embodiment, the four parabolic reflection mirrors are coupled to each other. A larger number of reflection mirror pairs may be coupled, and the discharge lamps may be arranged in correspondence with the mirror pairs, so as to attain light with a higher energy density.

In the embodiments shown in FIGS. 38 to 43, the positional precision of the discharge lamp may be improved using the position detection means and position adjustment means as in the embodiment shown in FIGS. 19 to 21, so as to minimize the diffusion angle of the emitted light.

The above-mentioned embodiments may be appropriately combined to obtain the following arrangement.

Figure 44:
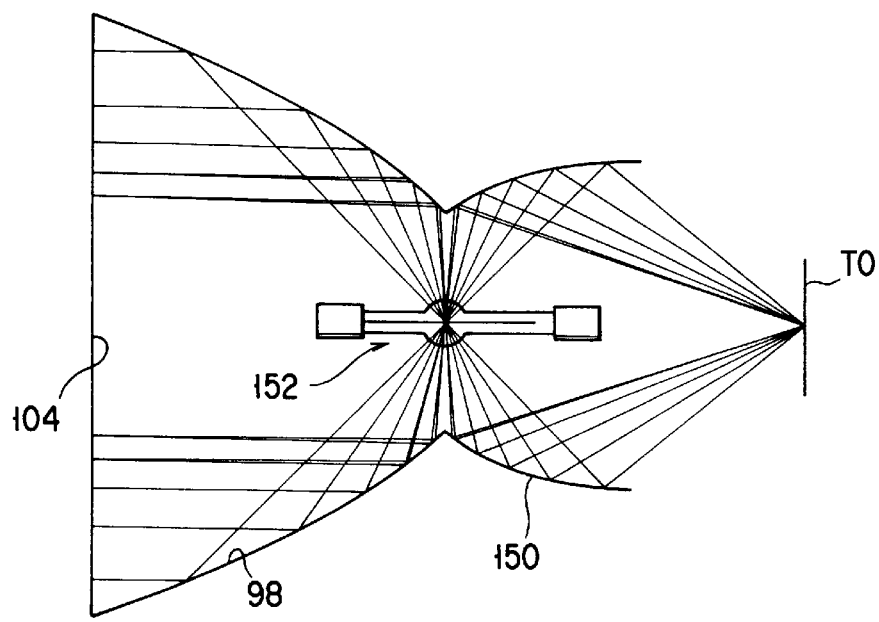
FIG. 44 is a view showing a light source device according to still another embodiment of the present invention.

In a device shown in FIG. 44, a reflection mirror 150 having an elliptic section replaces the reflection mirror having a parabolic section on the light output side in the light source device shown in FIG. 38, and a point light source is used as a light source lamp 152. The reflection mirrors 98 and 150 are disposed such that the focal point of the parabolic shape is located at one of focal points of the elliptic shape.

With this structure, light rays can be overlapped without increasing the diffusion angle as in the device shown in FIG. 38. The device shown in FIG. 44 is suitable for directly heating a target object TO to be heated. Although the device shown in FIG. 38 has a shortcoming of a small converging angle, if a point light source, e.g., a xenon lamp is used as the light source in the device shown in FIG. 38 or 44, the influence of the small converging angle can be nearly ignored. This is because the lamp originally has a small emission angle since discharge electrodes are disposed, and the light source is present in the shade of the electrodes.

Figure 45:
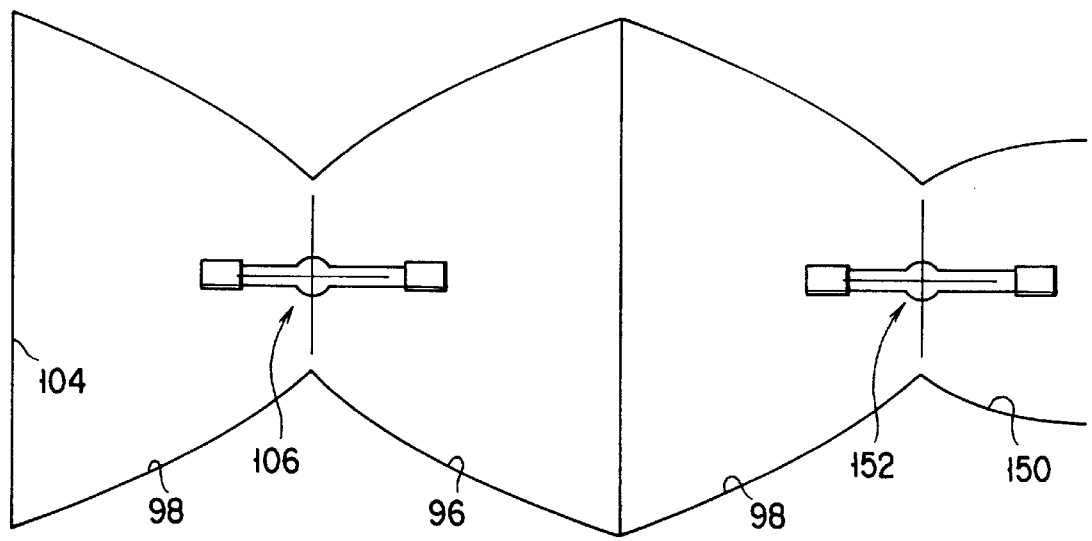
FIG. 45 is a view showing a light source device according to still another embodiment of the present invention.

A device shown in FIG. 45 corresponds to a combination of the light source devices shown in FIGS. 44 and 38, and is the same as that shown in FIG. 40 in principle. More specifically, the reflection mirror on the final light ray output side is replaced by a reflection mirror 150 having an elliptic section, and a point light source is used as a light source lamp 152. The device shown in FIG. 45 is suitable for directly heating the object.

Figure 46:
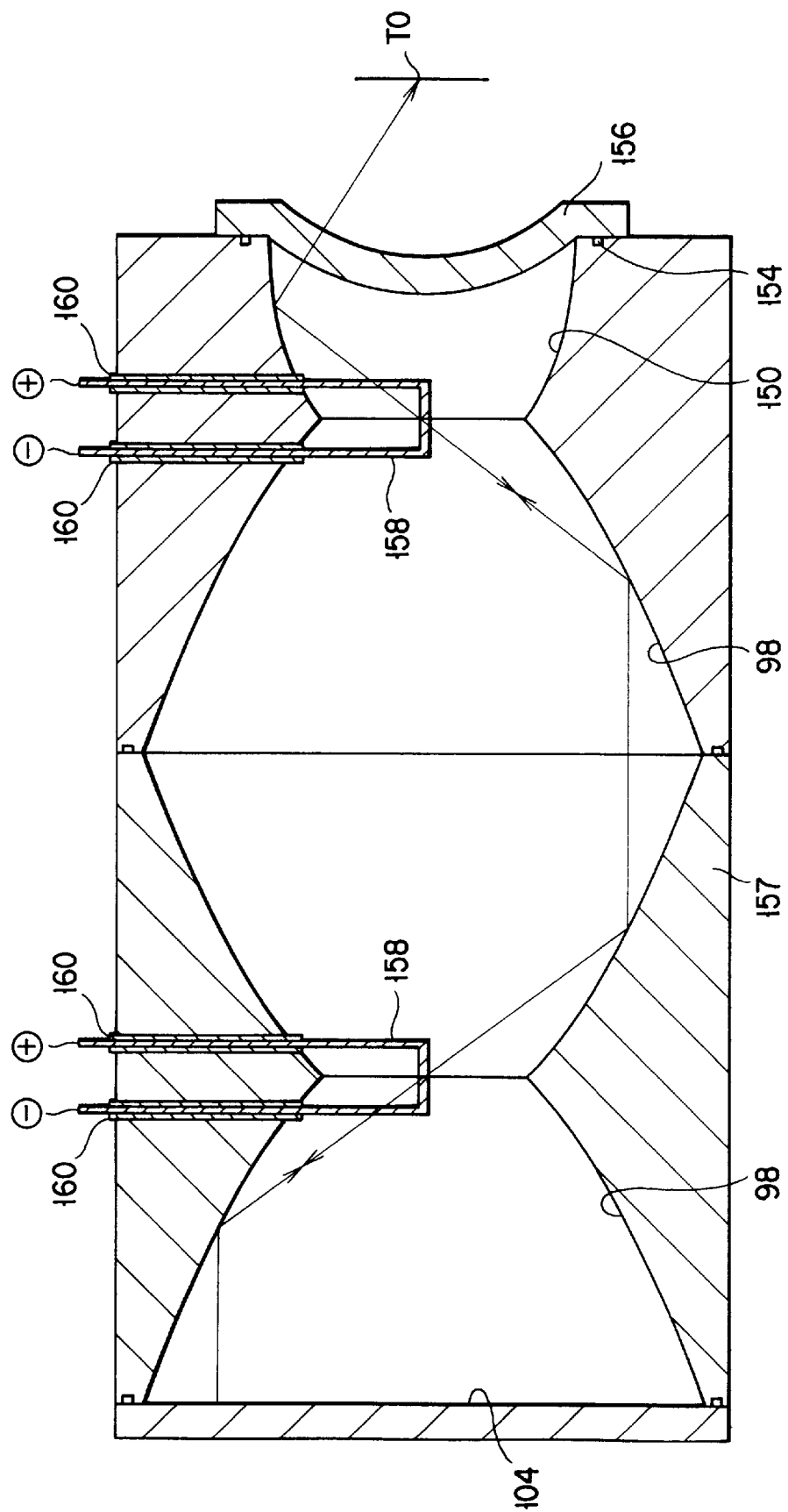
FIG. 46 is a view showing an example of the detailed arrangement of the light source device shown in FIG. 45.

The embodiments described so far do not mention about the influences of a glass tube of the light source lamp. The glass tube may increase errors of light rays, and may often be overheated to break. FIG. 46 shows a structure used when a light source lamp is assembled in a light source device to obviate the need for the glass tube of the light source lamp. This structure is substantially the same as the above-mentioned one; the interior of the light source device is maintained air-tight, and for example, xenon gas is sealed in the device.

More specifically, reflection mirrors that form the exterior of the device are the same as those of the device shown in FIG. 45, and the radiation opening is air-tightly sealed by a transparent glass cover 156 via a seal member 154. Inert gas (e.g., xenon gas) is sealed in the device. Electrode filaments 158 extend through a housing 157 of the device at positions where the lamps are to be set. Insulating members 160 are inserted in these extending portions to assure insulation from the housing 157. With this arrangement, the need for the glass tube itself of the lamp can be obviated.

The above-mentioned focusing mirror devices and light source devices can be used not only in the above-mentioned applications, but also in many other fields such as the fields of lighting fixtures, heating devices, optical systems, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device for applying light onto an irradiation target portion, comprising:

a discharge lamp for emitting light by discharge, said discharge lamp forming an emission point or emission line, a section along an optical axis direction of which is substantially a point light source;

a first mirror for reflecting light coming from said discharge lamp and guiding the reflected light toward the irradiation target portion, said first mirror having a first elliptic reflection surface having an elliptic shape in section along the optical axis direction, and said discharge lamp being disposed substantially at a position of one of two focal points of the elliptic shape;

position detection means for detecting a position of the emission point or emission line; and position adjustment means for adjusting a position of said discharge lamp, wherein said position detection means comprises at least two position detectors disposed at different portions in a plane perpendicular to the optical axis direction and said position detectors receive light coming from the emission point or emission line via pinholes formed in said elliptic reflection surface.

2. A device according to claim 1, wherein each of said position detectors comprises a semiconductor position detector.

3. A device according to claim 1, wherein said discharge lamp is disposed substantially at a position of one of the two focal points of the elliptic shape, which is farther from the irradiation target portion along the optical axis direction, and said first elliptic reflection surface is set to output the light reflected thereby as convergent light.

4. A device according to claim 1, wherein said first elliptic reflection surface is set to output the light reflected thereby as divergent light.

5. A device according to claim 4, wherein said discharge lamp comprises an arcuated rod body having a length in a direction perpendicular to the optical axis direction.

* * * * *